United States Patent
Takahashi et al.

(10) Patent No.: US 10,021,386 B2
(45) Date of Patent: Jul. 10, 2018

(54) IMAGE PROCESSING DEVICE WHICH PREDICTS AN IMAGE BY REFERRING A REFERENCE IMAGE OF AN ALLOCATED INDEX

(75) Inventors: Yoshitomo Takahashi, Kanagawa (JP); Shinobu Hattori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 452 days.

(21) Appl. No.: 14/118,408

(22) PCT Filed: May 30, 2012

(86) PCT No.: PCT/JP2012/063911
§ 371 (c)(1),
(2), (4) Date: Nov. 18, 2013

(87) PCT Pub. No.: WO2012/169403
PCT Pub. Date: Dec. 13, 2012

(65) Prior Publication Data
US 2014/0086322 A1     Mar. 27, 2014

(30) Foreign Application Priority Data

Jun. 7, 2011 (JP) .................................. 2011-127332
Nov. 18, 2011 (JP) .................................. 2011-252685

(51) Int. Cl.
*H04N 19/46* (2014.01)
*H04N 19/597* (2014.01)
(Continued)

(52) U.S. Cl.
CPC ....... *H04N 19/00569* (2013.01); *H04N 19/46* (2014.11); *H04N 19/597* (2014.11);
(Continued)

(58) Field of Classification Search
None
See application file for complete search history.

(56) References Cited

U.S. PATENT DOCUMENTS 8,311,108 B2 *  11/2012  Lee ...................... H04N 19/597
                                                    348/73
2006/0008010 A1  1/2006  Soh et al.
(Continued)

FOREIGN PATENT DOCUMENTS

JP  2006-521071 A  9/2006
JP  2009-532934 A  9/2009
(Continued)

OTHER PUBLICATIONS

Office Action dated Oct. 6, 2015 in Japanese Patent Application No. 2013-519453 (with English language translation).
(Continued)

*Primary Examiner* — William C Vaughn, Jr.
*Assistant Examiner* — Joseph A Towe
(74) *Attorney, Agent, or Firm* — Oblon, McClelland, Maier & Neustadt, L.L.P.

(57) ABSTRACT

The present technique relates to an image processing device and a method that can improve encoding efficiency in multi-viewpoint encoding. A reference image index allocation unit alternately allocates a reference image index referred by a motion estimator/compensator to predict an image to be processed to a referable image in a view direction and to a referable image in a time direction. In allocation, the reference image index allocation unit refers to time information and view information of the reference image accumulated in a decoded picture buffer, information such as a sequence parameter set and a slice header from a syntax processing unit, and the like.

25 Claims, 23 Drawing Sheets

(51) Int. Cl.
*H04N 19/107* (2014.01)
*H04N 19/503* (2014.01)
*H04N 19/61* (2014.01)
*H04N 19/50* (2014.01)
*H04N 13/00* (2018.01)

(52) U.S. Cl.
CPC ....... *H04N 13/0048* (2013.01); *H04N 19/107* (2014.11); *H04N 19/503* (2014.11); *H04N 19/61* (2014.11)

(56) References Cited

U.S. PATENT DOCUMENTS

| | | | |
|---|---|---|---|
| 2007/0109409 A1* | 5/2007 | Yea | H04N 7/181 348/153 |
| 2009/0279608 A1* | 11/2009 | Jeon | H04N 19/597 375/240.16 |
| 2011/0026611 A1 | 2/2011 | Kondo | |
| 2011/0080949 A1* | 4/2011 | Takahashi | H04N 19/597 375/240.12 |
| 2012/0075436 A1* | 3/2012 | Chen | H04N 19/597 348/51 |
| 2012/0106634 A1* | 5/2012 | Jeon | H04N 19/597 375/240.12 |
| 2012/0121188 A1 | 5/2012 | Kondo | |
| 2012/0269275 A1* | 10/2012 | Hannuksela | H04N 13/0048 375/240.25 |
| 2013/0028531 A1 | 1/2013 | Sato | |
| 2013/0051477 A1 | 2/2013 | Sasaki | |
| 2013/0071039 A1 | 3/2013 | Sato | |
| 2013/0188708 A1* | 7/2013 | Rusert | H04N 19/597 375/240.12 |
| 2013/0216149 A1 | 8/2013 | Sato | |
| 2013/0251032 A1 | 9/2013 | Tanaka | |
| 2013/0251050 A1 | 9/2013 | Ikeda et al. | |
| 2013/0259142 A1 | 10/2013 | Ikeda et al. | |
| 2013/0301739 A1 | 11/2013 | Sato | |
| 2013/0301743 A1 | 11/2013 | Ikeda et al. | |
| 2013/0301942 A1 | 11/2013 | Kondo | |
| 2013/0322525 A1 | 12/2013 | Tanaka | |
| 2013/0330012 A1 | 12/2013 | Sato | |
| 2013/0343451 A1 | 12/2013 | Sato | |
| 2014/0003510 A1 | 1/2014 | Lu et al. | |
| 2014/0023150 A1 | 1/2014 | Kondo | |
| 2014/0064362 A1 | 3/2014 | Sato | |
| 2014/0072037 A1 | 3/2014 | Sato | |
| 2014/0092958 A1 | 4/2014 | Sato | |
| 2014/0105281 A1 | 4/2014 | Sato et al. | |

FOREIGN PATENT DOCUMENTS

| | | |
|---|---|---|
| JP | 2011-87270 A | 4/2011 |
| JP | 4964355 B2 | 6/2012 |
| WO | WO 2012/042895 A1 | 4/2012 |

OTHER PUBLICATIONS

Sakae Ookubo, "H.264/AVC Textbook" Impress Corporation R&D, Jan. 1, 2009, pp. 169-170.

U.S. Appl. No. 14/123,375, filed Dec. 2, 2013, Ikeda.

International Search Report dated Sep. 4, 2012 in PCT/JP2012/063911.

Thomas Wiegand, et al., "WD3: Working Draft 3 of High-Efficiency Video Coding" HEVC, vol. JCTVC-E603, Mar. 16-23, 2011, 193 Pages.

"Advanced video coding for generic audiovisual services" International Telecommunications Union (ITU-T), vol. H.264, Mar. 2010, 674 Pages.

* cited by examiner

FIG. 5

| 1 | seq_parameter_set_rbsp( ) { | Descriptor |
|---|---|---|
| 2 | profile_idc | u(8) |
| 3 | reserved_zero_8bits   /* equal to0 */ | u(8) |
| 4 | level_idc | u(8) |
| 5 | seq_parameter_set_id | ue(v) |
| 6 | pic_width_in_luma_samples | u(16) |
| 7 | pic_height_in_luma_samples | u(16) |
| 8 | bit_depth_luma_minus8 | ue(v) |
| 9 | bit_depth_chroma_minus8 | ue(v) |
| 10 | log2_max_frame_num_minus4 | ue(v) |
| 11 | pic_order_cnt_type | ue(v) |
| 12 | if( pic_order_cnt_type == 0 ) | |
| 13 | log2_max_pic_order_cnt_lsb_minus4 | ue(v) |
| 14 | else if( pic_order_cnt_type == 1 ) { | |
| 15 | delta_pic_order_always_zero_flag | u(1) |
| 16 | offset_for_non_ref_pic | se(v) |
| 17 | num_ref_frames_in_pic_order_cnt_cycle | ue(v) |
| 18 | for( i = 0; i < num_ref_frames_in_pic_order_cnt_cycle; i++ ) | |
| 19 | offset_for_ref_frame[ i ] | se(v) |
| 20 | } | |
| 21 | max_num_ref_frames | ue(v) |
| 22 | gaps_in_frame_num_value_allowed_flag | u(1) |
| 23 | log2_min_coding_block_size_minus3 | ue(v) |
| 24 | log2_diff_max_min_coding_block_size | ue(v) |
| 25 | log2_min_transform_block_size_minus2 | ue(v) |
| 26 | log2_diff_max_min_transform_block_size | ue(v) |
| 27 | max_transform_hierarchy_depth_inter | ue(v) |
| 28 | max_transform_hierarchy_depth_intra | ue(v) |
| 29 | adaptive_loop_filter_enabled_flag | u(1) |
| 30 | cu_qp_delta_enabled_flag | u(1) |
| 31 | num_views | |
| 32 | for(i=0;i<num_views;i++){ | |
| 33 | view_id[ i ] | |
| 34 | num_ref_views_l0[ i ]<br>for(j=0;j<num_ref_views_l0[ i ];j++) | |
| 35 | ref_view_id_l0[ i ][ j ] | |
| 36 | num_ref_views_l1[ i ]<br>for(j=0;j<num_ref_views_l1[ i ];j++) | |
| 37 | ref_view_id_l1[ i ][ j ] | |
| 38 | } | |
| 39 | rbsp_trailing_bits( ) | |
| 40 | } | |

FIG. 6

| | | Descriptor |
|---|---|---|
| 1 | slice_header( ) { | |
| 2 | first_tb_in_slice | ue(v) |
| 3 | entropy_slice_flag | u(1) |
| 4 | if( !entropy_slice_flag ) { | |
| 5 | slice_type | ue(v) |
| 6 | pic_parameter_set_id | ue(v) |
| 7 | frame_num | u(v) |
| 8 | view_id | u(v) |
| 9 | if( IdrPicFlag ) | |
| 10 | idr_pic_id | ue(v) |
| 11 | if( pic_order_cnt_type == 0 ) | |
| 12 | pic_order_cnt_lsb  /* | u(v) |
| 13 | if( slice_type == P \|\| slice_type == B ) { | |
| 14 | num_ref_idx_active_override_flag | u(1) |
| 15 | if( num_ref_idx_active_override_flag ) { | |
| 16 | num_ref_idx_l0_active_minus1 | ue(v) |
| 17 | if( slice_type == B ) | |
| 18 | num_ref_idx_l1_active_minus1 | ue(v) |
| 19 | } | |
| 20 | } | |
| 21 | ref_pic_list_modification( ) | |
| 22 | ref_pic_list_combination( ) | |
| 23 | if( nal_ref_idc != 0 ) | |
| 24 | dec_ref_pic_marking( ) | |
| 25 | if( entropy_coding_mode_flag && slice_type != I) | |
| 26 | cabac_init_idc | ue(v) |
| 27 | slice_qp_delta | se(v) |
| 28 | if( adaptive_loop_filter_enabled_flag ) | |
| 29 | alf_param() | |
| 30 | if( deblocking_filter_control_present_flag ) { | |
| 31 | disable_deblocking_filter_idc | |
| 32 | if( disable_deblocking_filter_idc != 1 ) { | |
| 33 | slice_alpha_c0_offset_div2 | |
| 34 | slice_beta_offset_div2 | |
| 35 | } | |
| 36 | } | |
| 37 | if( slice_type == B ) | |
| 38 | collocated_from_l0_flag | u(1) |
| 39 | } else | |
| 40 | if( entropy_coding_mode_flag && slice_type != I) | |
| 41 | cabac_init_idc | ue(v) |
| 42 | } | |

FIG. 16

| 1 | seq_parameter_set_non_base_color_view( ) { | Descriptor |
|---|---|---|
| 2 | num_views_minus1 | ue(v) |
| 3 | for (i = 0; i <= num_views_minus1; i++) | |
| 4 | views_id[i] | ue(v) |
| 5 | for (i = 1; i <= num_views_minus1; i++) { | |
| 6 | num_refs_l0[i] | ue(v) |
| 7 | for (j = 0; j <= num_anchor_refs_l0[i]; j++) | |
| 8 | ref_l0[i][j] | ue(v) |
| 9 | num_refs_l1[i] | ue(v) |
| 10 | for (j = 0; j <= num_anchor_refs_l1[i]; j++) | |
| 11 | ref_l1[i][j] | ue(v) |
| 12 | } | |
| 13 | default_reference_picture_index_pattern_idc | u(2) |
| 14 | } | |

FIG. 17

| idc | DEFAULT ALLOCATION PATTERN | ASSUMED SCENE |
|---|---|---|
| 0 | time first | HIGH TIME CORRELATION |
| 1 | view first | HIGH AMONG-VIEW CORRELATION |
| 2 | time first zig-zag | RELATIVELY HIGH TIME CORRELATION |
| 3 | view first zig-zag | RELATIVELY HIGH AMONG-VIEW CORRELATION |

IMAGE PROCESSING DEVICE WHICH PREDICTS AN IMAGE BY REFERRING A REFERENCE IMAGE OF AN ALLOCATED INDEX

TECHNICAL FIELD

The present disclosure relates to an image processing device and a method, and especially relates to an image processing device and a method that can improve encoding efficiency in multi-viewpoint encoding.

BACKGROUND ART

In recent years, there has been the spread of devices that applies compression encoding to an image by employing an encoding format for handling image information as digital signals, taking advantage of redundancy peculiar to the image information, aiming for transmission and storage of high effective information at that time, and compressing the image by orthogonal transform such as discrete cosine transform or the like and motion compensation. Examples of this encoding format include Moving Picture Experts Group (MPEG) and the like.

Especially, MPEG2 (ISO/IEC 13818-2) is defined as a general-purpose image encoding format, and is a standard encompassing both of interlaced scanning images and sequential-scanning images, and standard resolution images and high definition images. For example, MPEG2 has been widely used in a broad range of applications for professional usage and for consumer usage. By employing the MPEG2 compression format, a code amount (bit rate) of 4 to 8 Mbps is allocated in a case of an interlaced scanning image of standard resolution having 720×480 pixels, for example. By employing the MPEG2 compression format, a code amount (bit rate) of 18 to 22 Mbps is allocated in a case of an interlaced scanning image of high resolution having 1920× 1088 pixels, for example. Thus, high compression rate and excellent image quality can be realized.

MPEG2 has been principally used for high image quality encoding adapted to broadcasting usage, but have not handled an encoding format of a lower code amount (bit rate) than the code amount of MPEG1, i.e., an encoding format having a higher compression rate. With the widespread of mobile terminals, growing needs for such an encoding format is expected from now on, and the MPEG4 encoding format has been standardized in response to the needs. With regard to an image encoding format, the specification thereof was confirmed as an international standard as ISO/IEC 14496-2 in December, 1998.

As for the schedule of standardization, H.264 and MPEG-4 Part 10 (Advanced Video Coding, hereafter referred to as H.264/AVC) became an international standard in March, 2003.

Further, as an expansion of H.264/AVC, standardization of FRExt (Fidelity Range Extension), which includes encoding tools necessary for operations such as RGB, 4:2:2, and 4:4:4, and MPEG-2 stipulated 8×8 DCT and quantization matrices, has been completed in February, 2005. Accordingly, the encoding format can favorably express film noise included in movies using H.264/AVC, and is to be used in a wide range of applications such as Blu-Ray Disc (registered trademark).

However, recently, there are increased needs for further higher compression encoding, such as to compress images around 4000×2000 pixels, which is four times Hi-Vision images, or to distribute Hi-Vision images in an environment with limited transmission capacity like the Internet. Therefore, the VCEG (=Video Coding Expert Group) under the ITU-T, described above, is continuously studying improvement of encoding efficiency (see Non-Patent Document 1).

Currently, for the purpose of further improvement of the encoding efficiency from H.264/AVC, Joint Collaboration Team-Video Coding (JCTVC), which is a joint standardization body of the ITU-T and the ISO/IEC, has moved forward with standardization of an encoding format called high efficiency video coding (HEVC). In HEVC, Non-Patent Document 2 has been issued as a draft.

By the way, in H.264/AVC, when reference image indexes are allocated in order to decode a B-picture, reference image indexes are allocated to a list L0 in descending order of picture order count (POC) that is information indicating output order of pictures. The reference image indexes are allocated to a list L1 in ascending order of POC.

Further, when the reference image indexes are allocated in order to decode a P-picture, the reference image indexes are allocated in decoding order.

CITATION LIST

Non-Patent Documents

Non-Patent Document 1: "ITU-T Recommendation H.264 Advanced video coding for generic audiovisual", March 2010

Non-Patent Document 2: Thomas Wiegand, Woo-jin Han, Benjamin Bross, Jens-Rainer Ohm, Gary J. Sullivian, "WD3: Working Draft3 of High-Efficiency Video Coding", JCTVc-E603, March 2011

SUMMARY OF THE INVENTION

Problems to be Solved by the Invention

However, the above-described method of allocating a reference image index in H.264/AVC is mainly processing within the same viewpoint. Therefore, in a case of multi-viewpoint encoding, after being allocated to all reference images in a time direction, the reference image indexes are allocated to the reference images in a view direction. When the allocated reference image index is inefficient and there is a need to change the reference image index, a change command is transmitted.

In this way, the method of allocating a reference image index in the case of multi-viewpoint encoding has not been efficient.

The present disclosure has been made in view of the foregoing, and can improve the encoding efficiency in multi-viewpoint encoding.

Solutions to Problems

An image processing device of one aspect of the present disclosure includes: a decoder configured to decode a bit stream to generate an image; an index allocation unit configured to alternately allocate reference image indexes to be referred in predicting the image generate by the decoder to a referable image in a view direction and to a referable image in a time direction; and a predictor configured to refer a reference image of the index allocated by the index allocation unit to predict the image generated by the decoder.

The index allocation unit can repeat a process of allocating the reference image indexes to a referable image in the time direction and to a referable image in the view direction in that order.

After allocating the reference image indexes to all of the referable images in the time direction, the index allocation unit can allocate the reference image index to a referable image in the view direction.

The index allocation unit can repeat a process of allocating the reference image indexes to a referable image in the view direction and to a referable image in the time direction in that order.

After allocating the reference image indexes to all of the referable images in the view direction, the index allocation unit can allocate the reference image index to a referable image in the time direction.

The index allocation unit can select either one from a time direction prioritized pattern in which after the reference image index is allocated to a referable image in the time direction, the reference image index is allocated to a referable image in the view direction, and a view direction prioritized pattern in which after the reference image index is allocated to a referable image in the view direction, the reference image index is allocated to a referable image in the time direction, and can allocate the reference image index.

The index allocation unit can select a pattern to allocate the reference image index from a time direction prioritized pattern in which a process of allocating the reference image indexes to a referable image in the time direction and to a referable image in the view direction in that order is repeated, and a view direction prioritized pattern in which a process of allocating the reference image indexes to a referable image in the view direction and to a referable image in the time direction in that order is repeated, and can allocate the reference image index.

The index allocation unit can allocate the reference image index according to pattern identification information identifying whether the time direction prioritized pattern is used or the view direction prioritized pattern is used.

The index allocation unit can allocate the reference image index to a referable image in the view direction based on view reference information of a sequence parameter set.

The index allocation unit can allocate the reference image index to a referable image in the time direction based on decoding order in a case of a P-picture, and based on a picture order count (POC) in a case of a B-picture.

The index allocation unit can select a pattern to allocate the reference image index from: a time direction prioritized alternate pattern in which a process of starting allocation of the reference image indexes from a referable image in the time direction, and allocating the reference image indexes to a referable image in the time direction and to a referable image in the view direction in that order is repeated; and a view direction prioritized alternate pattern in which a process of starting allocation of the reference image indexes from a referable image in the view direction, and allocating the reference image indexes to a referable image in the view direction and to a referable image in the time direction in that order is repeated, and can allocate the reference image index.

The index allocation unit can allocate the reference image indexes according to pattern identification information identifying whether the time direction prioritized alternate pattern is used or the view direction prioritized alternate pattern is used.

In an image processing method of one aspect of the present disclosure, an image processing device: decodes a bit stream to generate an image; alternately allocates reference image indexes to be referred in predicting the generated image to a referable image in a view direction and to a referable image in a time direction; and refers to a reference image of the allocated index and predicts the generated image.

An image processing device of another aspect of the present disclosure includes: an index allocation unit configured to alternately allocate reference image indexes to be referred in predicting an image to a referable image in a view direction and to a referable image in a time direction; a predictor configured to refer to a reference image of the index allocated by the index allocation unit to predict the image; and an encoder configured to encode the image predicted by the predictor to generate a bit stream.

The index allocation unit can repeat a process of allocating the reference image indexes to a referable image in the time direction and to a referable image in the view direction in that order.

After allocating the reference image indexes to all of the referable images in the time direction, the index allocation unit can allocate the reference image index to a referable image in the view direction.

The index allocation unit can repeat a process of allocating the reference image indexes to a referable image in the view direction and to a referable image in the time direction in that order.

After allocating the reference image indexes to all of the referable images in the view direction, the index allocation unit can allocate the reference image index to a referable image in the time direction.

The index allocation unit can select either one from a time direction prioritized pattern in which after the reference image index is allocated to a referable image in the time direction, the reference image index is allocated to a referable image in the view direction, and a view direction prioritized pattern in which after the reference image index is allocated to a referable image in the view direction, the reference image index is allocated to a referable image in the time direction, and can allocate the reference image index.

The index allocation unit can select a pattern to allocate the reference image index from a time direction prioritized pattern in which a process of allocating the reference image indexes to a referable image in the time direction and to a referable image in the view direction in that order is repeated, and a view direction prioritized pattern in which a process of allocating the reference image indexes to a referable image in the view direction and to a referable image in the time direction in that order is repeated, and can allocate the reference image index.

A transmission unit configured to transmit pattern identification information identifying whether the time direction prioritized pattern is used or the view direction prioritized pattern is used, and the bit stream generated by the encoder can be further included.

The index allocation unit can allocate the reference image index to a referable image in the view direction based on view reference information of a sequence parameter set.

The index allocation unit can allocate the reference image index to a referable image in the time direction based on decoding order in a case of a P-picture, and based on a picture order count (POC) in a case of a B-picture.

The index allocation unit can select a pattern to allocate the reference image index from: a time direction prioritized alternate pattern in which a process of starting allocation of the reference image indexes from a referable image in the time direction, and allocating the reference image indexes to a referable image in the time direction and to a referable image in the view direction in that order is repeated; and a view direction prioritized alternate pattern in which a process of starting allocation of the reference image indexes from a referable image in the view direction, and allocating the reference image indexes to a referable image in the view direction and to a referable image in the time direction in that order is repeated, and can allocate the reference image index.

A transmission unit configured to transmit pattern identification information identifying whether the time direction prioritized alternate pattern is used or the view direction prioritized alternate pattern is used, and the bit stream generated by the encoder can be further included.

In an image processing method of another aspect of the present disclosure, an image processing device: alternately allocate reference image indexes to be referred in predicting an image to a referable image in a view direction and to a referable image in a time direction; refers to a reference image of the allocated index to predict the image; and encodes the image predicted by the predictor to generate a bit stream.

In one aspect of the present disclosure, a bit stream is decoded and an image is generated. Further, the indexes of the reference imaged to be referred in predicting the generated image are alternately allocated to a referable image in the view direction and to a referable image in the time direction, the reference images of the allocated indexes are referred, and the generated image is predicted.

In another aspect of the present disclosure, the indexes of the reference images to be referred in predicting an image are alternately allocated to a referable image in the view direction and to a referable image in the time direction. Then, the reference images of the allocated indexes are referred and the image is predicted, and the predicted image is encoded and a bit stream is generated.

Note that the above-described image processing device may be an independent device, or may be an internal block that configures a single image encoding device or image decoding device.

Effects of the Invention

According to one aspect of the present disclosure, an image can be decoded. Especially, the encoding efficiency can be improved.

According to another aspect of the present disclosure, an image can be encoded. Especially, the encoding efficiency can be improved.

BRIEF DESCRIPTION OF DRAWINGS

FIG. 5 is a diagram showing an example of syntax of a sequence parameter set.

FIG. 6 is a diagram showing an example of syntax of a slice header.

FIG. 16 is a diagram showing an example of syntax of a sequence parameter set.

FIG. 17 is a diagram showing an example of allocation patterns and assumed scenes.

MODE FOR CARRYING OUT THE INVENTION

Modes for carrying out the present disclosure (hereinafter referred to as the embodiments) will be described below. The description will be made in the following order.
1. First Embodiment (image encoding device)
2. Second Embodiment (image decoding device)
3. Third Embodiment (an example of four types of default allocation patterns)
4. Fourth embodiment (image encoding device)
5. Fifth embodiment (image decoding device)
6. Sixth Embodiment (computer)
7. Modification <1. First Embodiment>
[Example Structure of Image Encoding Device]

Figure 1:
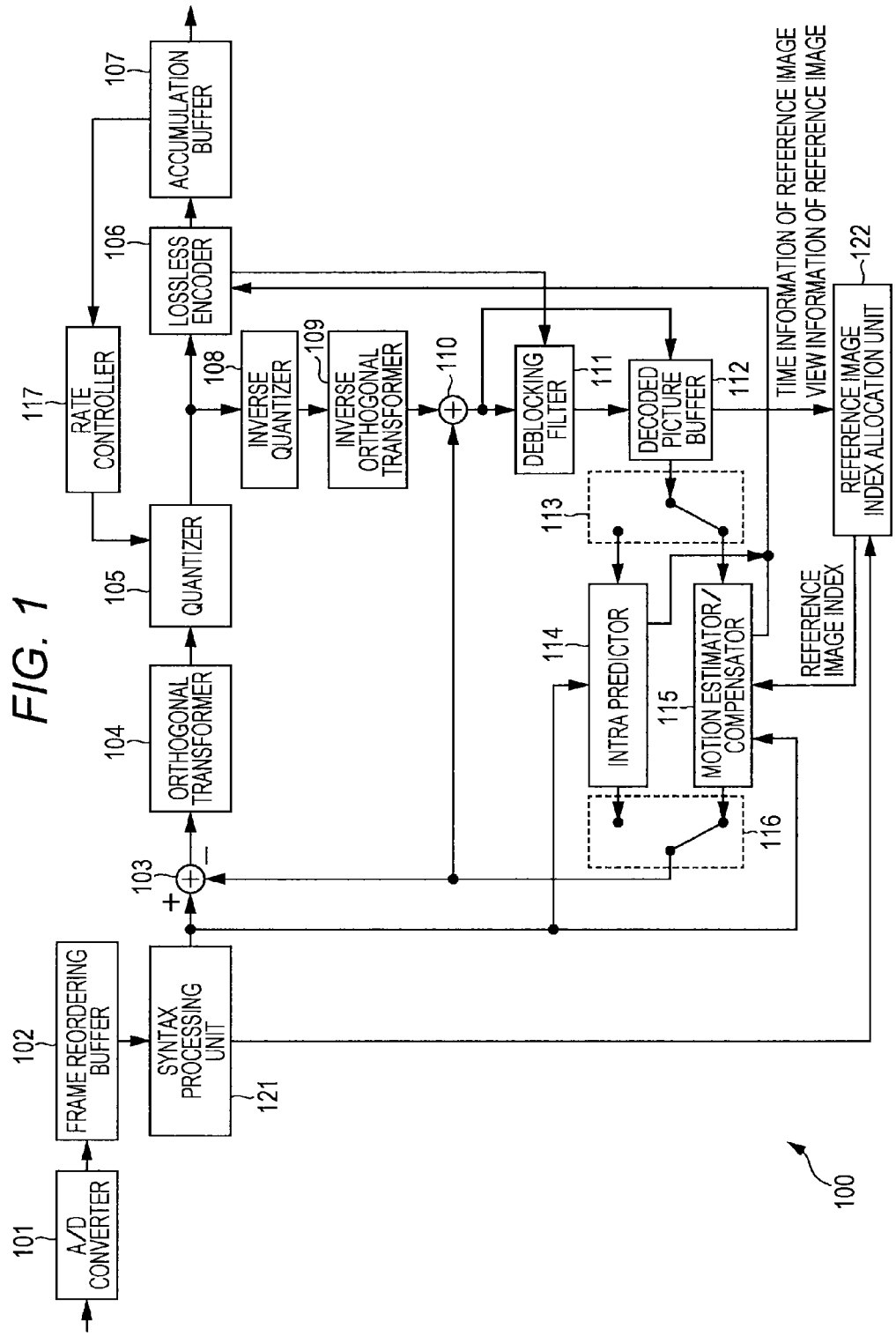
FIG. 1 is a block diagram showing a typical example structure of an image encoding device.

FIG. 1 shows a structure of an embodiment of an image encoding device as an image processing device to which the present disclosure is applied.

An image encoding device 100 shown in FIG. 1 encodes image data using a prediction process. Here, examples of an encoding format include H.264 and MPEG (Moving Picture Experts Group) 4 Part 10 (AVC (Advanced Video Coding)) (hereinafter, referred to as H.264/AVC) system, and HEVC (High Efficiency Video Coding) system.

In the example of FIG. 1, the image encoding device 100 includes an analog/digital (A/D) converter 101, a frame reordering buffer 102, an arithmetic operation unit 103, an orthogonal transformer 104, a quantizer 105, a lossless encoder 106, and an accumulation buffer 107. Further, the image encoding device 100 includes an inverse quantizer 108, an inverse orthogonal transformer 109, an arithmetic operation unit 110, a deblocking filter 111, a decoded picture buffer 112, a selector 113, an intra predictor 114, a motion estimator/compensator 115, a selector 116, and a rate controller 117.

The image encoding device 100 further includes a syntax processing unit 121 and a reference image index allocation unit 122.

The A/D converter 101 applies A/D conversion to input image data, outputs the converted image data to the frame reordering buffer 102, and stores the image data therein.

The frame reordering buffer 102 reorders images of frames stored in display order into encoding order in accordance with a GOP (Group of Pictures) structure. The frame reordering buffer 102 supplies images of the reordered frames to the syntax processing unit 121.

The syntax processing unit 121 sequentially confirms image data read out from the frame reordering buffer 102, and inserts header information into the image data. The header information includes a sequence parameter set (SPS), a picture parameter set (PPS), and the like. In addition, the syntax processing unit 121 adds a slice header (SH) to a head of a slice.

The syntax processing unit 121 supplies an image to which the header information and the like are inserted to the arithmetic operation unit 103, the intra predictor 114, and the motion estimator/compensator 115. Further, the syntax processing unit 121 supplies the header information and information such as the slice header to the reference image index allocation unit 122.

The arithmetic operation unit 103 subtracts a predicted image supplied from the intra predictor 114 or the motion estimator/compensator 115 through the selector 116 from the image supplied from the syntax processing unit 121, and outputs difference information thereof to the orthogonal transformer 104.

For example, in a case of an image to which intra encoding is applied, the arithmetic operation unit 103 subtracts the predicted image supplied from the intra predictor 114 from the image supplied from the syntax processing unit 121. Further, for example, in a case of an image to which inter encoding is applied, the arithmetic operation unit 103 subtracts the predicted image supplied from the motion estimator/compensator 115 from the image supplied from the syntax processing unit 121.

The orthogonal transformer 104 applies orthogonal transform such as discrete cosine transform or Karhunen-Loeve transform to the difference information supplied from the arithmetic operation unit 103, and supplies a transform coefficient thereof to the quantizer 105.

The quantizer 105 quantizes the transform coefficient supplied from the orthogonal transformer 104. The quantizer 105 supplies the quantized transform coefficient to the lossless encoder 106.

The lossless encoder 106 applies lossless encoding such as variable-length coding and arithmetic coding to the quantized transform coefficient.

The lossless encoder 106 acquires information indicating an intra prediction mode and the like from the intra predictor 114, and acquires information indicating an inter prediction node, motion vector information, and the like from the motion estimator/compensator 115.

The lossless encoder 106 encodes the quantized transform coefficient, and causes the intra prediction mode information, the inter prediction mode information, the motion vector information, and the quantization parameter to be contained as apart of the header information of encoded data (multiplexes the information). The lossless encoder 106 supplies the encoded data obtained by the encoding to the accumulation buffer 107 and accumulates the encoded data therein.

For example, in the lossless encoder 106, a lossless encoding process such as variable-length coding or arithmetic coding is performed. An example of the variable-length coding includes context-adaptive variable length coding (CAVLC). An example of the arithmetic coding includes context-adaptive binary arithmetic coding (CABAC).

The accumulation buffer 107 temporarily holds the encoded data supplied from the lossless encoder 106, and outputs the held encoded data to a downstream recording device (not shown), a transmission path, and the like, as an encoded image.

The transform coefficient quantized by the quantizer 105 is also supplied to the inverse quantizer 108. The inverse quantizer 108 inversely quantizes the quantized transform coefficient by a method corresponding to the quantization by the quantizer 105. The inverse quantizer 108 supplies the obtained transform coefficient to the inverse orthogonal transformer 109.

The inverse orthogonal transformer 109 inversely orthogonally transforms the supplied transform coefficient by a method corresponding to the orthogonal transform process by the orthogonal transformer 104. An output obtained by the inverse orthogonal transform (restored difference information) is supplied to the arithmetic operation unit 110.

The arithmetic operation unit 110 adds the predicted image supplied from the intra predictor 114 or the motion estimator/compensator 115 through the selector 116 to a result of the inverse orthogonal transform supplied from the inverse orthogonal transformer 109, that is, to the restored difference information, to obtain a locally decoded image (decoded image).

For example, when the difference information corresponds to an image to which intra encoding is applied, the arithmetic operation unit 110 adds the predicted image supplied from the intra predictor 114 to the difference information. Further, for example, when the difference information corresponds to an image to which inter encoding is applied, the arithmetic operation unit 110 adds the predicted image supplied from the motion estimator/compensator 115 to the difference information.

A result of the addition is supplied to the deblocking filter 111 and the decoded picture buffer 112.

The deblocking filter 111 removes block distortion of the decoded image by appropriately performing a deblocking filter process. The deblocking filter 111 supplies a result of the filter process to the decoded picture buffer 112.

The decoded picture buffer 112 outputs accumulated reference images to the intra predictor 114 or the motion estimator/compensator 115 through the selector 113 at a predetermined timing.

For example, in a case of an image to which intra encoding is applied, the decoded picture buffer 112 supplies the reference image to the intra predictor 114 through the selector 113. Further, for example, in a case where inter encoding is performed, the decoded picture buffer 112 supplies the reference image to the motion estimator/compensator 115 through the selector 113.

When the reference image supplied from the decoded picture buffer 112 is an image to which intra encoding is performed, the selector 113 supplies the reference image to the intra predictor 114. Further, when the reference image supplied from the decoded picture buffer 112 is an image to which inter encoding is applied, the selector 113 supplies the reference image to the motion estimator/compensator 115.

The intra predictor 114 performs intra prediction (intra-frame prediction) to generate a predicted image using a pixel value within a frame of an input image supplied from the syntax processing unit 121. The intra predictor 114 performs the intra prediction in a plurality of modes (intra prediction modes).

The intra predictor 114 generates predicted images in all of the intra prediction modes, evaluates the predicted images, and selects an optimum mode. When having selected the optimum intra prediction mode, the intra predictor 114 supplies the predicted image generated in the optimum mode to the arithmetic operation unit 103 and the arithmetic operation unit 110 through the selector 116.

In addition, as described above, the intra predictor 114 appropriately supplies information such as intra prediction mode information indicating the employed intra prediction mode to the lossless encoder 106.

The motion estimator/compensator 115 performs motion disparity prediction of the image to which inter encoding is applied using the input image supplied form the syntax processing unit 121 and the reference image supplied from the decoded picture buffer 112 through the selector 113. At that time, the motion estimator/compensator 115 uses the reference image of the reference image index allocated by the reference image index allocation unit 122. The motion estimator/compensator 115 performs a motion compensation process in accordance with a detected motion and a disparity vector to generate a predicted image (inter predicted image information).

The motion estimator/compensator 115 performs the inter prediction process of all candidate inter prediction modes to generate predicted images. The motion estimator/compensator 115 supplies the generated predicted images to the arithmetic operation unit 103 and the arithmetic operation unit 110 through the selector 116.

Further, the motion estimator/compensator 115 supplies the inter prediction mode information indicating the employed inter prediction mode and the motion vector information indicating the calculated motion vector to the lossless encoder 106.

The selector 116 supplies an output of the intra predictor 114 to the arithmetic operation unit 103 and the arithmetic operation unit 110 in a case of an image to which intra encoding is applied, and supplies an output of the motion estimator/compensator 115 to the arithmetic operation unit 103 and the arithmetic operation unit 110 in a case of an image to which inter encoding is applied.

The rate controller 117 controls a rate of a quantization operation of the quantizer 105 based on a compressed image accumulated in the accumulation buffer 107 so as to prevent overflow and underflow.

The reference image index allocation unit 122 alternately allocates indexes of reference images to be referred by the motion estimator/compensator 115 when predicting an image to be processed, to a referable image in a view direction and to a referable image in a time direction. In allocation, the header information such as the sequence parameter set and the header information from the syntax processing unit 121 are referred as information of the image to be processed. In addition, as information of the reference images, time information and view information of the reference images that can be obtained from the header information of the reference images and the like accumulated in the decoded picture buffer 112.

The reference image index allocation unit 122 supplies the allocated reference image indexes to the motion estimator/compensator 115.

[Method of Allocating Reference Image Index]

In H.264/AVC and in HEVC, a method of allocating reference image indexes in the same view is stipulated as described below.

When an image is decoded, a reference image index can be allocated to an image decoded in the past.

An index of a reference image can be allocated to a referable image within the decoded picture buffer 112. The maximum value of the reference image index can be changed by being transmitted as header information.

When a decoded image is a P-picture, smaller reference image indexes are allocated to referable images in closer decoding order among the referable images, with respect to the list L0.

When a decoded image is a B-picture, smaller reference image indexes are allocated to referable images in descending order of POC (Picture Order Count) that is information indicating output order of pictures in a forward direction, and next, smaller reference image indexes are allocated to referable images in ascending order of POC in a backward direction among the referable images, with respect to the list L0. Further, smaller reference image indexes are allocated to referable images in ascending order of POC in the backward direction, and next, smaller reference image indexes are allocated to referable images in descending order of POC in the forward direction among the referable images, with respect to the list L1.

Figure 2:
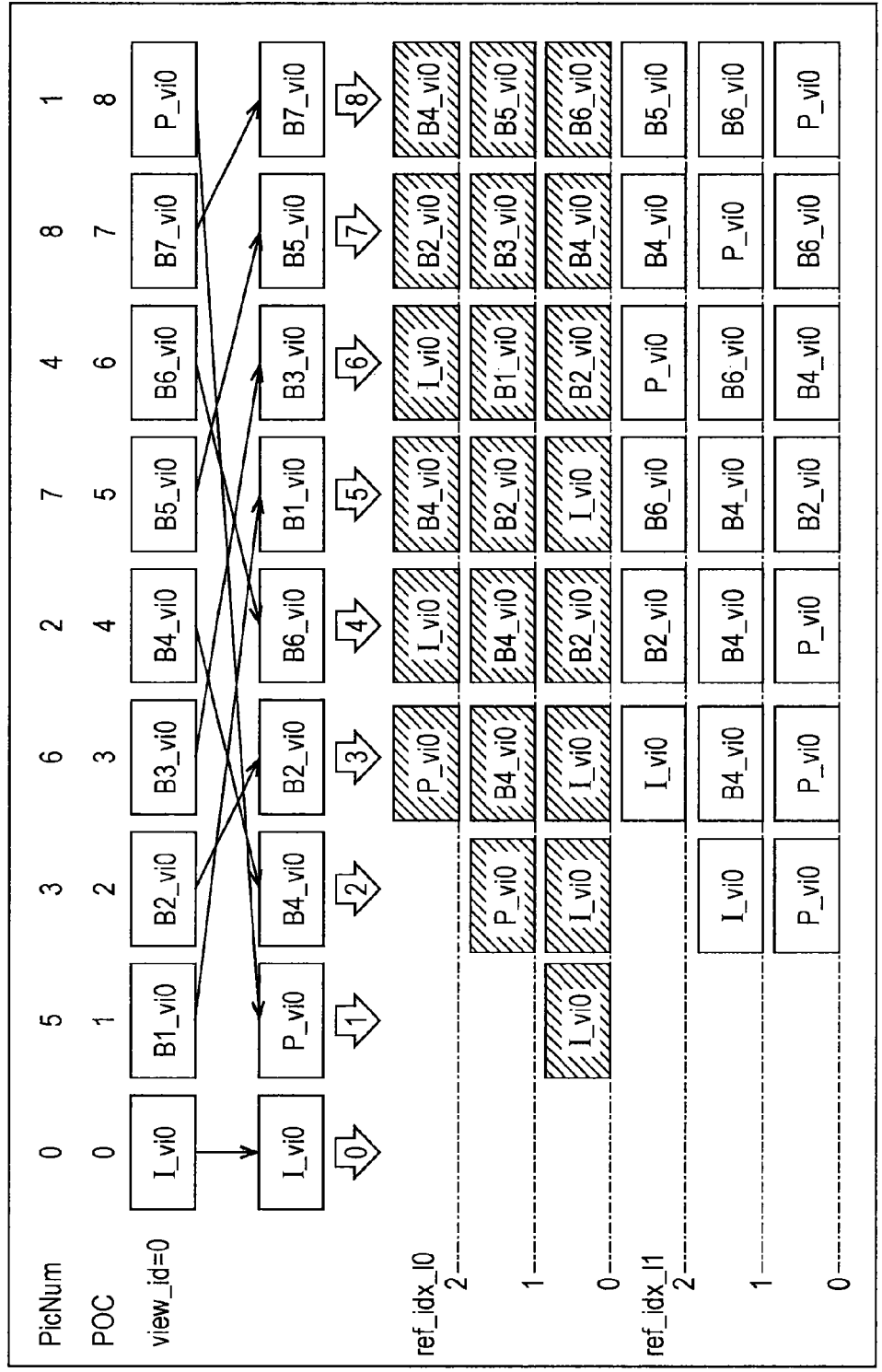
FIG. 2 is a diagram explaining an example of a conventional method of allocating a reference image index.

FIG. 2 is a diagram showing an example of a conventional method of allocating a reference image index. In the example of FIG. 2, PicNum represents indexes of decoding order, POC represents indexes of time (output order of pictures), and the squares represent pictures.

Note that the example of FIG. 2 is an example within the same (View_id=0) view. The example of FIG. 2 shows, from the top, pictures arranged in the POC order, pictures arranged in the decoding order, and reference pictures to which the reference image indexes are allocated used in decoding the pictures arranged in the decoding order. Further, in the example of FIG. 2, as the reference image index, ref_idx_l0=0 to 2 are indicated with respect to the list L0, and ref_idx_l1=0 to 2 are indicated with respect to the list L1.

Hereinafter, description will be given in the decoding order from the left. I_vi0, which is zeroth in POC (output order), represents an I-picture of view_id=0, and is zeroth in PicNum (decoding order). Since I_vi0 is an I-picture, the image is not referred, as indicated by the arrow to which 0 is attached.

P_vi0, which is eighth in POC (output order), represents a P-picture of view_id=0, and is first in PicNum (decoding order). P_vi0 is a P-picture, and only I_vi0 has been decoded so far. Therefore, as indicated by the arrow to which 1 is attached, ref_idx_l0=0, which is the reference image index to the list L0, is allocated to I_vi0.

B4_vi0, which is fourth in POC (output order), represents a B-picture of view_id=0, and is second in PicNum (decoding order). B4_vi0 is a B-picture, and only I_vi0 and P_vi0 have been decoded. Therefore, as indicated by the arrow to which 2 is attached, ref_idx_l0=0, which is the reference image index to the list L0, is allocated to I_vi0, and ref_idx_l0=1 is allocated to P_vi0. Further, ref_idx_l1=0, which is the reference image index to the list L1, is allocated to P_vi0, and ref_idx_l1=1 is allocated to I_vi0.

B2_vi0, which is second in POC (output order), represents a B-picture of view_id=0, and is third in PicNum (decoding order). B2_vi0 is a B-picture, and I_vi0, P_vi0, and B4_vi0 have been decoded. Therefore, as indicated by the arrow to which 3 is attached, ref_idx_l0=0, which is the reference image index to the list L0, is allocated to I_vi0, ref_idx_l0=1 is allocated to B4_vi0, and ref_idx_l0=2 is allocated to P_vi0. Further, ref_idx_l1=0, which is the reference image index to the list L1, is allocated to P_vi0, ref_idx_l1=1 is allocated to B4_vi0, and ref_idx_l1=2 is allocated to I_vi0.

B6_vi0, which is sixth in POC (output order), represents a B-picture of view_id=0, and is fourth in PicNum (decoding order). B6_vi0 is a B-picture, and I_vi0, P_vi0, B4_vi0, and B2_vi0 have been decoded. Therefore, as indicated by the arrow to which 4 is attached, ref_idx_l0=0, which is the reference image index to the list L0, is allocated to B2_vi0, ref_idx_l0=1 is allocated to B4_vi0, and ref_idx_l0=2 is allocated to I_vi0. Further, ref_idx_l1=0, which is the reference image index to the list L1, is allocated to P_vi0, ref_idx_l1=1 is allocated to B4_vi0, and ref_idx_l1=2 is allocated to B2_vi0.

B1_vi0, which is first in POC (output order), represents a B-picture of view_id=0, and is fifth in PicNum (decoding order). B1_vi0 is a B-picture, and I_vi0, P_vi0, B4_vi0, B2_vi0, and B6_vi0 have been decoded. Therefore, as indicated by the arrow to which 5 is attached, ref_idx_l0=0, which is the reference image index to the list L0, is allocated to I_vi0, ref_idx_l0=1 is allocated to B2_vi0, and ref_idx_l0=2 is allocated to B4_vi0. Further, ref_idx_l1=0, which is the reference image index to the list L1, is allocated to B2_vi0, ref_idx_l1=1 is allocated to B4_vi0, and ref_idx_l1=2 is allocated to B6_vi0.

B3_vi0, which is third in POC (output order), represents a B-picture of view_id=0, and is sixth in PicNum (decoding order). B3_vi0 is a B-picture, and I_vi0, P_vi0, B4_vi0, B2_vi0, B6_vi0, and B1_vi0 have been decoded. Therefore, as indicated by the arrow to which 6 is attached, ref_idx_l0=0, which is the reference image index to the list L0, is allocated to B2_vi0, ref_idx_l0=1 is allocated to B1_vi0, and ref_idx_l0=2 is allocated to I_vi0. Further, ref_idx_l1=0, which is the reference image index to the list L1, is allocated to B4_vi0, ref_idx_l1=1 is allocated to B6_vi0, and ref_idx_l1=2 is allocated to P_vi0.

B5_vi0, which is fifth in POC (output order), represents a B-picture of view_id=0, and is seventh in PicNum (decoding order). B5_vi0 is a B-picture, and I_vi0, P_vi0, B4_vi0, B2_vi0, B6_vi0, B1_vi0, and B3_vi0 have been decoded. Therefore, as indicated by the arrow to which 7 is attached, ref_idx_l0=0, which is the reference image index to the list L0, is allocated to B4_vi0, ref_idx_l0=1 is allocated to B3_vi0, and ref_idx_l0=2 is allocated to B2_vi0. Further, ref_idx_l1=0, which is the reference image index to the list L1, is allocated to B6_vi0, ref_idx_l1=1 is allocated to P_vi0, and ref_idx_l1=2 is allocated to B4_vi0.

B7_vi0, which is seventh in POC (output order), represents a B-picture of view_id=0, and is eighth in PicNum (decoding order). B7_vi0 is a B-picture, and I_vi0, P_vi0, B4_vi0, B2_vi0, B6_vi0, B1_vi0, B3_vi0, and B5_vi0 have been decoded. Therefore, as indicated by the arrow to which 8 is attached, ref_idx_l0=0, which is the reference image index to the list L0 is allocated to B6_vi0, ref_idx_l0=1 is allocated to B5_vi0, and ref_idx_l0=2 is allocated to B4_vi0. Further, ref_idx_l1=0, which is the reference image index to the list L1, is allocated to P_vi0, ref_idx_l1=1 is allocated to B6_vi0, and ref_idx_l1=2 is allocated to B5_vi0.

However, the above-described method of allocating a reference image index is processing within the same viewpoint. In contrast, in the case of multi-viewpoint encoding, in H.264/AVC and in HEVC, after the reference image indexes are allocated to all reference images in the time direction, the reference image indexes are allocated to the reference images in the view direction. Then, if it is desired to change the reference image index because the encoding efficiency of the allocated reference image index is low, a change command is transmitted in each case, and the transmission itself is a cause of a decrease in encoding efficiency.

To improve the encoding efficiency, a default method of allocating a reference image index in the case of multi-viewpoint encoding will be herein described.

Figure 3:
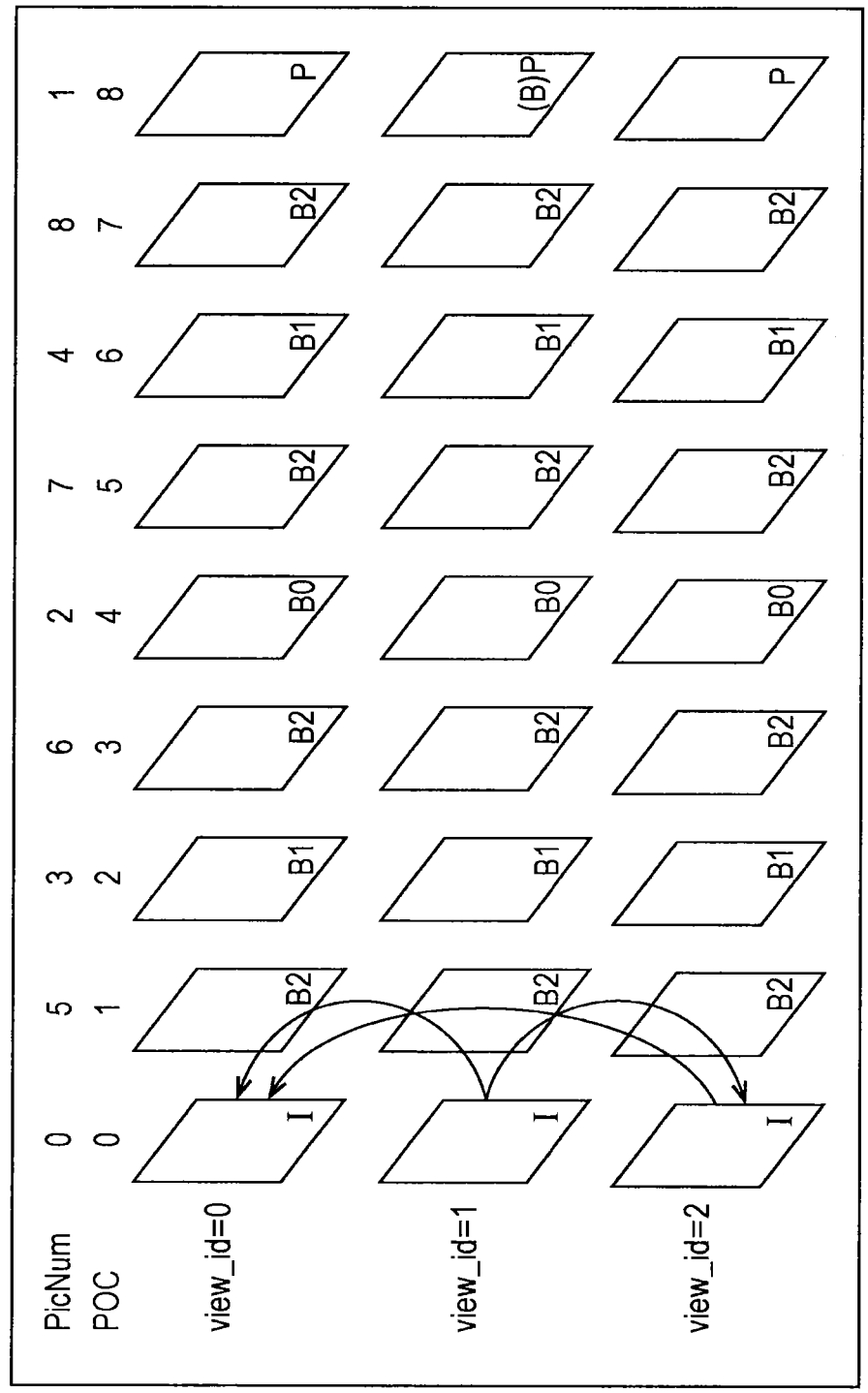
FIG. 3 is a diagram showing an example of a reference relationship among views in a case of a three-viewpoint image.

FIG. 3 is a diagram showing an example of a reference relationship among views in a case of three-viewpoint image. The example of FIG. 3 shows an I-picture, a B2-picture, a B1-picture, a B2-picture, a B0-picture, a B2-picture, a B1-picture, a B2-picture, and a P-picture in ascending order of POC (that is, in ascending order of time information) from the left. Indexes of PicNum are also shown above the indexes of POC.

In addition, from the top, pictures of a view 0 (View_id_0), a view 1 (View_id_1), and a view 2 (View_id_2) that have the same time information and different disparity information are shown.

The example of FIG. 3 shows a case in which the view 0, the view 2, and the view 1 are decoded in that order.

The view 0 is called base view, and an image thereof can be encoded using time prediction. The view 1 and the view 2 are called non-base view, and images thereof can be encoded using time prediction and disparity prediction.

In disparity prediction, the image of the view 1 can refer to encoded images of the view 0 and the view 2, as indicated by the arrows. Accordingly, the P-picture, in which the view 1 is eighth in POC, is the P-picture in time prediction, but becomes the B-picture in disparity prediction.

In disparity prediction, the image of the view 2 can refer to an encoded image of the view 0, as indicated by the arrow.

In the three-viewpoint image of FIG. 3, decoding is performed such that, first, the image of the base view is decoded, the images of other views of the same time are all decoded, and then decoding of the image of the base view of the next time (PicNum) is started.

Here, it is often the case that a reference image having a high reference rate is typically a reference image temporally closest to the image to be predicted, and an image of the same time as the predicted image and of a different view from the predicted image, among the reference images.

In light of the foregoing, in the image encoding device 100, allocation of the reference image indexes like below is performed by default with respect to the three-viewpoint image.

The reference image index allocation unit 122 refers to the time information and the view information of the decoded image, and the time information and the view information of the reference image, and performs allocation of a reference image index to a referable image. Here, the time information is POC and PicNum. The view information is a view ID and view reference information of a sequence parameter described below.

The reference image index allocation unit 122 sequentially allocates smaller reference image indexes from the same view to different views, and allocates smaller reference image indexes to reference images closer to the time of the decoded image.

As a method of the allocation, the reference image index allocation unit 122 alternately allocates the reference image indexes to a reference image of the same view and of a different time and to a reference image of the same time and of a different view. Note that the reference image indexes may be allocated to a plurality of views of the same time in succession.

When decoding an image of the view 1, the reference image index allocation unit 122 treats the images of the view 0 and the view 2 of the same time, and images of all views of past times as referable images.

Further, when decoding the image of the view 1, the reference image index allocation unit 122 treats the images of the view 1 and the view 0 of the same time as the reference images with respect to the list L0, and images of the view 1 and the view 2 of the same time as the reference images with respect to the list L1. Then, in either case, the reference image indexes are alternately allocated to a reference image of the same view and a different time and to a reference image of the same time and a different view. Note that, the order of the reference images in a view is ascending order of POC in the forward direction with respect to the list L0, and is descending order of POC in the backward direction with respect to the list L1. In the case of a P-picture, the order is decoding order.

For example, with respect to the list L0, the reference image index allocation unit 122 first allocates the reference image index=0 to a reference image of the same view (view 1) and having the closest temporal distance in the past times. Next, the reference image index allocation unit 122 allocates the reference image index=1 to a reference image of the view 0 and the same time. Further, the reference image index allocation unit 122 allocates the reference image index=2 to a reference image of the same view (view 1) and having the next closest temporal distance. Next, the reference image index allocation unit 122 allocates the reference image index=3 to a reference image of the view 0 and having the next closest temporal distance. This repetition is performed as needed for the reference image index=4 and subsequent indexes.

Further, with respect to the list L1, the reference image index allocation unit 122 first allocates the reference image index=0 to a reference image of the same view (view 1) and having the closest temporal distance in the past times. Next, the reference image index allocation unit 122 allocates the reference image index=1 to a reference image of the view 2 and the same time. Further, the index allocation unit 122 allocates the reference image index=2 to a reference image of the same view (view 1) and having the next closest temporal distance. Next, the reference image index allocation unit 122 allocates the reference image index=3 of the view 2 and having the next closest temporal distance. Following that, the repetition is performed as needed for the reference image index=4 and subsequent indexes.

Note that, hereinafter, a reference image of the same view and a different time will also be referred to as a referable image in a time direction, and a reference image of the same time and a different view will also be referred to as a referable image in a view direction.

On the basis of the method of allocating reference image indexes in a case of a three-viewpoint image described above, an example of FIG. 4 will be described.

Figure 4:
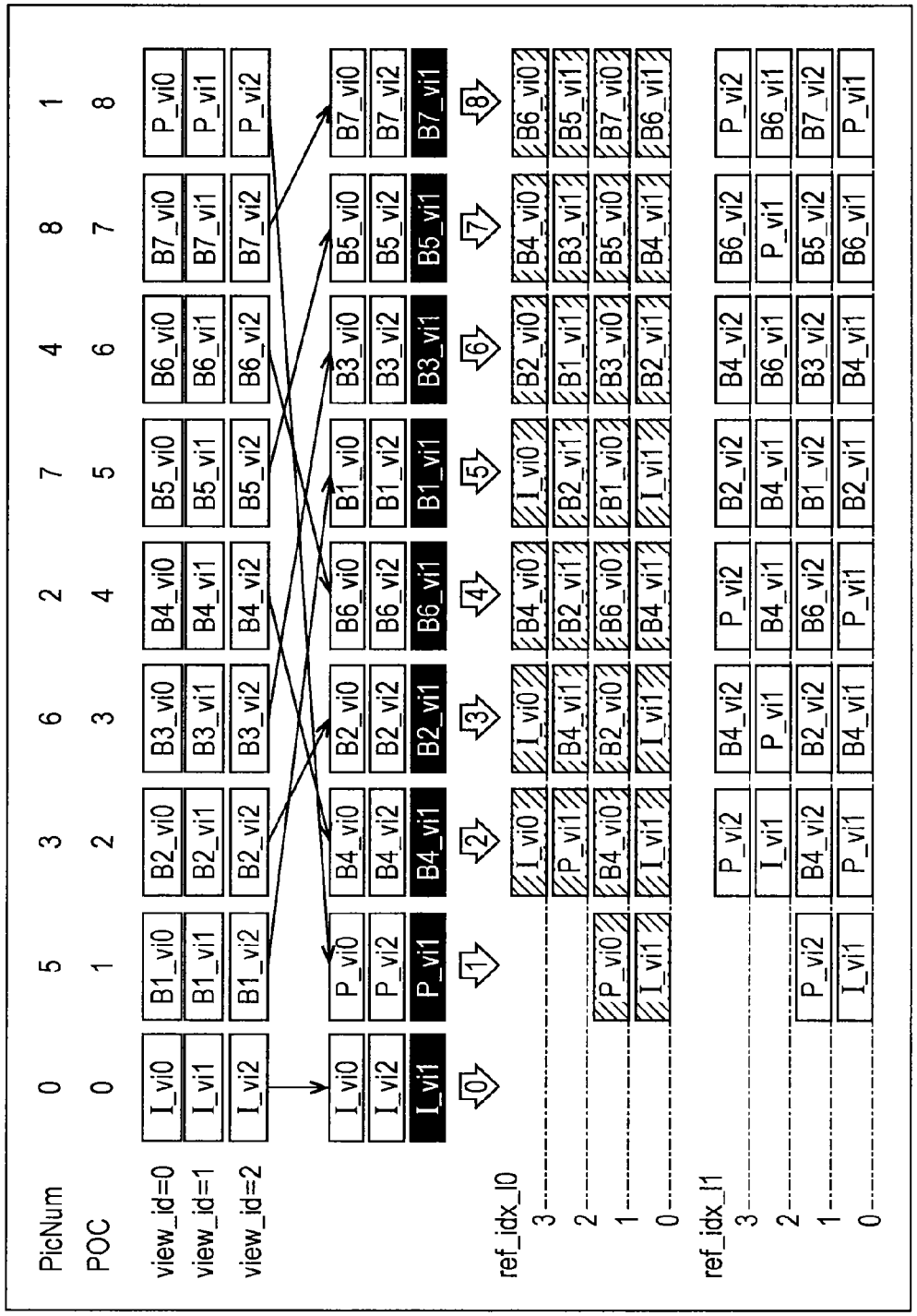
FIG. 4 is a diagram showing an example of a method of allocating a reference image index in a case of a three-viewpoint image.

FIG. 4 is a diagram showing an example of a method of allocating reference image indexes by the reference image index allocation unit 122. In the example of FIG. 4, PicNum represents indexes of decoding order, POC represents indexes of time (output order of pictures), and the squares represent pictures.

Note that the example of FIG. 4 is an example of a three-viewpoint picture of a view 0 (View_id_0), a view 1 (View_id_1), and a view 2 (View_id_2), and decoding of the three views is performed in the order of the view 0, the view 2, and the view 1.

In the example of FIG. 4, from the top, three-viewpoint pictures arranged in the POC order, three-viewpoint pictures arranged in the decoding order, and reference pictures to which the reference image indexes used in decoding the pictures (decoding order) of the view are allocated are shown. Further, in the example of FIG. 4, as the reference image index, ref_idx_10=0 to 3 are shown with respect to a list L0, and ref_idx_11=0 to 3 are shown with respect to a list L1.

Hereinafter, an example of decoding images of the view 1 shown by black squares with white characters will be described in decoding order from the left. I_vi1, which is zeroth in POC (output order), represents an I-picture of view_id=1, and is zeroth in PicNum (decoding order). Since I_vi1 is an I-picture, the image is not referred, as indicated by the arrow to which 0 is attached.

P_vi1, which is eighth in POC (output order), represents a P-picture of view_id=1, and is first in PicNum (decoding order). P_vi1 is a P-picture, and I_vi0, I_vi2, I_vi1, Pvi0, and P_vi2 have been decoded. Note that, as described with reference to FIG. 3, P_vi1 is a B-picture among views.

Therefore, as indicated by the arrow to which 1 is attached, ref_idx_10=0, which is the reference image index to the list L0, is allocated to I_vi1 that is the same view, and ref_idx_10=1 is allocated to P_vi0 that is a different view. Further, ref_idx_11=0, which is the reference image index to the list L1, is allocated to I_vi1 that is the same view, and ref_idx_11=1 is allocated to P_vi2 that is a different view.

B4_vi1, which is fourth in POC (output order) represents a B-picture of view_id=1, and is second in PicNum (decoding order). B4_vi1 is a B-picture, and I_vi0, I_vi2, I_vi1, Pvi0, P_vi2, P_vi1, B4_vi0, and B4_vi2 have been decoded.

Therefore, as indicated by the arrow to which 2 is attached, ref_idx_10=0, which is the reference image index to the list L0, is allocated to I_vi1 that is the same view, and ref_idx_10=1 is allocated to B4_vi0 that is a different view. Next, ref_idx_10=2 is allocated to P_vi1 that is the same view, and ref_idx_10=3 is allocated to I_vi0 that is a different view.

Further, ref_idx_11=0, which is the reference image index to the list L1, is allocated to P_vi1 that is the same view, and ref_idx_11=1 is allocated to B4_vi2 that is a different view. Next, ref_idx_11=2 is allocated to I_vi1 that is the same view, and ref_idx_11=3 is allocated to P_vi2 that is a different view.

B2_vi1, which is second in POC (output order), represents a B-picture of view_id=1, and is third in PicNum (decoding order). B2_vi1 is a B-picture, and I_vi0, I_vi2, I_vi1, Pvi0, P_vi2, P_vi1, B4_vi0, B4_vi2, B4_vi1, B2_vi0, and B2_vi2 have been decoded.

Therefore, as indicated by the arrow to which 3 is attached, ref_idx_10=0, which is the reference image index to the list L0, is allocated to I_vi1 that is the same view, and ref_idx_10=1 is allocated to B2_vi0 that is a different view. Next, ref_idx_10=2 is allocated to B4_vi1 that is the same view, and ref_idx_10=3 is allocated to I_vi0 that is a different view.

Further, ref_idx_11=0, which is the reference image index to the list L1, is allocated to B4_vi1 that is the same view, and ref_idx_l1=1 is allocated to B2_vi2 that is a different view. Next, ref_idx_l1=2 is allocated to P_vi1 that is the same view, and ref_idx_l0=3 is allocated to B4_vi2 that is a different view.

B6_vi1, which is sixth in POC (output order), represents a B-picture of view_id=1, and is fourth in PicNum (decoding order). B6_vi1 is a B-picture, and I_vi0, I_vi2, I_vi1, Pvi0, P_vi2, P_vi1, B4_vi0, B4_vi2, B4_vi1, B2_vi0, B2_vi2, B2_vi1, B6_vi0, and B6_vi2 have been decoded.

Therefore, as indicated by the arrow to which 4 is attached, ref_idx_l0=0, which is the reference image index to the list L0, is allocated to B4_vi1 that is the same view, and ref_idx_l0=1 is allocated to B6_vi0 that is a different view. Next, ref_idx_l0=2 is allocated to B2_vi1 that is the same view, and ref_idx_l0=3 is allocated to B4_vi0 that is a different view.

Further, ref_idx_l1=0, which is the reference image index to the list L1, is allocated to P_vi1 that is the same view, and ref_idx_l1=1 is allocated to B6_vi2 that is a different view. Next, ref_idx_l1=2 is allocated to B4_vi1 that is the same view, and ref_idx_l0=3 is allocated to P_vi2 that is a different view.

B1_vi1, which is first in POC (output order), represents a B-picture of view_id=1, and is fifth in PicNum (decoding order). B1_vi1 is a B-picture, and I_vi0, I_vi2, I_vi1, Pvi0, P_vi2, P_vi1, B4_vi0, B4_vi2, B4_vi1, B2_vi0, B2_vi2, B2_vi1, B6_vi0, B6_vi2, B6_vi1, B1_vi0, and B1_vi2 have been decoded.

Therefore, as indicated by the arrow to which 5 is attached, ref_idx_l0=0, which is the reference image index to the list L0, is allocated to I_vi1 that is the same view, and ref_idx_l0=1 is allocated to B1_vi0 that is a different view. Next, ref_idx_l0=2 is allocated to B2_vi1 that is the same view, and ref_idx_l0=3 is allocated to I_vi0 that is a different view.

Further, ref_idx_l1=0, which is the reference image index to the list L1, is allocated to B2_vi1 that is the same view, and ref_idx_l1=1 is allocated to B1_vi2 that is a different view. Next, ref_idx_l1=2 is allocated to B4_vi1 that is the same view, and ref_idx_l0=3 is allocated to B2_vi2 that is a different view.

B3_vi1, which is third in POC (output order), represents a B-picture of view_id=1, and is sixth in PicNum (decoding order). B1_vi1 is a B-picture, and I_vi0, I_vi2, I_vi1, Pvi0, P_vi2, P_vi1, B4_vi0, B4_vi2, B4_vi1, B2_vi0, B2_vi2, B2_vi1, B6_vi0, B6_vi2, B6_vi1, B1_vi0, B1_vi2, B1_vi1, B3_vi0, and B3_vi2 have been decoded.

Therefore, as indicated by the arrow to which 6 is attached, ref_idx_l0=0, which is the reference image index to the list L0, is allocated to B2_vi1 that is the same view, and ref_idx_l0=1 is allocated to B3_vi0 that is a different view. Next, ref_idx_l0=2 is allocated to B1_vi1 that is the same view, and ref_idx_l0=3 is allocated to B2_vi0 that is a different view.

Further, ref_idx_l1=0, which is the reference image index to the list L1, is allocated to B4_vi1 that is the same view, and ref_idx_l1=1 is allocated to B3_vi2 that is a different view. Next, ref_idx_l1=2 is allocated to B6_vi1 that is the same view, and ref_idx_l0=3 is allocated to B4_vi2 that is a different view.

B5_vi1, which is fifth in POC (output order), represents a B-picture of view_id=1, and is seventh in PicNum (decoding order). B5_vi1 is a B-picture, and I_vi0, I_vi2, I_vi1, Pvi0, P_vi2, P_vi1, B4_vi0, B4_vi2, B4_vi1, B2_vi0, B2_vi2, B2_vi1, B6_vi0, B6_vi2, B6_vi1, B1_vi0, B1_vi2, B1_vi1, B3_vi0, B3_vi2, B3_vi1, B5_vi0, and B5_vi2 have been decoded.

Therefore, as indicated by the arrow to which 7 is attached, ref_idx_l0=0, which is the reference image index to the list L0, is allocated to B4_vi1 that is the same view, and ref_idx_l0=1 is allocated to B5_vi0 that is a different view. Next, ref_idx_l0=2 is allocated to B3_vi1 that is the same view, and ref_idx_l0=3 is allocated to B4_vi0 that is a different view.

Further, ref_idx_l1=0, which is the reference image index to the list L1, is allocated to B6_vi1 that is the same view, and ref_idx_l1=1 is allocated to B5_vi2 that is a different view. Next, ref_idx_l1=2 is allocated to P_vi1 that is the same view, and ref_idx_l0=3 is allocated to B6_vi2 that is a different view.

B7_vi1, which is seventh in POC (output order), represents a B-picture of view_id=1, and is eighth in PicNum (decoding order). B7_vi1 is a B-picture, and I_vi0, I_vi2, I_vi1, Pvi0, P_vi2, P_vi1, B4_vi0, B4_vi2, B4_vi1, B2_vi0, B2_vi2, B2_vi1, B6_vi0, B6_vi2, B6_vi1, B1_vi0, B1_vi2, B1_vi1, B3_vi0, B3_vi2, B3_vi1, B5_vi0, B5_vi2, B5_vi1, B7_vi0, and B7_vi2 have been decoded.

Therefore, as indicated by the arrow to which 8 is attached, ref_idx_l0=0, which is the reference image index to the list L0, is allocated to B6_vi1 that is the same view, and ref_idx_l0=1 is allocated to B7_vi0 that is a different view. Next, ref_idx_l0=2 is allocated to B5_vi1 that is the same view, and ref_idx_l0=3 is allocated to B6_vi0 that is a different view.

Further, ref_idx_l1=0, which is the reference image index to the list L1, is allocated to P_vi1 that is the same view, and ref_idx_l1=1 is allocated to B7_vi2 that is a different view. Next, ref_idx_l1=2 is allocated to B6_vi1 that is the same view, and ref_idx_l0=3 is allocated to P_vi2 that is a different view.

As described above, the reference image indexes are alternately allocated to the referable images in the time direction and to the referable images in the view direction. Accordingly, a smaller reference image index is allocated to a reference image having a higher reference rate. As a result, the encoding efficiency can be improved.

That is, the smaller the reference image index, the smaller the coding amount. Therefore, a smaller index is allocated to a reference image having a higher reference rate, and therefore, the overall coding amount can be made small.

Further, the reference image index can be freely changed by transmission of a change command of the reference image index. At that time, it is necessary to encode change command information.

Meanwhile, by using the above-described method of allocating reference image indexes as default, there are more chances where the reference image indexes are appropriately allocated, and less chances where the change command is transmitted. Accordingly, the encoding efficiency can be further improved.

FIG. 5 is a diagram showing an example of syntax of a sequence parameter set. The figures on the left end of the rows are row numbers that are attached for illustrative purpose.

In the example FIG. 5, max_num_ref_frames is set in 21st row. The max_num_ref_frames is the maximum value (the number) of reference images in this stream. With this, the reference image index allocation unit 122 recognizes the number of allocatable reference images.

The view reference information is written in the 31st to 38th rows. For example, the view reference information is configured from a total number of views, identifiers of views, the number of disparity prediction in the list L0, identifiers of reference views in the list L0, the number of disparity prediction in the list L1, and identifiers of reference views in the list L1.

To be specific, num_views is set in the 31st row. The num_views is the total number of views included in the stream.

view_id[i] is set in the 33rd row. The view_id[i] is an identifier for distinguishing the views.

num_ref_views_10[i] is set in the 34th row. The num_ref_views_10[i] is the number of disparity prediction in the list L0. For example, when "num_ref_views_10[i]" indicates 2, it is indicated that two views are referable in the list L0.

ref_view_id_10[i][j] is set in the 35th row. The ref_view_id_10[i][j] is an identifier of a view to be referred in disparity prediction in the list L0. For example, when "num_ref_views_10[i]" indicates 2 even if there are three views, the "ref_view_id_10[i][j]" is set for identifying which two views among the three views are be referred by the list L0.

num_ref_views_11[i] is set in the 36th row. The num_ref_views_11[i] is the number of disparity prediction in the list L1. For example, when the "num_ref_views_11[i]" indicates 2, it is indicated that only two views are referable in the list L1.

ref_view_id_11[i][j] is set in the 37th row. The ref_view_id_11[i][j] is an identifier of a view to be referred in disparity prediction in the list L1. For example, when "num_ref_views_11[i]" indicates 2 even if there are three views, the "ref_view_id_11[i][j]" is set for identifying which two views among the three views are to be referred by the list L1.

FIG. 6 is a diagram showing an example of syntax of slice header. The figures on the left end of the rows are row numbers that are attached for illustrative purpose.

In the example of FIG. 6, slice_type is set in the 5th row. The slice_type indicates the slice is which of an I-slice, a P-slice, and a B-slice.

view_id is set in the 8th row. The view_id is an ID for identifying a view. With this, the reference image index allocation unit 122 can identify the view.

pic_order_cnt_lsb is set in the 12th row. The pic_order_cnt_lsb is time information (that is, POC: Picture Order Count).

num_ref_idx_active_override_flag is set in the 14th row. The num_ref_idx_active_override_flag is a flag indicating whether the effective number of the reference image indexes is changed from default. When the flag is 1, setting in the 16th and the 17th rows becomes effective. Note that a default effective number of the reference image indexes is set in the picture parameter set (not shown), and when the flag is 0, the default value becomes effective.

num_ref_idx_10_active_minus1 is set in the 16th row. The num_ref_idx_10_active_minus1 indicates the effective number of the reference image indexes in the list L0 when the flag of the 15th row is 1.

num_ref_idx_11_active_minus1 is set in the 17th row. The num_ref_idx_11_active_minus1 indicates the slice type of the 5th row is the B slice, and indicates the effective number of the reference image indexes in the list L1 when the flag of the 15th row is 1.

[Flow of Encoding Process]

Next, flows of each process performed by the image encoding device 100 as described above will be described. First, an example of a flow of an encoding process will be described with reference to the flowchart of FIG. 7.

In step S101, the A/D converter 101 performs A/D conversion on an input image. In step S102, the frame reordering buffer 102 stores the image obtained by the A/D conversion and reorders each picture in display order into encoding order.

In step S103, the syntax processing unit 121 sequentially confirms data of the image read out from the frame reordering buffer 102, and inserts header information in the data of the image. The syntax processing unit 121 supplies an image to which the header information and the like are inserted to the arithmetic operation unit 103, the intra predictor 114, and the motion estimator/compensator 115. In addition, the syntax processing unit 121 supplies the information such as the sequence parameter set and the slice header to the reference image index allocation unit 122.

In step S104, the arithmetic operation unit 103 calculates a difference between the image supplied from the syntax processing unit 121 and the predicted image. The predicted image is supplied to the arithmetic operation unit 103 through the selector 116 from the motion estimator/compensator 115 when inter prediction is performed, and from the intra predictor 114 when intra prediction is performed.

The difference data is reduced in the data amount as compared to the original image data. Accordingly, the data amount can be made smaller as compared to a case in which images are directly encoded.

In step S105, the orthogonal transformer 104 performs orthogonal transform on the difference information generated by the processing in step S104. Specifically, orthogonal transform such as discrete cosine transform or Karhunen-Loeve transform is performed and a transform coefficient is output.

In step S106, the quantizer 105 quantizes the orthogonal transform coefficient obtained by the processing in step S105.

The difference information quantized by the processing in step S106 is locally decoded as follows. In step S107, the inverse quantizer 108 performs inverse quantization on the quantized orthogonal transform coefficient (also referred to as a quantized coefficient) generated by the processing in step S106 with characteristics corresponding to those of the quantizer 105.

In step S108, the inverse orthogonal transformer 109 performs inverse orthogonal transform on the orthogonal transform coefficient obtained by the processing in step s107 with characteristics corresponding to those of the orthogonal transformer 104.

In step S109, the arithmetic operation unit 110 adds the predicted image to the locally decoded difference information to generate a locally decoded image (an image corresponding to an input to the arithmetic operation unit 103).

In step S110, the deblocking filter 111 performs a deblocking filter process on the image generated by the processing of step S109. Accordingly, block distortion is removed.

In step S111, the decoded picture buffer 112 stores the image from which the block distortion has been removed by the processing of step S110. Note that an image that has not been subjected to the filtering process by the deblocking filter 111 is supplied to the decoded picture buffer 112 from the arithmetic operation unit 110 and stored therein.

In step S112, the intra predictor 114 performs an intra prediction process in the intra prediction mode.

In step S113, the reference image index allocation unit 122 performs an allocation process of the reference image indexes. Details of the allocation process of the reference image indexes will be described with reference to FIG. 8.

The reference image index allocation unit 122 supplies the allocated reference image indexes to the motion estimator/compensator 115.

In step S114, the motion estimator/compensator 115 performs an inter motion disparity prediction process that performs motion disparity prediction or motion disparity compensation in an inter prediction mode using the reference image of the reference image index allocated by the processing of step S113.

In step S115, the selector 116 determines an optimum prediction mode based on cost function values output from the intra predictor 114 and the motion estimator/compensator 115. That is, the selector 116 selects either a predicted image generated by the intra predictor 114 or a predicted image generated by the motion estimator/compensator 115.

Further, selection information indicating either predicted image has been selected is supplied to the one of the intra predictor 114 and the motion estimator/compensator 115, the predicted image of which has been selected. When a predicted image of an optimum intra prediction mode is selected, the intra predictor 114 supplies information indicating the optimum intra prediction mode (that is, intra prediction mode information) to the lossless encoder 106.

When a predicted image of an optimum inter prediction mode is selected, the motion estimator/compensator 115 outputs information indicating the optimum inter prediction mode, and information in accordance with the optimum inter prediction mode as needed to the lossless encoder 106. Examples of the information in accordance with the optimum inter prediction mode include motion vector information, disparity vector information, flag information, and reference frame information.

In step S116, the lossless encoder 106 encodes the transform coefficient quantized by the processing in step S106. That is, lossless encoding such as variable-length coding or arithmetic coding is applied to a difference image (in a case of inter prediction, secondary difference image).

The lossless encoder 106 also adds information on the prediction mode of the predicted image selected by the processing in step S115 to the encoded data obtained by encoding the difference image. That is, the lossless encoder 106 adds the intra prediction mode information supplied from the intra predictor 114 or information in accordance with the optimum inter prediction mode supplied from the motion estimator/compensator 115 and the like to the encoded data.

In step S117, the accumulation buffer 107 accumulates the encoded data output from the lossless encoder 106. The encoded data accumulated in the accumulation buffer 107 is read out as necessary and transmitted to the decoding side via a transmission path.

In step S118, the rate controller 117 controls the rate of the quantization operation of the quantizer 105 to prevent overflow or underflow based on the compressed image accumulated in the accumulation buffer 107 by the processing of step S117.

The encoded process is terminated when the processing in step S118 ends.

[Flow of Reference Image Index Allocation Process]

Next, an example of a flow of a reference image index allocation process executed in step S113 of FIG. 7 will be described with reference to the flowchart of FIG. 8. Note that this process is executed only for the case where the decoded image (that is, an image to be predicted) is a P-picture or a B-picture.

Figure 7:
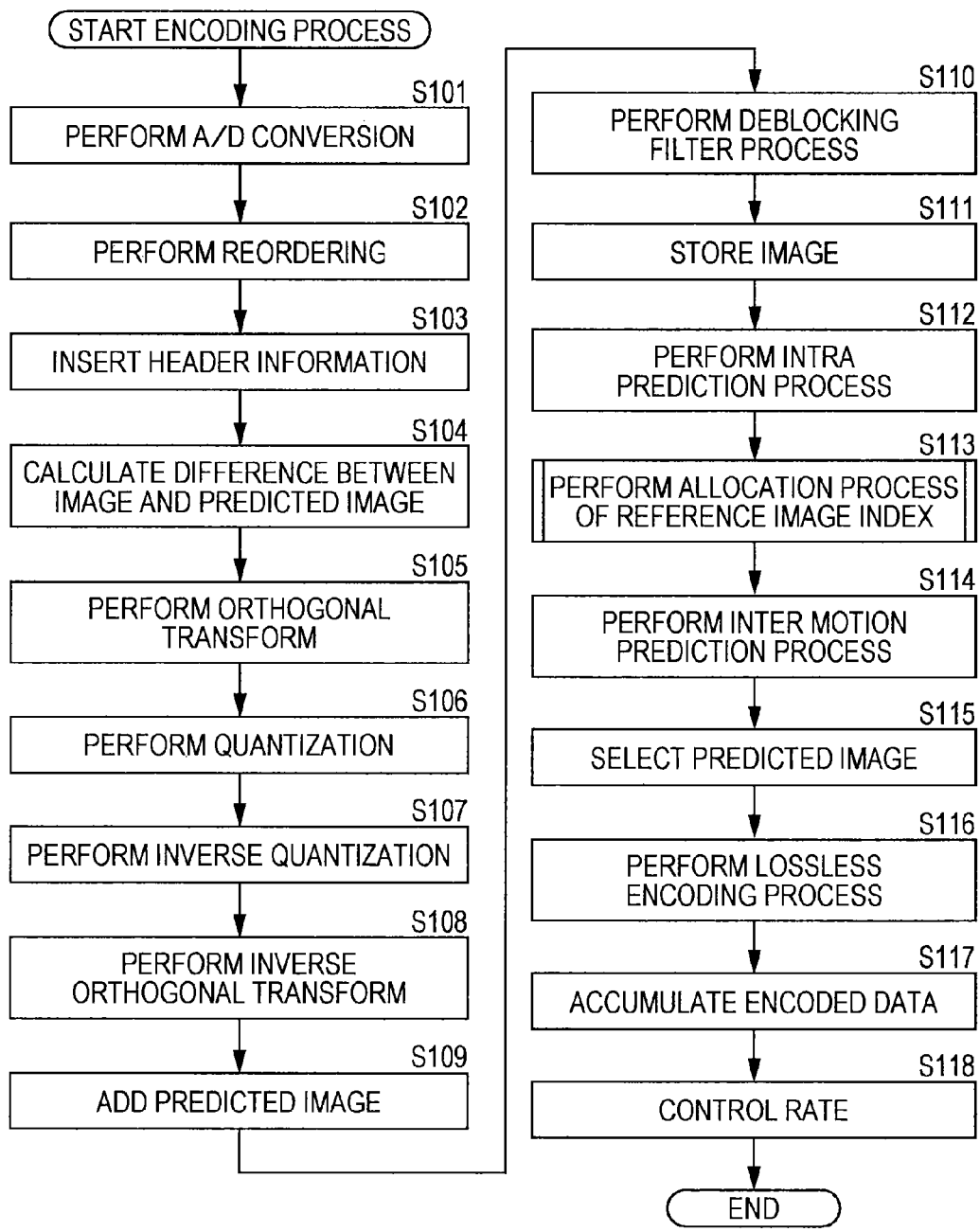
FIG. 7 is a flowchart for explaining an example of a flow of an encoding process.

In the above-described step S103 of FIG. 7, the syntax processing unit 121 supplies the information such as the sequence parameter set and the slice header of the decoded image to the reference image index allocation unit 122.

In step S131, the reference image index allocation unit 122 receives the view reference information of the decoded image. The view reference information is written in the sequence parameter from the syntax processing unit 121, as described with reference to FIG. 5. The reference image index allocation unit 122 can recognizes the number and the identifiers of views to be referred in the list L0 and the list L1 by obtaining the view reference information.

In step S132, the reference image index allocation unit 122 receives the maximum value of the reference images. The maximum value of the reference images is set in the max_num_ref_frames of the sequence parameter described with reference to FIG. 5.

In step S133, the reference image index allocation unit 122 determines whether the picture type of the decoded image is P-picture. The picture type of the decoded image is written in the slice_type of the slice head described with reference to FIG. 6. In step S133, when it is determined that the picture type of the decoded image is P-picture, the processing proceeds to step S134.

Note that, in the following process, the time information and the view information of the reference images from the decoded picture buffer 112 are referred.

In step S134, the reference image index allocation unit 122 allocates one reference image index of the list L0 to a reference image of the same view, to which no reference image index has been allocated, and in the closest decoding order.

In step S135, the reference image index allocation unit 122 allocates one reference image index of the list L0 to a reference image of the same time, to which no reference image index has been allocated, and which has an ID smaller than but closest to the view of the decoded image.

In step S136, the reference image index allocation unit 122 determines whether allocation of the reference image indexes to the reference images of all views of the same time has been completed. In step S136, when it is determined that the allocation of the reference image indexes to the reference images of all views of the same time has not been completed, the processing returns to step S135, and the subsequent processing is repeated.

In step S136, when it is determined that the allocation of the reference image indexes to the reference images of all views of the same time has been completed, the processing proceeds to step S137. In step S137, the reference image index allocation unit 122 determines whether the indexes of the reference images are smaller than the maximum value (the number) of the reference images received in step S132.

In step S137, when it is determined that the indexes of the reference images are smaller than the maximum value of the reference images, the processing returns to step S134, and the subsequent processing is repeated. In step S137, when it is determined that the indexes of the reference images are more than the maximum value of the reference images, there is no reference image to which the index is to be allocated, and therefore, the reference image index allocation process is terminated, and the processing returns to step S113 of FIG. 7.

Meanwhile, in step S133, when it is determined that the picture type of the decoded image is B-picture, the processing proceeds to step S138.

In step S138, the reference image index allocation unit 122 allocates one reference image index of the list L0 to a reference image of the same view, to which no reference image index has been allocated, and in the closest decoding order.

In step S139, the reference image index allocation unit 122 allocates one reference image index of the list L0 to a reference image, to which no reference image index has been allocated, and which has an ID smaller than but closest to the view of the decoded image.

In step S140, the reference image index allocation unit 122 determines whether the allocation of the reference image indexes to the reference images of all view of the same time has been completed. In step S140, when it is determined that the allocation of the reference image indexes to the reference images of all views of the same time has not been completed, the processing returns to step S139, and the subsequent processing is repeated.

In step S140, when it is determined that the allocation of the reference image indexes to the reference images of all views of the same time has been completed, the processing proceeds to step S141. In step S141, the reference image index allocation unit 122 allocates one reference image index of the list L1 to a reference image of the same view, to which no reference image index has been allocated, and in the closest decoding order.

In step S142, the reference image index allocation unit 122 allocates one reference image index of the list L1 to a reference image of the same time, to which no reference image index has been allocated, and which has an ID smaller than but closest to the view of the decoded image.

In step S143, the reference image index allocation unit 122 determines whether the allocation of the reference image indexes to the reference images of all views of the same time has been completed. In step S143, when it is determined that the allocation of the reference image indexes to the reference images of all views of the same time has not been completed, the processing returns to step S142, and the subsequent processing is repeated.

In step S143, when it is determined that the allocation of the reference image indexes to the reference images of all view of the same time has been completed, the processing proceeds to step S144. In step S144, the reference image index allocation unit 122 determines whether the indexes of the reference images are smaller than the maximum value (the number) of the reference images received in step S132.

In step S144, when it is determined that the indexes of the reference images are smaller than the maximum value of the reference images, the processing proceeds to step S138, and the subsequent processing is repeated. In step S144, when it is determined that the indexes of the reference images are the maximum value of the reference images or more, there is no reference image to which the index is to be allocated. Therefore, the reference image index allocation process is terminated, and the processing returns to step S113 of FIG. 7.

Note that the present processing is also terminated when the indexes of the reference images reach the default effective number of the reference image indexes set to the slice header or the picture parameter set before reaching the maximum value of the reference images in steps S137 and S144.

As described above, the reference image indexes are alternately allocated to the reference images in the time direction and to the reference images in the view direction. Accordingly, a smaller reference image index is allocated to a reference image having a higher reference rate. Therefore, the encoding efficiency can be improved.

Figure 8:
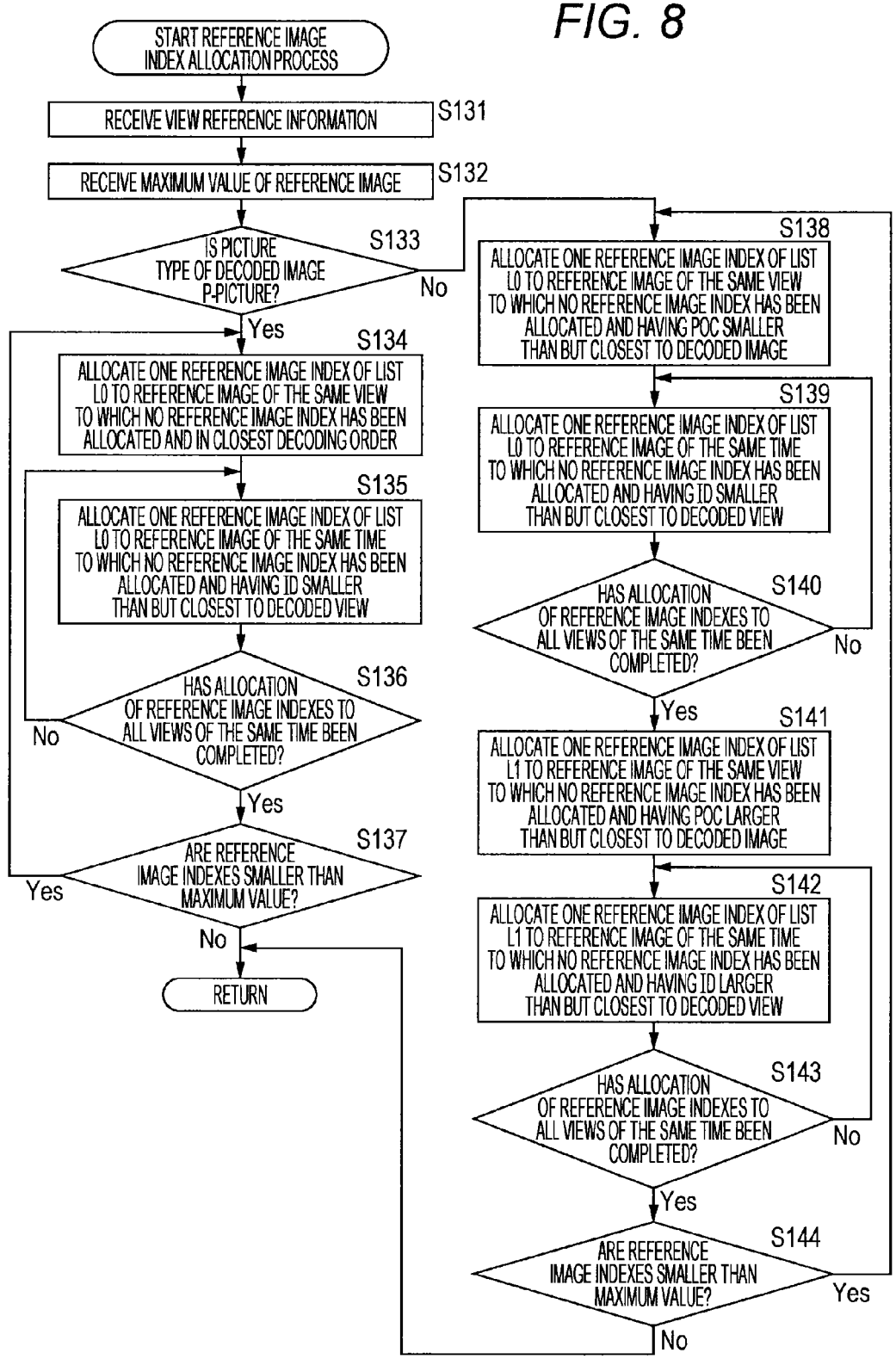
FIG. 8 is a flowchart explaining an example of a flow of a reference image index allocation process.

Note that, in the example of FIG. 8, an example has been described, in which the indexes are allocated to the reference images of all views of the same time, and then the indexes are allocated to the reference images in the next closer decoding order. That is, in the above description, an example has been described, in which successive indexes are allocated to the reference images of all views of the same time, but the allocation is not limited to the example. For example, the indexes may be alternately allocated to a reference image in the time direction and to a reference image in the view direction, one by one.

Alternatively, successive indexes may be allocated only to the views of the number indicated by the view reference information of the sequence parameter set of FIG. 5.

That is, the numbers of disparity prediction in the list L0 and the list L1 are set in "num_ref_views_10" and "num_ref_views_11" in the view reference information of the sequence parameter set. Further, the identifiers of the views to be referred in disparity prediction are set in "ref_view_id_11" and "num_ref_views_10". Therefore, when the indexes is allocated to the reference images in the view direction, successive indexes are allocated only to the views set in the view reference information based on the view reference information.

Further, when the indexes are alternately allocated to a reference image in the time direction and to a reference image in the view direction, the allocation of the indexes may be determined based on the view reference information.

It can be considered that the views indicated by the view reference information have a relatively good correlation among the images, while the views not indicated by the view reference information have a low correlation. Therefore, the encoding efficiency can be further improved using the information for the allocation of the indexes, where the views not indicated by the view reference information are not used as views to be allocated, the view indicated by the view reference information is preferentially allocated, and the like.

Further, in the example of FIG. 8, the indexes have been allocated to the reference images in the time direction first. However, the indexes may be allocated to the reference images in the view direction first, and then the indexes may be allocated to the reference images in the time direction. Again, it is possible to allocate the reference image indexes to all of the reference images in the view direction first, and then to allocate the reference image indexes to the reference images in the time direction. Then, again, the reference images in the view direction may be limited to the views indicated by the view reference information.

Further, the pattern of alternately allocating the indexes to the reference image in the time direction, and to the reference image in the view direction in that order like FIG. 8 is a time direction prioritized pattern. In contrast, the pattern of alternately allocating the indexes to the reference image in the view direction, and to the reference image in the time direction in that order is a view direction prioritized pattern.

It can be structured such that these two patterns are set in advance, and one bit pattern flag that indicates which of the two patterns is selected is transmitted to the decoding side, and the allocation of the indexes is performed in accordance with the flag at the decoding side. This pattern flag may be transmitted for each slice, for example.

For example, a favorable pattern is different depending on the image, such as a still image, or a moving image. Therefore, by transmitting such a pattern selection flag, the encoding efficiency can be improved as compared with a case where the change command is transmitted by an image, for example.

<2. Second Embodiment>
[Image Decoding Device]

Figure 9:
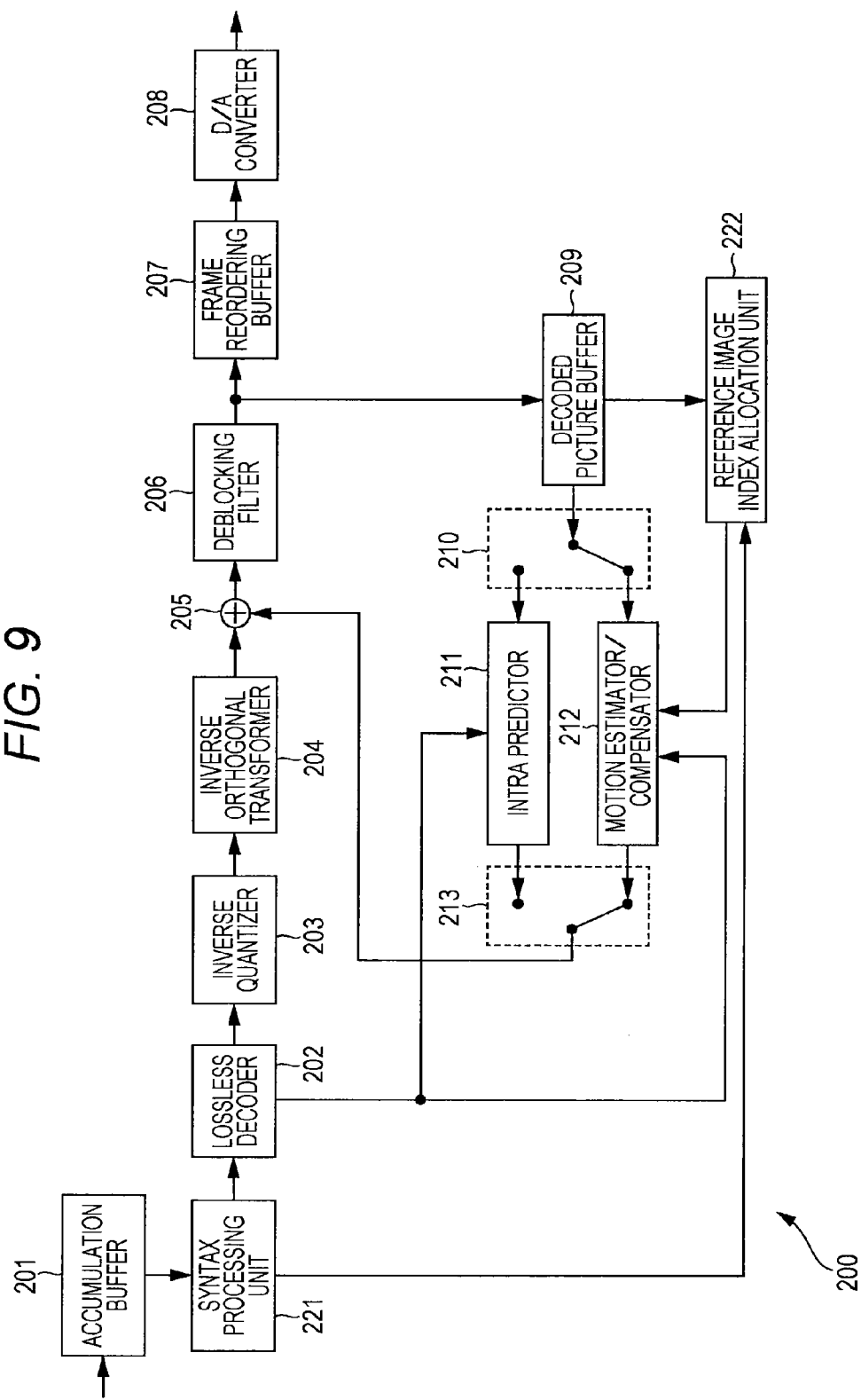
FIG. 9 is a block diagram showing a typical example structure of an image decoding device.

FIG. 9 shows a structure of an embodiment of an image decoding device as an image processing device to which the present disclosure is applied. An image decoding device 200 shown in FIG. 9 is a decoding device corresponding to the image encoding device 100 of FIG. 1.

Encoded data encoded by the image encoding device 100 is transmitted to the image decoding device 200 corresponding to the image encoding device 100 through a predetermined transmission path, and is decoded.

As shown in FIG. 9, the image decoding device 200 includes an accumulation buffer 201, a lossless decoder 202, an inverse quantizer 203, an inverse orthogonal transformer 204, an arithmetic operation unit 205, a deblocking filter 206, a frame reordering buffer 207, and a D/A converter 208. Further, the image decoding device 200 includes a decoded picture buffer 209, a selector 210, an intra predictor 211, a motion estimator/compensator 212, and a selector 213.

Further, the image decoding device 200 includes a syntax processing unit 221 and a reference image index allocation unit 222.

The accumulation buffer 201 accumulates transmitted encoded data. This encoded data has been encoded by the image encoding device 100. The syntax processing unit 221 acquires the sequence parameter set, the picture parameter set, the slice header, and the like from the encoded data read out from the accumulation buffer 201 at a predetermined timing, and supplies the acquired header information to the lossless decoder 202 along with the encoded data. In addition, the syntax processing unit 221 supplies the acquired header information and the like to the reference image index allocation unit 222.

The lossless decoder 202 decodes the encoded data from the syntax processing unit 221 in a format corresponding to the encoding format of the lossless encoder 106 of FIG. 1. The inverse quantizer 203 inversely quantizes coefficient data (quantization coefficient) obtained by being decoded by the lossless decoder 202 in a format corresponding to the quantization format of the quantizer 105 of FIG. 1. That is, the inverse quantizer 203 performs the inverse quantization of the quantization coefficient by a method similar to the inverse quantizer 108 of FIG. 1 using the quantization parameter supplied from the image encoding device 100.

The inverse quantizer 203 supplies the inversely quantized coefficient data, that is, orthogonal transform coefficient to the inverse orthogonal transformer 204. The inverse orthogonal transformer 204 inversely orthogonally transform the orthogonal transform coefficient in a format corresponding to the orthogonal transform format of the orthogonal transformer 104 of FIG. 1, and obtains decoded residual data corresponding to the residual data before the orthogonal transform in the image encoding device 100.

The decoded residual data obtained by the inverse orthogonal transform is supplied to the arithmetic operation unit 205. In addition, a predicted image is supplied to the arithmetic operation unit 205 from the intra predictor 211 or the motion estimator/compensator 212 via the selector 213.

The arithmetic operation unit 205 adds the decoded residual data and the predicted image to obtain decoded image data corresponding to image data before the predicted image is subtracted by the arithmetic operation unit 103 in the image encoding device 100. The arithmetic operation unit 205 supplies the decoded image data to the deblocking filter 206.

The deblocking filter 206 removes block distortion of the decoded image by appropriately performing a deblocking filter process. The deblocking filter 206 supplies a result of the filter process to the frame reordering buffer 207.

The frame reordering buffer 207 performs image reordering. Specifically, the frames reordered into the encoding order by the frame reordering buffer 102 in FIG. 1 are reordered into the original display order. The D/A converter 208 performs a D/A conversion on the image supplied from the frame reordering buffer 207, and outputs the converted image to a display (not shown) to display the image.

Further, the output of the deblocking filter 206 is supplied to the decoded picture buffer 209.

The decoded picture buffer 209, the selector 210, the intra predictor 211, the motion estimator/compensator 212, and the selector 213 respectively correspond to the decoded picture buffer 112, the selector 113, the intra predictor 114, the motion estimator/compensator 115, and the selector 116 of the image encoding device 100.

The selector 210 reads out an image to be subjected to an inter process and an image to be referred from the decoded picture buffer 209, and supplies the images to the motion estimator/compensator 212. In addition, the selector 210 reads out an image to be used for intra prediction from the decoded picture buffer 209, and supplies the image to the intra predictor 211.

The intra predictor 211 is supplied, as necessary, with information indicating the intra prediction mode or the like obtained from the header information, from the lossless decoder 202. The intra predictor 211 generates a predicted image from the reference image acquired from the decoded picture buffer 209 based on the information, and supplies the generated predicted image to the selector 213.

The information (the prediction mode information, the motion vector information, the disparity vector information, the various parameters, and the like) obtained from the header information is supplied to the motion estimator/compensator 212 from the lossless decoder 202. In addition, the reference image indexes allocated by the reference image index allocation unit 222 are supplied to the motion estimator/compensator 212.

The motion estimator/compensator 212 generates a predicted image from the reference image acquired from the decoded picture buffer 209 based on the information supplied from the lossless decoder 202 and the reference image indexes allocated by the reference image index allocation unit 222. The motion estimator/compensator 212 supplies the generated predicted image to the selector 213.

The selector 213 selects the predicted image generated by the motion estimator/compensator 212 or the intra predictor 211, and supplies the predicted image to the arithmetic operation unit 205.

The reference image index allocation unit 222 is basically structured similarly to the reference image index allocation unit 122 of the image encoding device 100. The reference image index allocation unit 222 alternately allocates the indexes of the reference images to be referred by the motion estimator/compensator 212 when predicting an image to be processed to the referable images in the view direction and to the referable images in the time direction. In allocation, the header information such as the sequence parameter set and the slice header from the syntax processing unit 221 is referred as information of the image to be processed. Further, the time information and the view information of the reference images obtained from the header information of the reference image accumulated in the decoded picture buffer 209 are also referred as information of the reference images.

The reference image index allocation unit 222 supplies the allocated reference image indexes to the motion estimator/compensator 212.

[Flow of Decoding Process]

Next, flows of each process performed by the image decoding device 200 as described above will be described. First, an example of a flow of a decoding process will be described with reference to the flowchart of FIG. 10.

When a decoding process is started, in step S201, the accumulation buffer 201 accumulates the transmitted encoded data. In step S202, the syntax processing unit 221 acquires the header information from the encoded data read out from the accumulation buffer 201 at a predetermined timing. The syntax processing unit 221 supplies the acquired header information and the encoded data to the lossless decoder 202. In addition, the syntax processing unit 221 supplies the acquired header information and the like to the reference image index allocation unit 222.

In step S203, the lossless decoder 202 decodes the encoded data supplied from the syntax processing unit 221. Specifically, I-pictures, P-pictures, and B-pictures encoded by the lossless encoder 106 in FIG. 1 are decoded.

At this time, the motion vector information, the disparity vector information, the reference frame information, the prediction mode information (the intra prediction mode, or the inter prediction mode), and information such as flags and the quantization parameters are acquired from the header information.

When the prediction mode information is the intra prediction mode information, the prediction mode information is supplied to the intra predictor 211. When the prediction mode information is the inter prediction mode information, the motion vector information corresponding to the prediction mode information is supplied to the motion estimator/compensator 212.

In step S204, the inverse quantizer 203 inversely quantizes the quantized orthogonal transform coefficient obtained by being decoded by the lossless decoder 202. In step S205, the inverse orthogonal transformer 204 inversely orthogonally transforms the orthogonal transform coefficient obtained by being inversely quantized by the inverse quantizer 203 by a method corresponding to the orthogonal transformer 104 of FIG. 1. Accordingly, the difference information corresponding to an input of the orthogonal transformer 104 of FIG. 1 (an output of the arithmetic operation unit 103) has been decoded.

In step S206, the arithmetic operation unit 205 adds the predicted image to the difference information obtained by the processing of step S205. Accordingly, the original image data is decoded.

In step S207, the deblocking filter 206 appropriately filters the decoded image obtained by the processing of step S206. Accordingly, block distortion is appropriately removed from the decoded image.

In step S208, the decoded picture buffer 209 stores the filtered decoded image.

In step S209, the reference image index allocation unit 222 performs an allocation process of the reference image indexes. Details of the allocation process of the reference image indexes will be described with reference to FIG. 11. The reference image index allocation unit 222 supplies the allocated reference image indexes to the motion estimator/compensator 212.

In step S210, the intra predictor 211 and the motion estimator/compensator 212 respectively perform image prediction processes in accordance with the prediction mode information supplied from the lossless decoder 202.

That is, when the intra prediction mode information is supplied from the lossless decoder 202, the intra predictor 211 performs an intra prediction process of the intra prediction mode. Further, when the inter prediction mode information is supplied from the lossless decoder 202, the motion estimator/compensator 212 performs a motion disparity prediction compensation process of the inter prediction mode using the reference images of the reference image indexes allocated by the process of step S209.

In step S211, the selector 213 selects a predicted image. That is, the predicted image generated by the intra predictor 211 or the predicted image generated by the motion estimator/compensator 212 is supplied to the selector 213. The selector 213 selects the side from which the predicted image has been supplied, and supplies the predicted image to the arithmetic operation unit 205. The predicted image is added to the difference information by the preprocess of step S206.

In step S212, the frame reordering buffer 207 reorders frames of the decoded image data. That is, the order of the frames of the decoded image data, which has been reordered for encoding by the frame reordering buffer 102 (FIG. 1) of the image encoding device 100, is reordered in original display order.

In step S213, the D/A converter 208 applies D/A conversion to the decoded image data, the frames of which have been reordered in the frame reordering buffer 207. This decoded image data is output to a display (not shown), and an image thereof is displayed. The decoding process is terminated when the processing in step S213 is terminated.

[Flow of Reference Image Index Allocation Process]

Next, an example of a flow of the reference image index allocation process executed in step S209 of FIG. 10 will be described with reference to the flowchart of FIG. 11. Note that this process is executed only when the decoded image is a P-picture or a B-picture. Further, the reference image index allocation process of FIG. 11 is basically similar to the reference image index allocation process of FIG. 8. The effects and conditions of the process of FIG. 8 are also applied to the process of FIG. 11 although such effects and conditions will not be described in order to avoid repetition.

Figure 10:
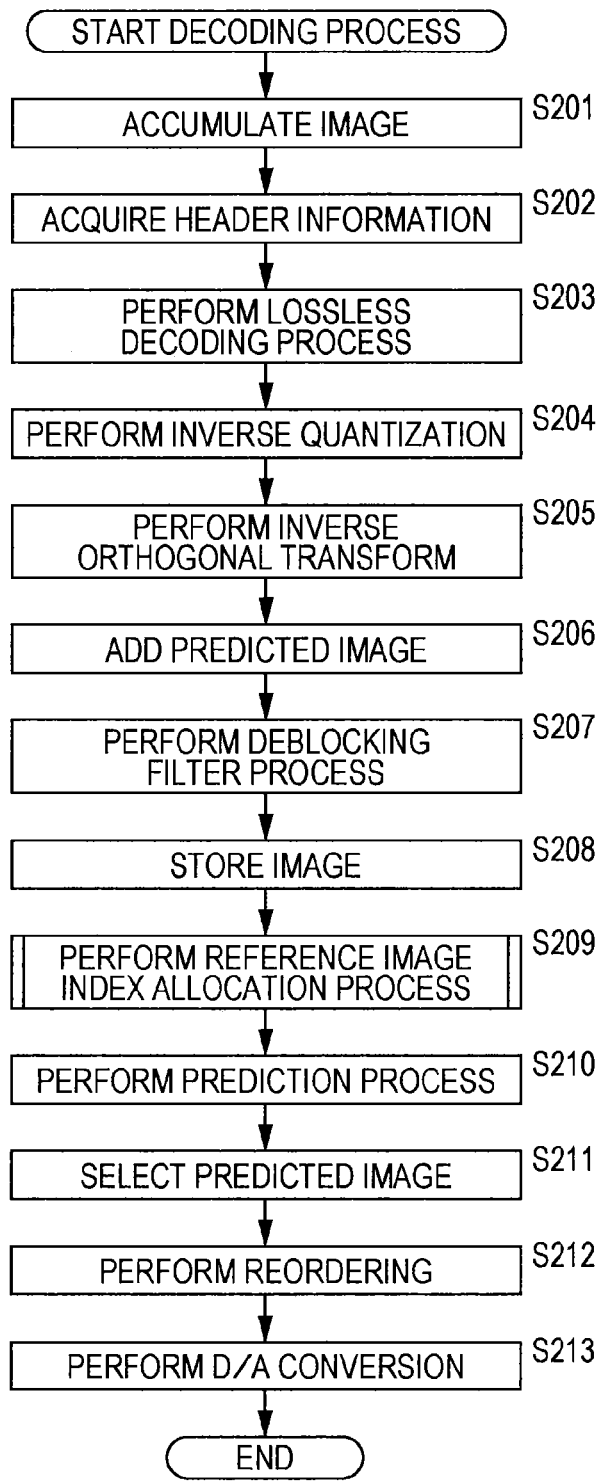
FIG. 10 is a flowchart for explaining an example of a flow of a decoding process.
Figure 11:
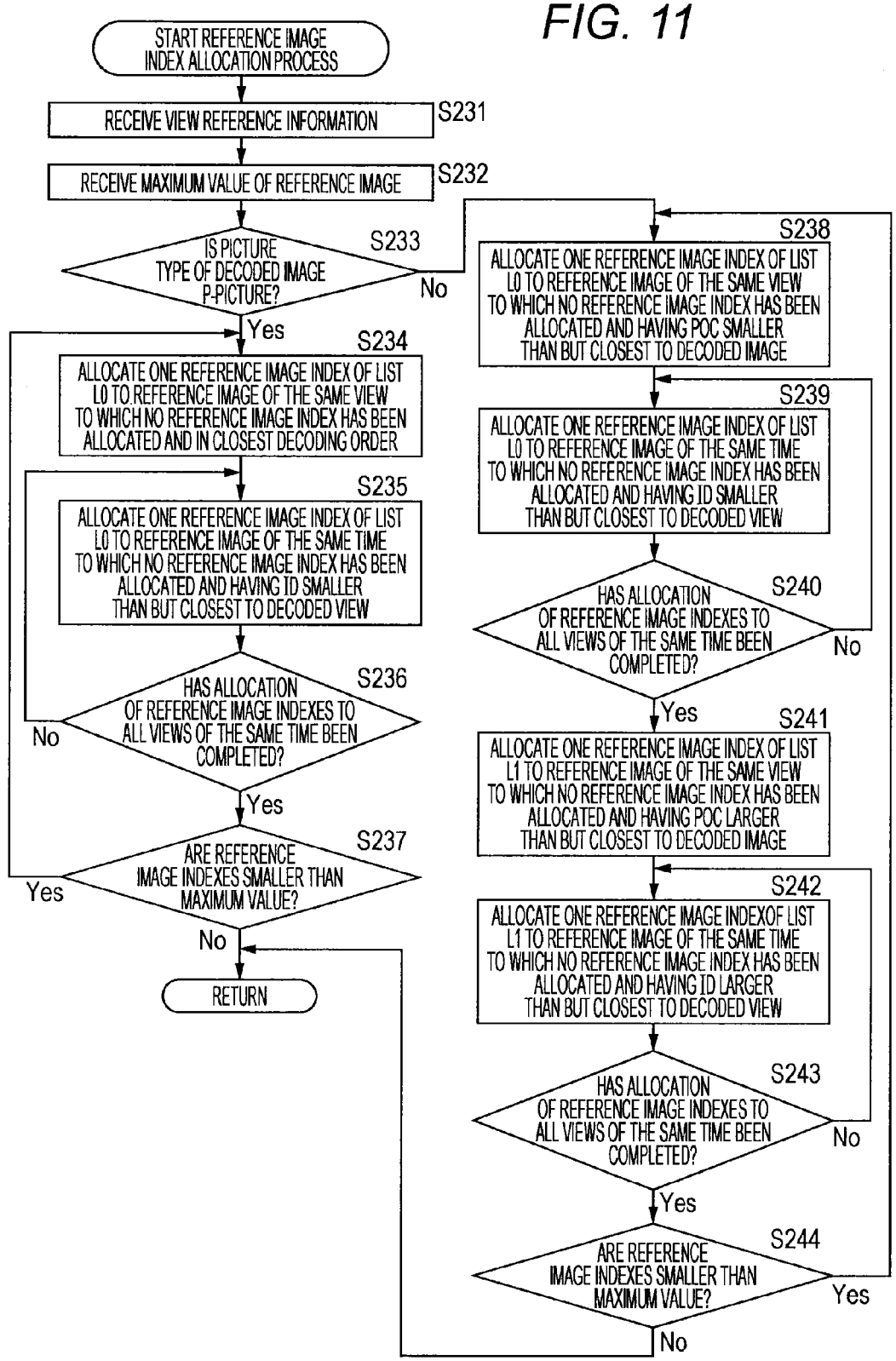
FIG. 11 is a flowchart explaining an example of a flow of a reference image index allocation process.

In step S202 of FIG. 10, the information such as the sequence parameter set and the slice header of the decoded image is supplied to the reference image index allocation unit 222 from the syntax processing unit 221.

In step S231, the reference image index allocation unit 222 receives the view reference information. The view reference information is written in the sequence parameter from the syntax processing unit 221, as described with reference to FIG. 5. The reference image index allocation unit 222 can recognize the number and the identifiers of the views to be referred in the list L0 and the list L1 by acquiring the view reference information.

In step S232, the reference image index allocation unit 222 receives the maximum value of the reference images. The maximum value of the reference images is set in the max_num_ref_frames of the sequence parameter described with reference to FIG. 5.

In step S233, the reference image index allocation unit 222 determines whether the picture type of the decoded image is P-picture. The picture type of the decoded image is written in the slice_type of the slice head described with reference to FIG. 6. In step S233, when it is determined that the picture type of the decoded image is P-picture, the processing proceeds to step S234.

Note that, in the following processing, the time information and the view information of the reference images from the decoded picture buffer 209 are referred.

In step S234, the reference image index allocation unit 222 allocates one reference image index of the list L0 to a reference image of the same view, to which no reference image index has been allocated, and in the closest decoding order.

In step S235, the reference image index allocation unit 222 allocates one reference image index of the list L0 to a reference image of the same time, to which no reference image index has been allocated, and which has an ID smaller than but closest to the view of the decoded image.

In step S236, the reference image index allocation unit 222 determines whether the allocation of the reference image indexes to the reference images of all views of the same time has been completed. In step S236, when it is determined that the allocation of the reference image indexes to the reference images of all views of the same time has not been completed, the processing returns to step S235, and the subsequent processing is repeated.

In step S236, when it is determined that the allocation of the reference image indexes to the reference images of all views of the same time has been completed, the processing proceeds to step S237. In step S237, the reference image index allocation unit 222 determines whether the indexes of the reference images are smaller than the maximum value (the number) of the reference images received in step S232.

In step S237, when it is determined that the indexes of the reference images are smaller than the maximum value of the reference images, the processing returns to step S234, and the subsequent processing is repeated. In step S237, when it is determined that the indexes of the reference images are the maximum value of the reference images or more, there is no reference image to which the index is to be allocated, and therefore the reference image index allocation process is terminated, and the processing returns to step S209 of FIG. 10.

Meanwhile, in step S233, when it is determined that the picture type of the decoded image is B-picture, the processing proceeds to step S238.

In step S238, the reference image index allocation unit 222 allocates one reference image index of the list L0 to a reference image of the same view, to which no reference image index has been allocated, and in the closest decoding order.

In step S239, the reference image index allocation unit 222 allocates one reference image index of the list L0 to a reference image of the same time, to which no reference image index has been allocated, and that has an ID smaller than but closest to the view of the decoded image.

In step S240, the reference image index allocation unit 222 determines whether the allocation of the reference image indexes to the reference images of all views of the same time has been completed. In step S240, when it is determined that the allocation of the reference image indexes to the reference images of all views of the same time has not been completed, the processing returns to step S239, and the subsequent processing is repeated.

In step S240, when it is determined that the allocation of the reference image indexes to the reference images of all views of the same time has been completed, the processing proceeds to step S241. In step S241, the reference image index allocation unit 222 allocates one reference image index of the list L1 to a reference image of the same view, to which no reference image index has not been allocated, and in the closest decoding order.

In step S242, the reference image index allocation unit 222 allocates one reference image index of the list L1 to a reference image of the same time, to which no reference image index has been allocated, and that has and ID smaller than but closest to the view of the decoded image.

In step S243, the reference image index allocation unit 222 determines whether the allocation of the reference image indexes to the reference images of all views of the same time has been completed. In step S243, when it is determined that the allocation of the reference image indexes to the reference images of all views of the same time has not been completed, the processing returns to step S242, and the subsequent processing is repeated.

In step S243, when it is determined that the allocation of the reference image indexes to the reference images of all views of the same time has been completed, the processing proceeds to step S244. In step S244, the reference image index allocation unit 222 determines whether the indexes of the reference images are smaller than the maximum value (the number) of the reference images received in step S232.

In step S244, when it is determined that the indexes of the reference images are smaller than the maximum value of the reference images, the processing returns to step S238, and the subsequent processing is repeated. In step S244, when it is determined that the indexes of the reference images are the maximum value of the reference images or more, there is no reference image to which the index is to be allocated, and therefore the reference image index allocation process is terminated and the processing returns to step S209 of FIG. 10.

As described above, the reference image indexes are alternately allocated to the reference images in the time direction and to the reference images in the view direction. Accordingly, a smaller reference image index is allocated to a reference image having a higher reference rate. Therefore, the encoding efficiency can be improved.

Note that, in the above description, an example has been described, in which the two types of patterns of the time direction prioritized pattern and the view direction prioritized pattern are set in advance, and one bit pattern flag that indicates which of the two patterns has been selected is transmitted to the decoding side. However, the types of patterns are not limited to the two types. For example, as described below, four types of allocation patterns (methods) are prepared in advance, and the encoding side may designates one from the four types as a default method.

<3. Third Embodiment>
[Four Types of Allocation Patterns]

Next, the four types of allocation patterns that can be designated as default will be described with reference to FIGS. 12 to 15. In the example of FIGS. 12 to 15, the B-picture indicated in the center represents a picture to be encoded. The pictures indicated in right and left directions of the picture to be encoded represent reference pictures of the same view but different times (reference images in the time direction). POC indicates indexes of time (output order of pictures), and indicates that the time advances in order from A to E.

Further, the pictures indicated in the up and down directions of the picture to be encoded represent reference pictures of the same time but different views (reference images in the view direction). Smaller ViewIDs are allocated in order from ViewID=V to Z.

Further, the thick solid arrow indicates the allocation order of the indexes about the List0, and the thick dotted arrow indicates the allocation order of the indexes about the List1. Note that, in the example of FIGS. 12 to 15, regarding the reference images in the time direction with respect to the List0, smaller reference image indexes are allocated to the reference images in descending order of POC in a forward direction among the referable images. With respect to the List1, smaller reference image indexes are allocated to the reference images in ascending order of POC in a backward direction, among the referable images.

Figure 12:
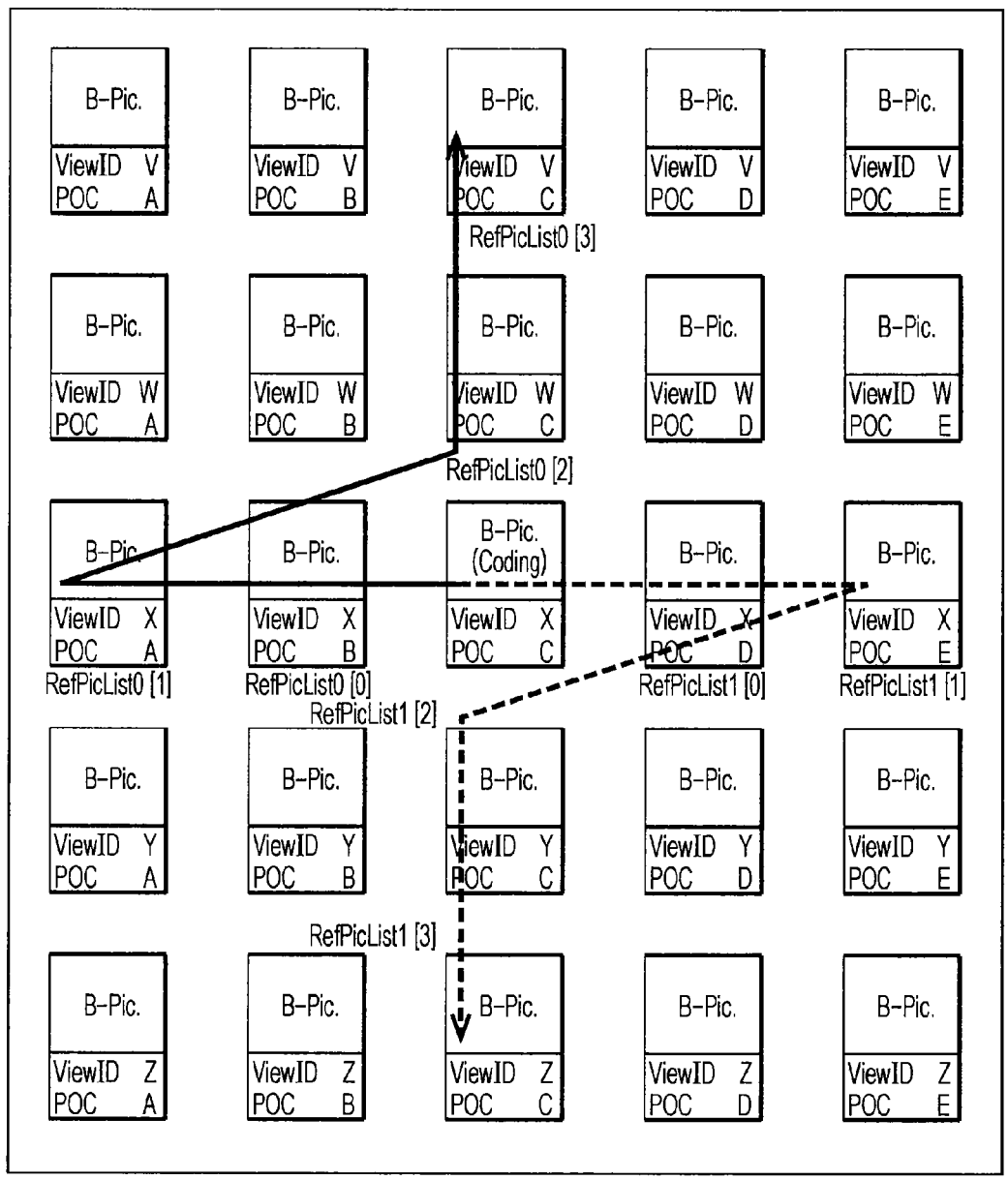
FIG. 12 is a diagram showing an example of a time first (time direction prioritized) pattern.

In the example of FIG. 12, the time first (time direction prioritized) pattern is indicated. The time first pattern is a pattern, as shown in the example of FIG. 12, in which the indexes are allocated to the reference pictures of the same view but different times (referable pictures in the time direction), and then the indexes are allocated to the reference pictures of the same time but different views (referable pictures in the view direction).

For example, as shown by the thick solid arrow, regarding the List0, the index of refPicList0[0] is allocated to the B-picture in which ViewID is X and POC is B, and the index of refPicList0[1] is allocated to the B-picture in which ViewID is X and POC is A. Following that, the index of refPicList0[2] is allocated to the B-picture in which ViewID is W and POC is C, and the index of refPicList0[3] is allocated to the B-picture in which ViewID is V and POC is C.

Further, as shown by the thick dotted arrow, regarding the List1, the index of refPicList1[0] is allocated to the B-picture in which ViewID is X and POC is D, and the index of refPicList1[1] is allocated to the B-picture in which ViewID is X and POC is E. Following that, the index of refPicList1[2] is allocated to the B-picture in which ViewID is Y and POC is C, and the index of refPicList1[3] is allocated to the B-picture in which ViewID is Z and POC is C.

Figure 13:
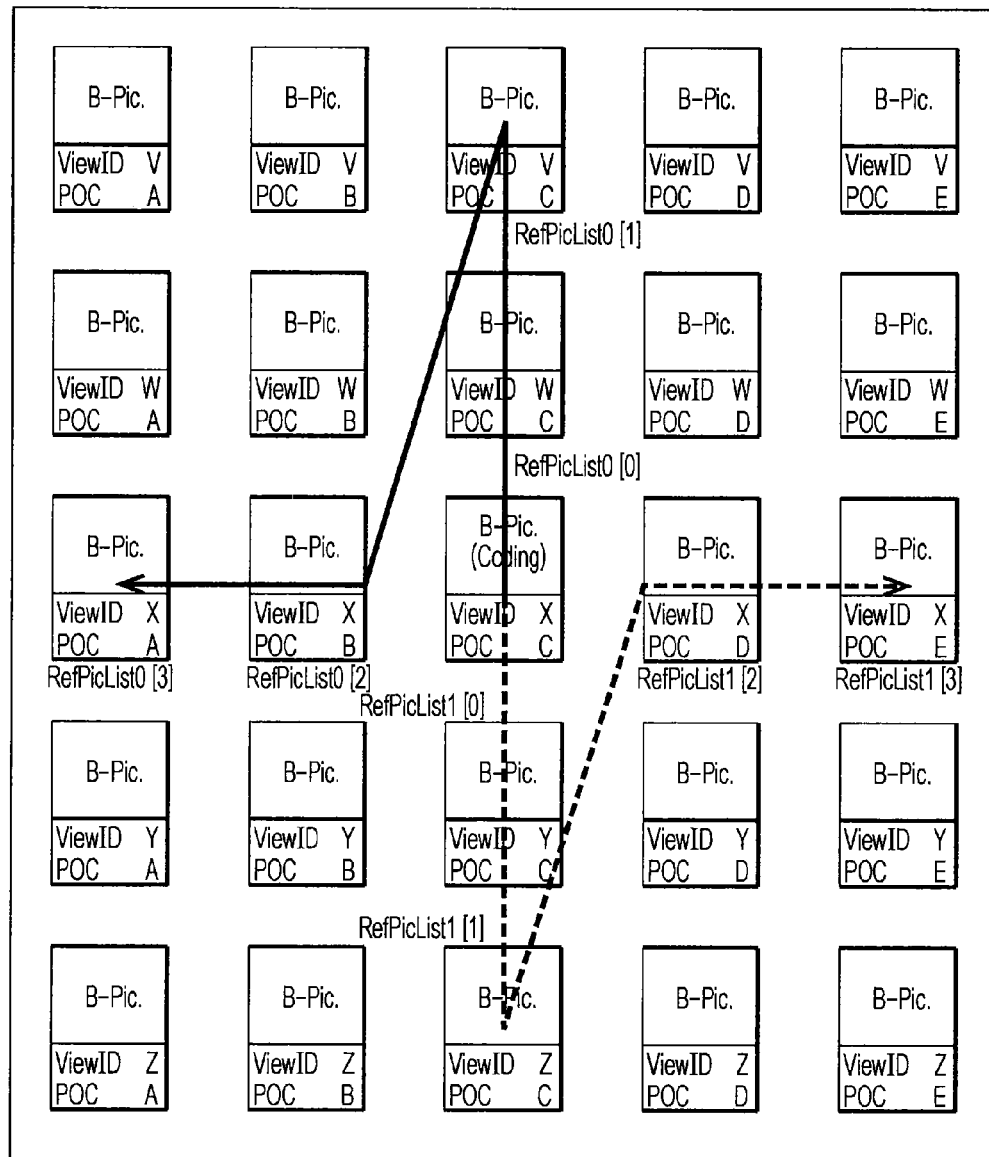
FIG. 13 is a diagram showing an example of a view first (view direction prioritized) pattern.

In the example of FIG. 13, the view first (view direction prioritized) pattern is shown. The view first pattern is a pattern, as shown in the example of FIG. 13, in which the indexes are allocated to the reference pictures of the same time but different views (referable pictures in the view direction), and then the indexes are allocated to the reference pictures of the same view but different times (referable pictures in the time direction).

For example, as shown by the thick solid arrow, regarding the List0, the index of refPicList0[0] is allocated to the B-picture in which ViewID is W and POC is C, and the index of refPicList0[1] is allocated to the B-picture in which ViewID is V and POC is C. Following that, the index of refPicList0[2] is allocated to the B-picture in which ViewID is X and POC is B, and the index of refPicList0[3] is allocated to the B-picture in which ViewID is X and POC is A.

Further, as shown by the thick dotted arrow, regarding the List1, the index of refPicList1[0] is allocated to the B-picture in which ViewID is Y and POC is C, and the index of refPicList1 [1] is allocated to the B-picture in which ViewID is Z and POC is C. Following that, the index of refPicList1[2] is allocated to the B-picture in which ViewID is X and POC is D, and the index of refPicList1[3] is allocated to the B-picture in which ViewID is X and POC is E.

Figure 14:
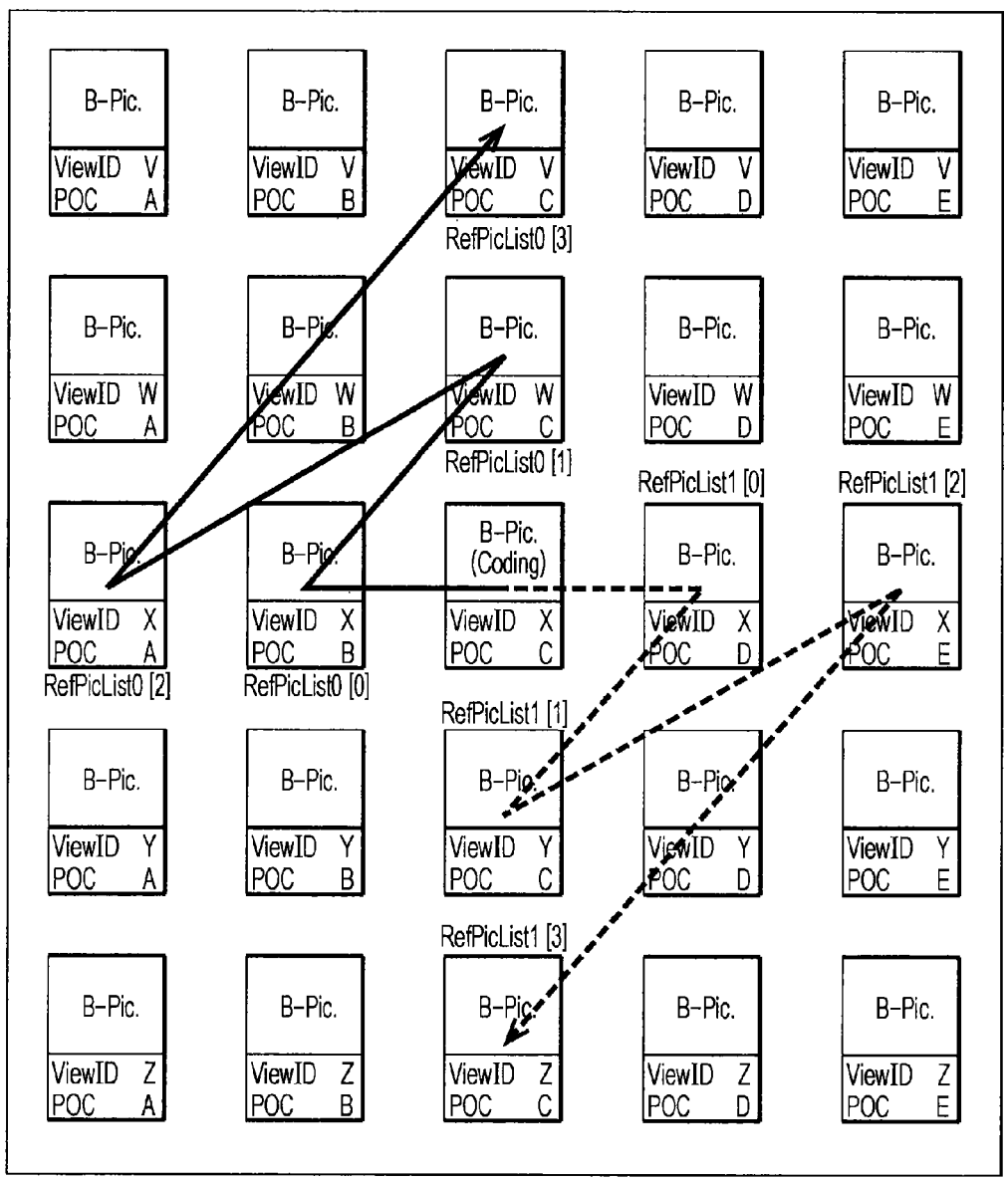
FIG. 14 is a diagram showing an example of a time first zig-zag (time direction prioritized alternate) pattern.

An example of FIG. 14 shows the time first zig-zag pattern (time direction prioritized alternate pattern). The time first zig-zag pattern is a pattern, as shown in the example of FIG. 14, in which the indexes are alternately allocated to the reference pictures of the same view but different times (referable pictures in the time direction) and to the reference pictures of the same time but different views (referable pictures in the view direction). Note that, in this time first zig-zag pattern, as referred to as time direction prioritized, the allocation of the indexes is started from the reference picture of the same view but a different time.

For example, as shown by the thick solid arrow, regarding the List0 , the index of refPicList0[0] is allocated to the B-picture in which ViewID is X and POC is B, and then, the index of refPicList0[1] is allocated to the B-picture in which ViewID is W and POC is C. Next, the index of refPicList0[2] is allocated to the B-picture in which ViewID is X and POC is A, and then, the index of refPicList0[3] is allocated to the B-picture in which ViewID is V and POC is C.

Further, as shown by the thick dotted arrow, regarding the List1 , the index of refPicList1[0] is allocated to the B-picture in which ViewID is X and POC is D, and then, the index of refPicList1[1] is allocated to the B-picture in which ViewID is Y and POC is C. Following that, the index of refPicList1[2] is allocated to the B-picture in which ViewID is X and POC is E, and then, the index of refPicList1[3] is allocated to the B-picture in which ViewID is Z and POC is C.

Figure 15:
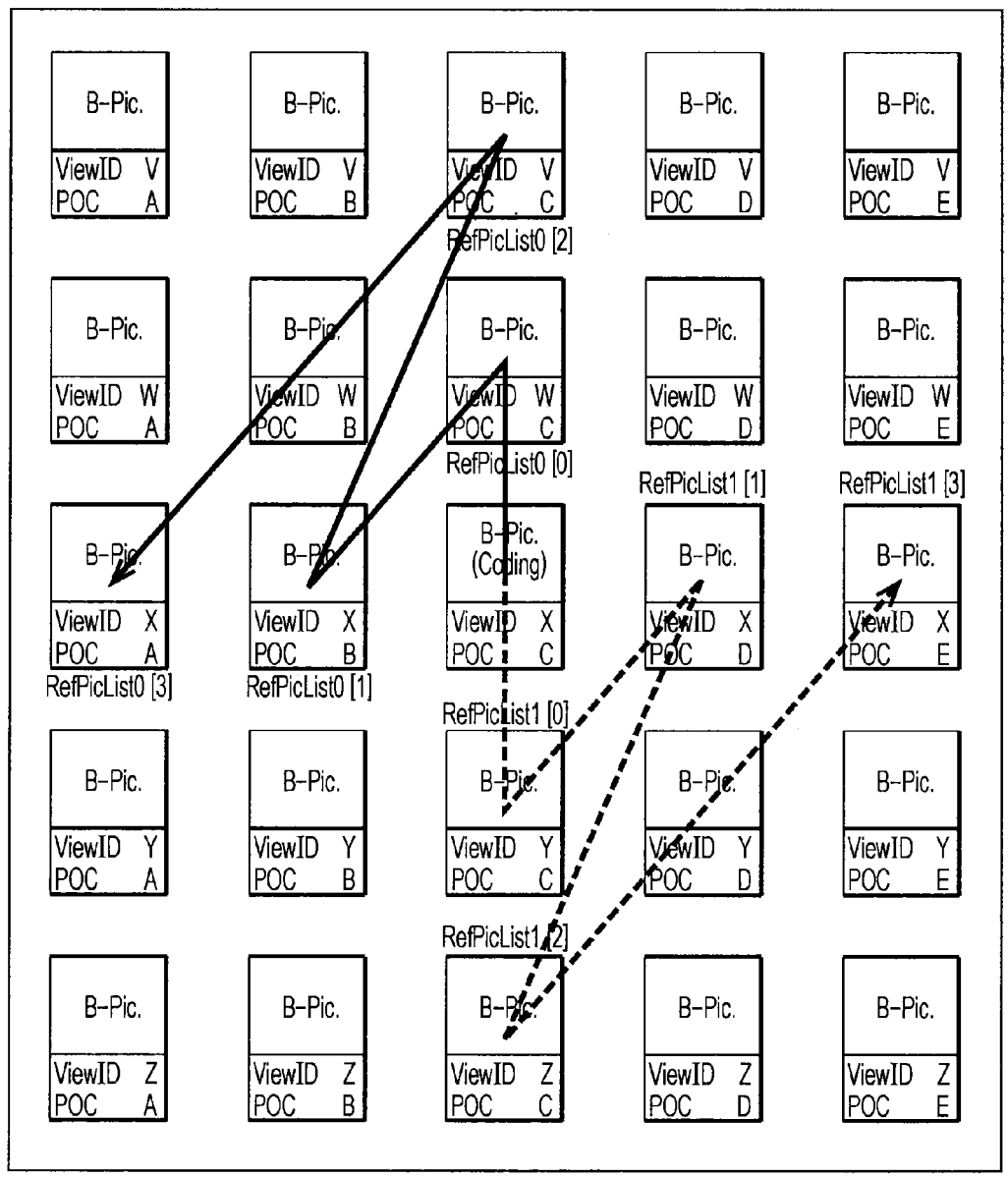
FIG. 15 is a diagram showing an example of a view first zig-zag (view direction prioritized alternate) pattern.

An example of FIG. 15 shows a view first zig-zag pattern (view direction prioritized alternate pattern). The view first zig-zag pattern is a pattern, as shown in the example of FIG. 15, in which the indexes are alternately allocated to the reference pictures of the same time but different views (referable pictures in the view direction) and to the reference pictures of the same view but different times (referable pictures in the time direction). Note that, in the view first zig-zag pattern, as referred to as the view direction prioritized, the allocation of the indexes is started from the reference picture of the same time but a different view.

For example, as shown by the thick solid arrow, regarding the List0 , the index of refPicList0[0] is allocated to the B-picture in which ViewID is W and POC is C, and then, the index of refPicList0[1] is allocated to the B-picture in which ViewID is X and POC is B. Next, the index of refPicList0[2] is allocated to the B-picture in which ViewID is V and POC is C, and then, the index of refPicList0[3] is allocated to the B-picture in which ViewID is X and POC is A.

Further, as shown by the thick dotted arrow, regarding the List1 , the index of refPicList1[0] is allocated to the B-picture in which ViewID is Y and POC is C, and then, the index of refPicList1[1] is allocated to the B-picture in which ViewID is X and POC is D. Next, the index of refPicList1[2] is allocated to the B-picture in which ViewID is Z and POC is C, and then, the index of refPicList1[3] is allocated to the B-picture in which ViewID is X and POC is E.

The above four types of allocation patterns are designated in the syntax described below in the image encoding device 100. For example, the patterns are designated (added) by the syntax processing unit 121.

[Example of Syntax of Sequence Parameter Set]

FIG. 16 is a diagram showing an example of syntax of a sequence parameter set (SPS). The figures on the left end of the rows are row numbers that are attached for illustrative purpose.

In the example of FIG. 16, default_reference_picture_index_pattern_idc is set in the 13th row. The defult_reference_picture_index_pattern_idc is a pattern ID that indicates which allocation pattern is designated as a default reference picture index in the sequence.

The default_reference_picture_index_pattern_idc selects an initialization process of the reference picture index in the following manner.

For example, when the default_reference_picture_index_pattern_idc=0, the default reference picture indexes are allocated to the pictures of the same view before the pictures of different views. That is, when the default_reference_picture_index_pattern_idc=0, the time first pattern described with reference to FIG. 13 is designated as the default allocation pattern of the sequence.

When the default_reference_picture_index_pattern_idc=1, the default reference picture indexes are allocated to the pictures of the same view before the pictures of different views. That is, when the default_reference_picture_index_pattern_idc=1, the view first pattern described with reference to FIG. 14 is designated as the default allocation pattern of the sequence.

When the default_reference_picture_index_pattern_idc=2, the default reference picture indexes are alternately allocated to the pictures of the same view and the pictures of different views, and the order of the allocation is started from the picture of the same view. That is, when the default_reference_picture_index_pattern_idc=2, the time first zig-zag pattern described with reference to FIG. 15 is designated as the default allocation pattern of the sequence.

When the default_reference_picture_index_pattern_idc=3, the default reference picture indexes are alternately allocated to the pictures of the same view and the pictures of different views, and the order of the allocation is started from the picture of a different view. That is, when the default_reference_picture_index_pattern_idc=3, the view first zig-zag pattern described with reference to FIG. 15 is designated as the default allocation pattern of the sequence.

In the above description, an example has been described, in which the default allocation pattern is determined in each sequence in the sequence parameter set in advance and is designated. In contrast, the above-described pattern ID is provided in a picture parameter set (PPS) that is an existing NAL unit, for example, and the default allocation pattern may be switched in accordance with each scene change or start and end of a fade, as described below.

[Examples of Allocation Pattern and Assumed Scene]

FIG. 17 illustrates a table that indicates four types of allocation patterns and which pattern is set as default to what kind of scene is assumed.

For example, when the assumed scene is a scene in which a time correlation is significantly higher than an among-view correlation, 0 is written in the pattern ID of the picture parameter set, and the time first pattern is set as the default allocation pattern, in the encoding side.

For example, when the assumed scene is a scene in which the among-view correlation is significantly higher than the time correlation, 1 is written in the pattern ID of the picture parameter set, and the view first pattern is set as the default allocation pattern, in the encoding side.

For example, when the assumed scene is a scene in which the time correlation is about the among-view correlation but the time correlation is relatively higher than the among-view correlation, the setting is performed as follows at the encoding side. That is, 2 is written in the pattern ID of the picture parameter set and the time first zig-zag pattern is set as the default allocation pattern.

For example, when the assumed scene is a scene in which the time correlation is about the among-view correlation but the time correlation is relatively higher than the among-view correlation, the setting is performed as follows at the encoding side. That is, 2 is written in the pattern ID of the picture parameter set and the time first zig-zag pattern is set as the default allocation pattern.

In doing so, when the image decoding device 200 receives a picture parameter set, to which the pattern ID has been newly set, the default allocation pattern is switched. Accordingly, the default allocation pattern can be switched in accordance with each scene change in which the scene is changed at once, or start and end of a fade in which the brightness is gradually changed. As a result, a smaller reference image index can be allocated to a reference image having a higher reference rate, whereby the encoding efficiency can be further improved.

Note that, in the above description, it has been described such that the pattern ID is provided in the picture parameter set (PPS) that is an existing NAL unit. However, it is not limited to the PPS, and the pattern ID may be provided to other NAL units as long as the NAL units is adaptable to a plurality of pictures. For example, the pattern ID may be provided to an adaptation parameter set (APS) that is a new NAL unit.

Further, it is assumed that the bit amount is increased by sending the pattern ID in the picture parameter set for each of the plurality of pictures than sending the pattern ID for each sequence parameter described above. Therefore, it is desirable to send the pattern ID in the picture parameter set for each of the plurality of pictures when the increase in bit amount does not become a load.

Note that, in the above description, an example has been described, in which the default allocation pattern is selected from the four types of patterns. However, several types of patterns (for example, two types) may be selected from the four types of patterns as candidate default allocation patterns. Further, the number of candidate patterns is not limited to the four patterns, and may just be several patterns.

Further, in the above description, an example of a pattern flag and an example of a pattern ID have been described. However, the pattern flag and the pattern ID are examples of the pattern identification information that identifies the patterns, and the pattern identification information includes the pattern flag and the pattern ID.

Note that the present disclosure can be applied to an image encoding device and an image decoding device using an HEVC system described below.

<4. Fourth Embodiment>

[Example Structure of Image Encoding Device]

Figure 18:
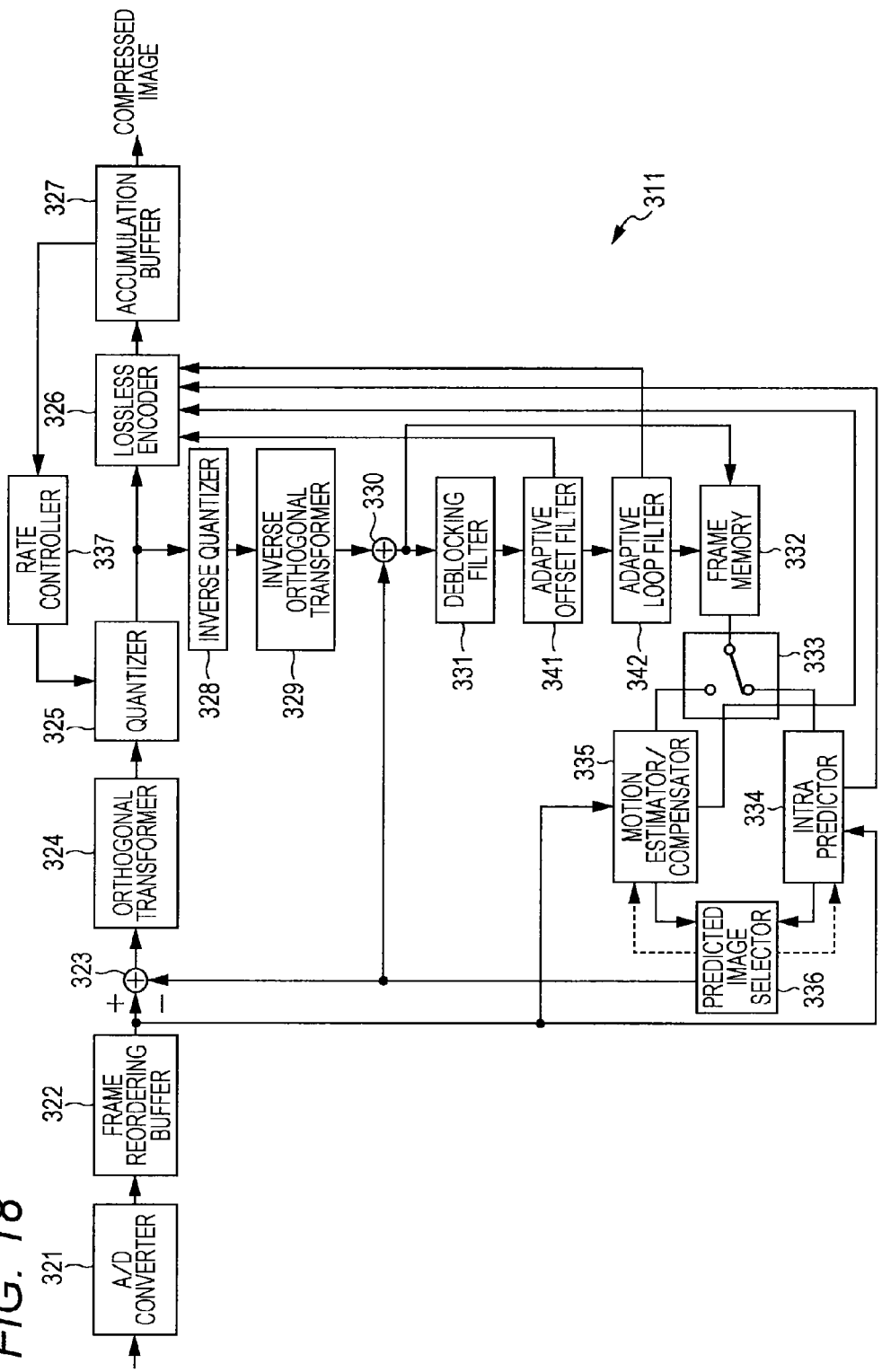
FIG. 18 is a block diagram showing another typical example structure of the image encoding device.

FIG. 18 shows a structure of another embodiment of an image encoding device as an image processing device to which the present disclosure is applied.

An image encoding device 311 shown in FIG. 18 encodes image data using a prediction process by an HEVC system.

In the example of FIG. 1, the image encoding device 311 includes an analog/digital (A/D) converter 321, a frame reordering buffer 322, an arithmetic operation unit 323, an orthogonal transformer 324, a quantizer 325, a lossless encoder 326, and an accumulation buffer 327. The image encoding device 311 also includes an inverse quantizer 328, an inverse orthogonal transformer 329, an arithmetic operation unit 330, a deblocking filter 331, a frame memory 332, a selector 333, an intra predictor 334, a motion estimator/compensator 335, a predicted image selector 336, and a rate controller 337.

Further, the image encoding device 311 includes an adaptive offset filter 341 and an adaptive loop filter 342 between the deblocking filter 331 and the frame memory 332.

The A/D converter 321 applies A/D conversion to the input image data, outputs the converted data to the frame reordering buffer 322, and stores the data therein.

The frame reordering buffer 322 reorders images of frames stored in display order into encoding order in accordance with a GOP (group of picture) structure. The frame reordering buffer 322 supplies images of the reordered frames to the arithmetic operation unit 323. In addition, the frame reordering buffer 322 supplies the images of the reordered frames to the intra predictor 334 and the motion estimator/compensator 335.

The arithmetic operation unit 323 subtracts a predicted image supplied from the intra predictor 334 or the motion estimator/compensator 335 via the predicted image selector 336 from an image read from the frame reordering buffer 322, and outputs resulting difference information to the orthogonal transformer 324.

For example, in a case of an image to which intra encoding is applied, the arithmetic operation unit 323 subtracts the predicted image supplied from the intra predictor 334 from the image read out from the frame reordering buffer 322. Further, for example, in a case of an image to which inter encoding is applied, the arithmetic operation unit 323 subtracts the predicted image supplied from the motion estimator/compensator 335 from the image read out from the frame reordering buffer 322.

The orthogonal transformer 324 applies orthogonal transform such as discrete cosine transform and Karhunen-Loeve transform to the difference information supplied from the arithmetic operation unit 323, and supplies a transform coefficient thereof to the quantizer 325.

The quantizer 325 quantizes the transform coefficient output from the orthogonal transformer 324. The quantizer 325 supplies the quantized transform coefficient to the lossless encoder 326.

The lossless encoder 326 applies lossless encoding such as variable-length coding and arithmetic coding to the quantized transform coefficient.

The lossless encoder 326 acquires the parameters such as the information indicating the intra prediction mode from the intra predictor 334, and acquires the parameters such as the information indicating the inter prediction mode and the motion vector information from the motion estimator/compensator 335.

The lossless encoder 326 encodes the quantized transform coefficient and encodes the acquired parameters (syntax elements) to cause the encoded parameters as a part of the header information of the encoded data (multiplexes the information). The lossless encoder 326 supplies the encoded data obtained by the encoding to the accumulation buffer 327 and accumulates the encoded data therein.

For example, in the lossless encoder 326, the lossless encoding process such as the variable-length coding or the arithmetic coding is performed. An example of the variable-length coding includes context-adaptive variable length coding (CAVLC). An example of the arithmetic coding includes context-adaptive binary arithmetic coding (CABAC).

The accumulation buffer 327 temporarily holds the encoded stream (data) supplied from the lossless encoder 326, and outputs the held encoded data to a downstream recording device (not shown), a transmission path, and the like as an encoded image at a predetermined timing. That is, the accumulation buffer 327 also serves as a transition unit that transmits the encoded stream.

The transform coefficient quantized by the quantizer 325 is also supplied to the inverse quantizer 328. The inverse quantizer 328 inversely quantizes the quantized transform coefficient by a method corresponding to the quantization by the quantizer 325. The inverse quantizer 328 supplies the obtained transform coefficient to the inverse orthogonal transformer 329.

The inverse orthogonal transformer 329 inversely orthogonally transforms the supplied transform coefficient by a method corresponding to the orthogonal transform process by the orthogonal transformer 324. An inversely orthogonally transformed output (restored difference information) is supplied to the arithmetic operation unit 330.

The arithmetic operation unit 330 adds the predicted image supplied from the intra predictor 334 or the motion estimator/compensator 335 via the predicted image selector 336 to the result of the inverse orthogonal transform, that is, the restored difference information supplied from the inverse orthogonal transformer 329 to obtain a locally decoded image (decoded image).

For example, when the difference information corresponds to an image to which intra encoding is applied, the arithmetic operation unit 330 adds the predicted image supplied from the intra predictor 334 to the difference information. Further, for example, when the difference information corresponds to an image to which inter encoding is applied, the arithmetic operation unit 330 adds the predicted image supplied from the motion estimator/compensator 335 to the difference information.

A decoded image that is a result of the addition is supplied to the deblocking filter 331 and the frame memory 332.

The deblocking filter 331 removes block distortion of the decoded image by appropriately performing a deblocking filter process. The deblocking filter 331 supplies a result of the filter process to the adaptive offset filter 341.

The adaptive offset filter 341 performs an offset filter process (sample adaptive offset: SAO) that mainly removes ringing with respect to the image filtered by the deblocking filter 331.

There are total of nine types of offset filters including two types of band offsets, six types of edge offsets, and no offset. The adaptive offset filter 341 applies the filter process to the image filtered by the deblocking filter 331 using a quad-tree structure in which the type of offset is determined for each divided region, and an offset value of each divided region.

Note that, in the image encoding device 311, the quad-tree structure and the offset value of each divided region are calculated and used by the adaptive offset filter 341. The calculated quad-tree structure and offset value of each divided region are encoded by the lossless encoder 326, and are transmitted to the image decoding device 351 of FIG. 19 described below.

The adaptive offset filter 341 supplies an image after the filter process to the adaptive loop filter 342.

The adaptive loop filter 342 performs an adaptive loop filter (ALF) process in unit of LCU that is the maximum encoder as a unit of an ALF process. The filtered image is supplied to the frame memory 332. In the adaptive loop filter 342, two dimensional Wiener filter is used as a filter. A filter other than the Wiener filter may be used.

The adaptive loop filter 342 applies a filter process to the image filtered by the adaptive offset filter 341 for each LCU using a filter coefficient, and supplies a result of the filter process to the frame memory 332.

Note that, in the image encoding device 311, the filter coefficient is calculated by the adaptive loop filter 342 so as to minimize a residual between the filter coefficient and the original image from the frame reordering buffer 312 for each LCU, and is used. The calculated filter coefficient is encoded by the lossless encoder 326, and is transmitted to the image decoding device 351 of FIG. 19 described below. In the present specification, an example of performing the processing for each LUC. However, the unit of the process of the adaptive loop filter 342 is not limited to the example.

The frame memory 332 outputs the accumulated reference images to the intra predictor 334 or the motion estimator/compensator 335 through the selector 333 at a predetermined timing.

For example, in a case of an image to which intra encoding is applied, the frame memory 332 supplies the reference image to the intra predictor 334 through the selector 333. Further, for example, when inter encoding is performed, the frame memory 332 supplies the reference image to the motion estimator/compensator 335 through the selector 333.

In a case where the reference image supplied from the frame memory 332 is an image to which intra encoding is applied, the selector 333 supplies the reference image to the intra predictor 334. Further, in a case where the reference image supplied from the frame memory 332 is an image to which inter encoding is applied, the selector 333 supplies the reference image to the motion estimator/compensator 335.

The intra predictor 334 performs intra prediction (intra-frame prediction) that generates a predicted image using a pixel value in a frame. The intra predictor 334 performs intra prediction in a plurality of modes (intra prediction mode).

The intra predictor 334 generates predicted images in all intra prediction mode, evaluates the predicted images, and select an optimum mode. When having selected the optimum prediction mode, the intra predictor 334 supplies the predicted image generated in the optimum mode to the arithmetic operation unit 323 and the arithmetic operation unit 330 through the predicted image selector 336.

In addition, the intra predictor 334 appropriately supplies the parameters such as the intra prediction mode information that indicates the employed intra prediction mode to the lossless encoder 326, as described above.

The motion estimator/compensator 335 performs motion estimation of the image to which inter encoding is applied using the input image supplied from the frame reordering buffer 322 and the reference image supplied from the frame memory 332 through the selector 333. In addition, the motion estimator/compensator 335 performs a motion compensation process in accordance with a motion vector detected by the motion estimator to generate a predicted image (inter predicted image information).

The motion estimator/compensator 335 performs an inter prediction process of all candidate inter prediction modes to generate a predicted image. The motion estimator/compensator 335 supplies the generated predicted image to the arithmetic operation unit 323 and the arithmetic operation unit 330 through the predicted image selector 336.

Further, the motion estimator/compensator 335 supplies the parameters such as the inter prediction mode information that indicates the employed inter prediction mode and the motion vector information that indicates the calculated motion vector to the lossless encoder 326.

In a case of an image to which intra encoding is applied, the predicted image selector 336 supplies an output from the intra predictor 334 to the arithmetic operation unit 323 and the arithmetic operation unit 330, and in a case of an image to which inter encoding is applied, the predicted image selector 336 supplies an output from the motion estimator/compensator 335 to the arithmetic operation unit 323 and the arithmetic operation unit 330.

The rate controller 337 controls the rate of the quantization operation of the quantizer 325 so that no overflow or underflow occurs based on a compressed image accumulated in the accumulation buffer 327.

<5. Fifth Embodiment>
[Example Structure of Image Decoding Device]

Figure 19:
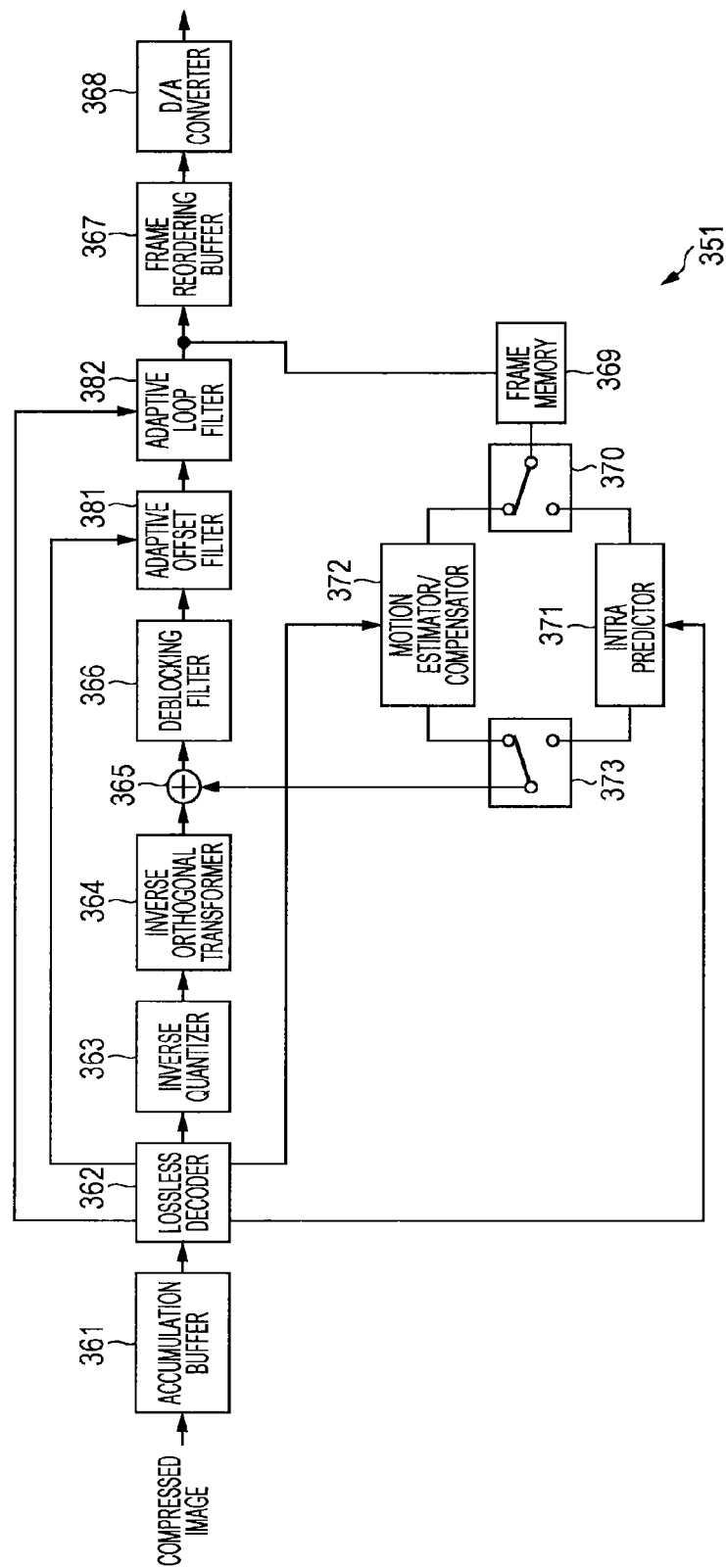
FIG. 19 is a block diagram showing another typical example structure of the image decoding device.

FIG. 19 shows a structure of an embodiment of an image decoding device as an image processing device to which the present disclosure is applied. The image decoding device 351 shown in FIG. 19 is a decoding device corresponding to the image encoding device 311 of FIG. 18, and decodes the encoded data from the image encoding device 311 in the HEVC system.

The encoded data encoded by the image encoding device 311 is transmitted to the image decoding device 351 corresponding to the image encoding device 311 through a predetermined mission path, and is decoded.

As shown in FIG. 19, the image decoding device 351 includes an accumulation buffer 361, a lossless decoder 362, an inverse quantizer 363, an inverse orthogonal transformer 364, an arithmetic operation unit 365, a deblocking filter 366, a frame reordering buffer 367, and a D/A converter 368. The image decoding device 351 also includes a frame memory 369, a selector 370, an intra predictor 371, a motion estimator/compensator 372, and a selector 373.

Further, the image decoding device 351 includes an adaptive offset filter 381 and an adaptive loop filter 382 between the deblocking filter 366 and the frame reordering buffer 367, and the frame memory 369.

The accumulation buffer 361 also serves as a reception unit that receives transmitted encoded data. The accumulation buffer 361 receives and accumulates the transmitted encoded data. The encoded data is encoded by the image encoding device 311. The lossless decoder 362 decodes the encoded data read out from the accumulation buffer 361 at a predetermined timing by a format corresponding to the encoding format of the lossless encoder 326 of FIG. 18.

The lossless decoder 362 supplies the parameter such as the information that indicates the decoded intra prediction mode to the intra predictor 371, and supplies the parameters such as the information that indicates the inter prediction mode and the motion vector information to the motion estimator/compensator 372. In addition, the lossless decoder 362 supplies the parameters (filter coefficient, and the like) of the decoded adaptive loop filter to the adaptive loop filter 382. The lossless decoder 362 supplies the decoded adaptive offset parameters (the quad-tree structure and the offset values of each divided region) to the adaptive offset filter 381.

The inverse quantizer 363 inversely quantizes the coefficient data (quantization coefficient) obtained by being decoded by the lossless decoder 362 by a format corresponding to the quantization format of the quantizer 325 of FIG. 18. That is, the inverse quantizer 363 inversely quantizes the quantization coefficient by a method similar to the inverse quantizer 328 of FIG. 18 using the quantization parameter supplied from the image encoding device 311.

The inverse quantizer 363 supplies the inversely quantized coefficient data, that is, the orthogonal transform coefficient to the inverse orthogonal transformer 364. The inverse orthogonal transformer 364 inversely orthogonally transform the orthogonal transform coefficient by a format corresponding to the orthogonal transform format of the orthogonal transformer 324 of FIG. 18 to obtain decoded residual data corresponding to the residual data before being subjected to the orthogonal transform in the image encoding device 311.

The decoded residual data obtained by the inverse orthogonal transform is supplied to the arithmetic operation unit 365. In addition, a predicted image is supplied to the arithmetic operation unit 365 from the intra predictor 371 or the motion estimator/compensator 372 via the selector 373.

The arithmetic operation unit 365 adds the decoded residual data and the predicted image to obtain decoded image data corresponding to image data before the predicted image is subtracted by the arithmetic operation unit 323 in the image encoding device 311. The arithmetic operation unit 365 supplies the decoded image data to the deblocking filter 366.

The deblocking filter 366 appropriately removes block distortion of the decoded image by performing a deblocking filter process. The deblocking filter 366 supplies a result of the filter process to the adaptive offset filter 381.

The adaptive offset filter 381 performs an offset filter deblocking (SAO) process that mainly removes ringing with respect to an image filtered by the deblocking filter 366.

The adaptive offset filter 381 applies a filter process to the image filtered by the deblocking filter 366 using the quad-tree structure in which the type of offset filter is determined in each divided region and the offset value of each divided region. The adaptive offset filter 381 supplies the filtered image to the adaptive loop filter 382.

Note that the quad-tree structure and the offset value of each divided region are calculated and encoded by the adaptive offset filter 341 of the image encoding device 311 and are transmitted. Then, the quad-tree structure and the offset value of each divided region encoded by the image encoding device 311 is received by the image decoding device 351, is decoded by the lossless decoder 362, and is used by the adaptive offset filter 381.

The adaptive loop filter 382 is configured basically in a similar manner to the adaptive loop filter 342 of FIG. 18, and performs an adaptive loop filter (ALF) process in a unit of LCU that is the maximum encoder as a unit of the ALF process. The adaptive loop filter 382 performs a filter process with respect to the image filtered by the adaptive offset filter 381 using the filter coefficient for each LCU, and supplies a result of the filter process to the frame memory 369 and the frame reordering buffer 367.

Note that, in the image decoding device 351, the filter coefficient is calculated by the adaptive loop filter 342 of the image encoding device 311 in each LUC, and encoded and transmitted data is decoded and used by the lossless decoder 62.

The frame reordering buffer 367 performs image reordering. Specifically, the frames reordered into the encoding order by the frame reordering buffer 322 in FIG. 18 are reordered into the original display order. The D/A converter 368 performs a D/A conversion on the image supplied from the frame reordering buffer 367, and outputs the converted image to a display (not shown) to display the image.

An output of the adaptive loop filter 382 is further supplied to the frame memory 369.

The frame memory 369, the selector 370, the intra predictor 371, the motion estimator/compensator 372, and the selector 373 respectively correspond to the frame memory 332, the selector 333, the intra predictor 334, the motion estimator/compensator 335, and the predicted image selector 336 of the image encoding device 311.

The selector 370 reads out an image to be subjected to a inter process and an image to be referred from the frame memory 369, and supplies the images to the motion estimator/compensator 372. In addition, the selector 370 reads out an image to be used in intra prediction from the frame memory 369, and supplies the image to the intra predictor 371.

The intra predictor 371 is supplied, as necessary, with information indicating the intra prediction mode or the like obtained by decoding header information, from the lossless decoder 362. The intra predictor 371 generates a predicted image from the reference image obtained from the frame memory 369 based on the information, and supplies the generated predicted image to the selector 373.

The information (the prediction mode information, the motion vector information, the reference frame information, a flag, and the various parameters, and the like) obtained by the header information being decoded is supplied to the motion estimator/compensator 372 from the lossless decoder 362.

The motion estimator/compensator 372 generates a predicted image from the reference image acquired from the frame memory 369 based on the information supplied from the lossless decoder 362, and supplies the generated predicted image to the selector 373.

The selector 373 selects the predicted image generated by motion estimator/compensator 372 or the intra predictor 371, and supplies the predicted image to the arithmetic operation unit 365.

Note that, in the above description, an H.264/AVC format or an HEVC format is used as a base of the encoding format. However, the present disclosure is not limited to the format, and other encoding format/decoding format in which motion disparity prediction and compensation are performed may be applied.

The present technique can be applied to image encoding devices and image decoding devices used for receiving image information (bit stream) compressed using orthogonal transform such as discrete cosine transform and motion compensation as in MPEG or H.26x, for example, via network media such as satellite broadcasting, cable television, the Internet, or portable telephone devices. The present technique can also be applied to image encoding devices and image decoding devices that are used when compressed image information is processed on a storage medium such as an optical or magnetic disk or a flash memory. Furthermore, the present technique can also be applied to motion estimator/compensator included in the image encoding devices, the image decoding devices, and the like.

<6. Sixth Embodiment>

[Computer]

The series of processes described above can be performed either by hardware or by software. When the series of processes described above is performed by software, programs constituting the software are installed in a computer. Note that examples of the computer include a computer embedded in dedicated hardware and a general-purpose personal computer or the like capable of executing various functions by installing various programs therein.

Figure 20:
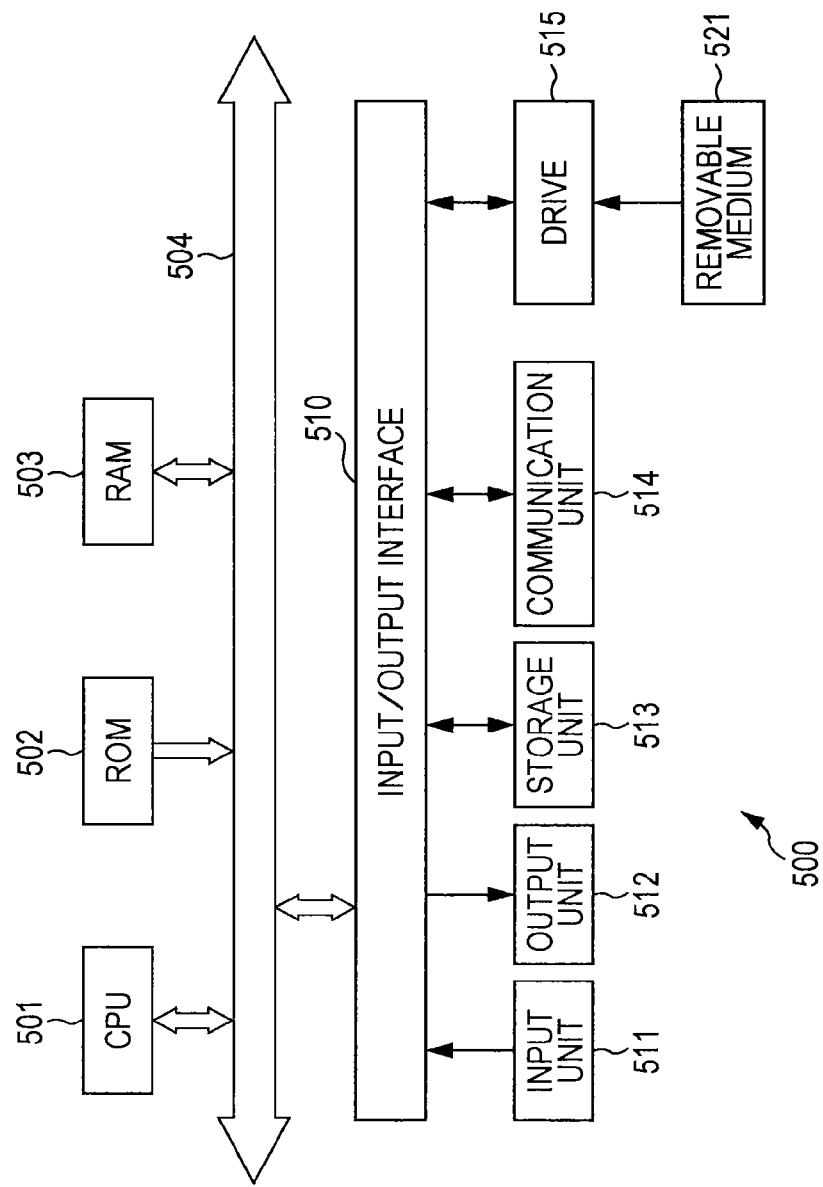
FIG. 20 is a block diagram showing a typical example structure of a computer.

In FIG. 20, a CPU (central processing unit) 501 of a personal computer 500 performs various processes according to programs stored in a ROM (read only memory) 502 or programs loaded onto a RAM (random access memory) 503 from a storage unit 513. The RAM 503 also stores data necessary for the CPU 501 to perform various processes and the like as necessary.

The CPU 501, the ROM 502, and the RAM 503 are connected to one another via a bus 504. An input/output interface 510 is also connected to the bus 504.

The input/output interface 510 has the following components connected thereto: an input unit 511 including a keyboard, a mouse, or the like; an output unit 512 including a display such as a CRT (cathode ray tube) or a LCD (liquid crystal display), and a speaker; the storage unit 513 including a hard disk or the like; and a communication unit 514 including a modem or the like. The communication unit 514 performs communications via networks including the Internet.

A drive 515 is also connected to the input/output interface 510 where necessary, a removable medium 521 such as a magnetic disk, an optical disk, a magnetooptical disk, or a semiconductor memory is mounted on the drive as appropriate, and a computer program read from such a removable disk is installed in the storage unit 513 where necessary.

When the above described series of processes is performed by software, the programs constituting the software are installed from a network or a recording medium.

As shown in FIG. 20, examples of the recording medium include the removable medium 521 that is distributed for delivering programs to users separately from the device, such as a magnetic disk (including a flexible disk), an optical disk (including a CD-ROM (compact disc—read only memory) or a DVD (digital versatile disc)), a magnetooptical disk (including an MD (mini disc)), and a semiconductor memory, which has programs recorded thereon, and alternatively, the ROM 502 having programs recorded therein and a hard disk included in the storage unit 513, which are incorporated beforehand into the device prior to delivery to users.

Programs to be executed by the computer may be programs for carrying out processes in chronological order in accordance with the sequence described in this specification, or programs for carrying out processes in parallel or at necessary timing such as in response to a call.

In this specification, steps describing programs to be recorded in a recording medium include processes to be performed in parallel or independently of one another if not necessarily in chronological order, as well as processes to be performed in chronological order in accordance with the sequence described herein.

In this specification, a system refers to the entirety of equipment including more than one device.

Furthermore, any structure described above as one device (or one processing unit) may be divided into two or more devices (or processing units). Conversely, any structure described above as two or more devices (or processing units) may be combined into one device (or processing unit). Furthermore, it is of course possible to add components other than those described above to the structure of any of the devices (or processing units). Furthermore, some components of a device (or processing unit) may be incorporated into the structure of another device (or processing unit) as long as the structure and the function of the system as a whole are substantially the same. That is, the present technique is not limited to the embodiments described above, but various modifications may be made thereto without departing from the scope of the technique.

The image encoding devices and the image decoding devices according to the embodiments described above can be applied to various electronic devices such as transmitters and receivers in satellite broadcasting, cable broadcasting such as cable TV, distribution via the Internet, distribution to terminals via cellular communication, or the like, recording devices configured to record images in media such as optical disks, magnetic disks and flash memory, and reproduction devices configured to reproduce images from the storage media. Four examples of applications will be described below.

<7. Modification>
[First Application: Television Receiver]

Figure 21:
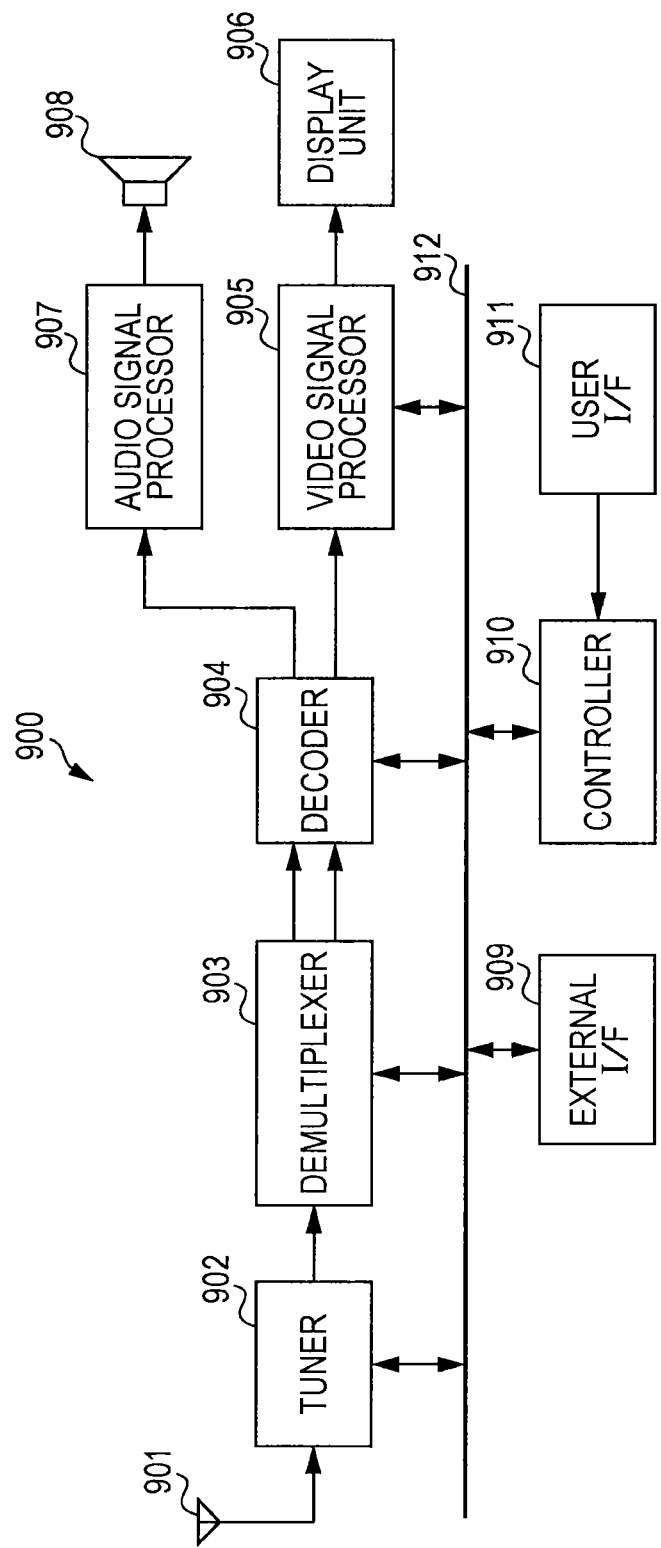
FIG. 21 is a block diagram showing one example of a schematic structure of a television apparatus.

FIG. 21 shows an example of a schematic structure of a television apparatus to which the embodiments described above are applied. The television apparatus 900 includes an antenna 901, a tuner 902, a demultiplexer 903, a decoder 904, a video signal processor 905, a display unit 906, an audio signal processor 907, a speaker 908, an external interface 909, a controller 910, a user interface 911, and a bus 912.

The tuner 902 extracts a signal of a desired channel from broadcast signals received via the antenna 901, and demodulates the extracted signal. The tuner 902 then outputs an encoded bit stream obtained by the demodulation to the demultiplexer 903. That is, the tuner 902 serves as transmitting means in the television apparatus 900 that receives an encoded stream of encoded images.

The demultiplexer 903 separates a video stream and an audio stream of a program to be viewed from the encoded bit stream, and outputs the separated streams to the decoder 904. The demultiplexer 903 also extracts auxiliary data such as an EPG (electronic program guide) from the encoded bit stream, and supplies the extracted data to the controller 910. If the encoded bit stream is scrambled, the demultiplexer 903 may descramble the encoded bit stream.

The decoder 904 decodes the video stream and the audio stream input from the demultiplexer 903. The decoder 904 then outputs video data generated by the decoding to the video signal processor 905. The decoder 904 also outputs audio data generated by the decoding to the audio signal processor 907.

The video signal processor 905 reproduces video data input from the decoder 904, and displays the video data on the display unit 906. The video signal processor 905 may also display an application screen supplied via the network on the display unit 906. Furthermore, the video signal processor 905 may perform additional processing such as noise removal on the video data depending on settings. The video signal processor 905 may further generate an image of a GUI (graphical user interface) such as a menu, a button, or a cursor and superimpose the generated image on the output images.

The display unit 906 is driven by a drive signal supplied from the video signal processor 905, and displays video or images on a video screen of a display device (such as a liquid crystal display, a plasma display, or an OELD (organic electroluminescence display).

The audio signal processor 907 performs reproduction processing such as D/A conversion and amplification on the audio data input from the decoder 904, and outputs audio through the speaker 908. Furthermore, the audio signal processor 907 may perform additional processing such as noise removal on the audio data.

The external interface 909 is an interface for connecting the television apparatus 900 with an external device or a network. For example, a video stream or an audio stream received via the external interface 909 may be decoded by the decoder 904. That is, the external interface 909 also serves as transmitting means in the television apparatus 900 that receives an encoded stream of encoded images.

The controller 910 includes a processor such as a CPU, and a memory such as a RAM and a ROM. The memory stores programs to be executed by the CPU, program data, EPG data, data acquired via the network, and the like. Programs stored in the memory are read and executed by the CPU when the television apparatus 900 is activated, for example. The CPU controls the operation of the television apparatus 900 according to control signals input from the user interface 911, for example, by executing the programs.

The user interface 911 is connected to the controller 910. The user interface 911 includes buttons and switches for users to operate the television apparatus 900 and a receiving unit for receiving remote control signals, for example. The user interface 911 detects operation by a user via these components, generates a control signal, and outputs the generated control signal to the controller 910.

The bus 912 connects the tuner 902, the demultiplexer 903, the decoder 904, the video signal processor 905, the audio signal processor 907, the external interface 909, and the controller 910 to one another.

In the television apparatus 900 having such a structure, the decoder 904 has the functions of the image decoding devices according to the embodiments described above. Accordingly, in decoding an image in the television apparatus 900, the encoding efficiency in multi-viewpoint encoding can be improved.

[Second Application: Portable Telephone Device]

Figure 22:
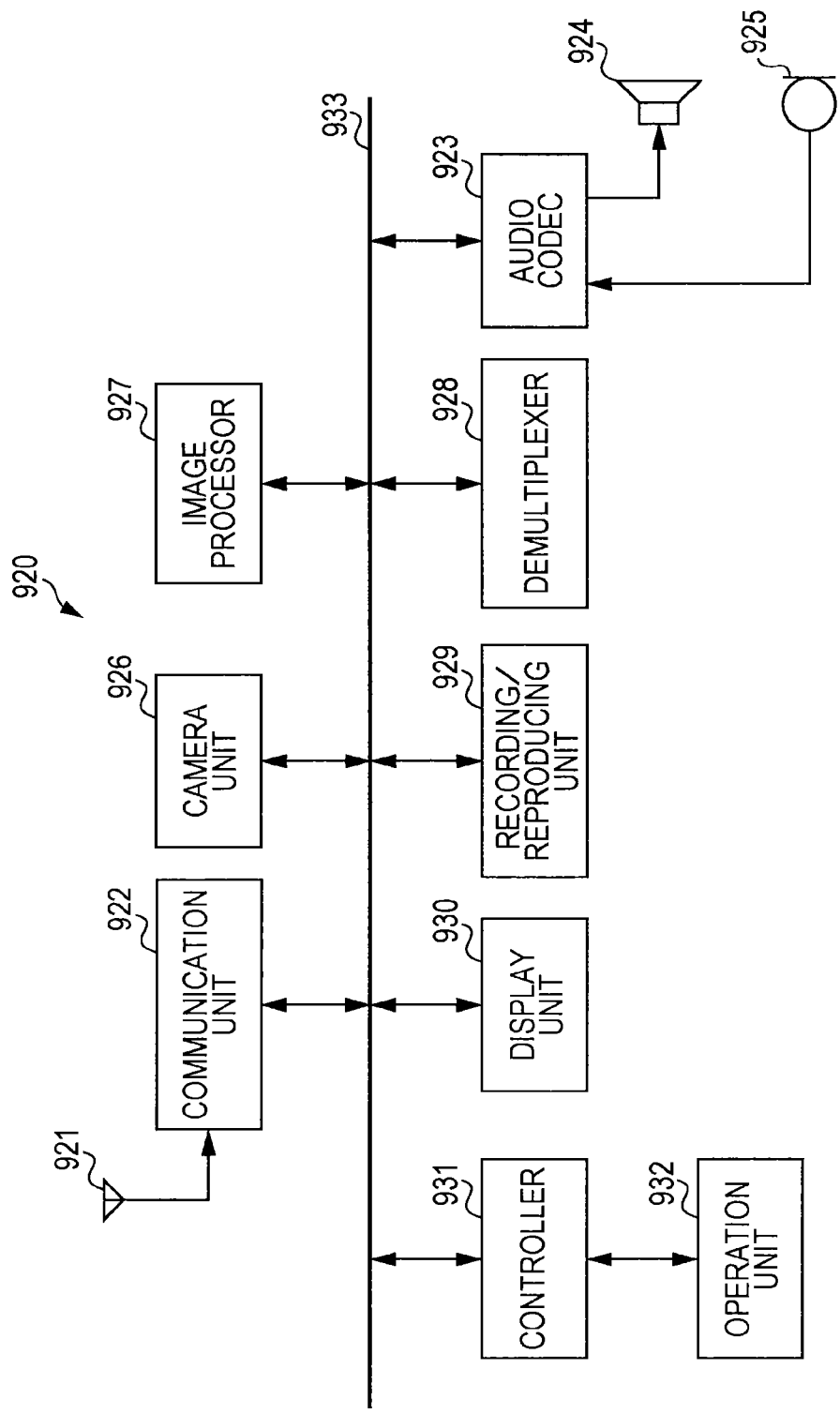
FIG. 22 is a block diagram showing one example of a schematic structure of a portable telephone device.

FIG. 22 shows an example of a schematic structure of a portable telephone device to which the embodiments described above are applied. The portable telephone device 920 includes an antenna 921, a communication unit 922, an audio codec 923, a speaker 924, a microphone 925, a camera unit 926, an image processor 927, a demultiplexer 928, a recording/reproducing unit 929, a display unit 930, a controller 931, an operation unit 932, and a bus 933.

The antenna 921 is connected to the communication unit 922. The speaker 924 and the microphone 925 are connected to the audio codec 923. The operation unit 932 is connected to the controller 931. The bus 933 connects the communication unit 922, the audio codec 923, the camera unit 926, the image processor 927, the demultiplexer 928, the recording/reproducing unit 929, the display unit 930, and the controller 931 to one another.

The portable telephone device 920 performs operation such as transmission/reception of audio signals, transmission/reception of electronic mails and image data, capturing of images, recording of data, and the like in various operation modes including a voice call mode, a data communication mode, an imaging mode, and a video telephone mode.

In the voice call mode, an analog audio signal generated by the microphone 925 is supplied to the audio codec 923. The audio codec 923 converts the analog audio signal to audio data, performs A/D conversion on the converted audio data, and compresses the audio data. The audio codec 923 then outputs the audio data resulting from the compression to the communication unit 922. The communication unit 922 encodes and modulates the audio data to generate a signal to be transmitted. The communication unit 922 then transmits the generated signal to be transmitted to a base station (not shown) via the antenna 921. The communication unit 922 also amplifies and performs frequency conversion on a radio signal received via the antenna 921 to obtain a received signal. The communication unit 922 then demodulates and decodes the received signal to generate audio data, and outputs the generated audio data to the audio codec 923. The audio codec 923 decompresses and performs D/A conversion on the audio data to generate an analog audio signal. The audio codec 923 then supplies the generated audio signal to the speaker 924 to output audio therefrom.

In the data communication mode, the controller 931 generates text data to be included in an electronic mail according to operation by a user via the operation unit 932, for example. The controller 931 also displays the text on the display unit 930. The controller 931 also generates electronic mail data in response to an instruction for transmission from a user via the operation unit 932, and outputs the generated electronic mail data to the communication unit 922. The communication unit 922 encodes and modulates the electronic mail data to generate a signal to be transmitted. The communication unit 922 then transmits the generated signal to be transmitted to a base station (not shown) via the antenna 921. The communication unit 922 also amplifies and performs frequency conversion on a radio signal received via the antenna 921 to obtain a received signal. The communication unit 922 then demodulates and decodes the received signal to restore electronic mail data, and outputs the restored electronic mail data to the controller 931. The controller 931 displays the content of the electronic mail on the display unit 930 and stores the electronic mail data into a storage medium of the recording/reproducing unit 929.

The recording/reproducing unit 929 includes a readable/writable storage medium. For example, the storage medium may be an internal storage medium such as a RAM or flash memory, or may be an externally mounted storage medium such as a hard disk, a magnetic disk, a magnetooptical disk, an optical disk, a USB (unallocated space bitmap) memory, or a memory card.

In the imaging mode, the camera unit 926 images a subject to generate image data, and outputs the generated image data to the image processor 927, for example. The image processor 927 encodes the image data input from the camera unit 926, and stores an encoded stream in the storage medium of the storage/reproducing unit 929.

In the video telephone mode, the demultiplexer 928 multiplexes a video stream encoded by the image processor 927 and an audio stream input from the audio codec 923, and outputs the multiplexed stream to the communication unit 922, for example. The communication unit 922 encodes and modulates the stream to generate a signal to be transmitted. The communication unit 922 then transmits the generated signal to be transmitted to a base station (not shown) via the antenna 921. The communication unit 922 also amplifies and performs frequency conversion on a radio signal received via the antenna 921 to obtain a received signal. The signal to be transmitted and the received signal may include encoded bit streams. The communication unit 922 then demodulates and decodes the received signal to restore the stream and outputs the restored stream to the demultiplexer 928. The demultiplexer 928 separates a video stream and an audio stream from the input stream, and outputs the video stream to the image processor 927 and the audio stream to the audio codec 923. The image processor 927 decodes the video stream to generate video data. The video data is supplied to the display unit 930, and a series of images is displayed by the display unit 930. The audio codec 923 decompresses and performs D/A conversion on the audio stream to generate an analog audio signal. The audio codec 923 then supplies the generated audio signal to the speaker 924 to output audio therefrom.

In the portable telephone device 920 having such a structure, the image processor 927 has the functions of the image encoding devices and the image decoding devices according to the embodiments described above. Accordingly, in encoding and decoding an image in the portable telephone device 920, the encoding efficiency in multi-viewpoint encoding can be improved.

[Third Application: Recording/Reproducing Device]

Figure 23:
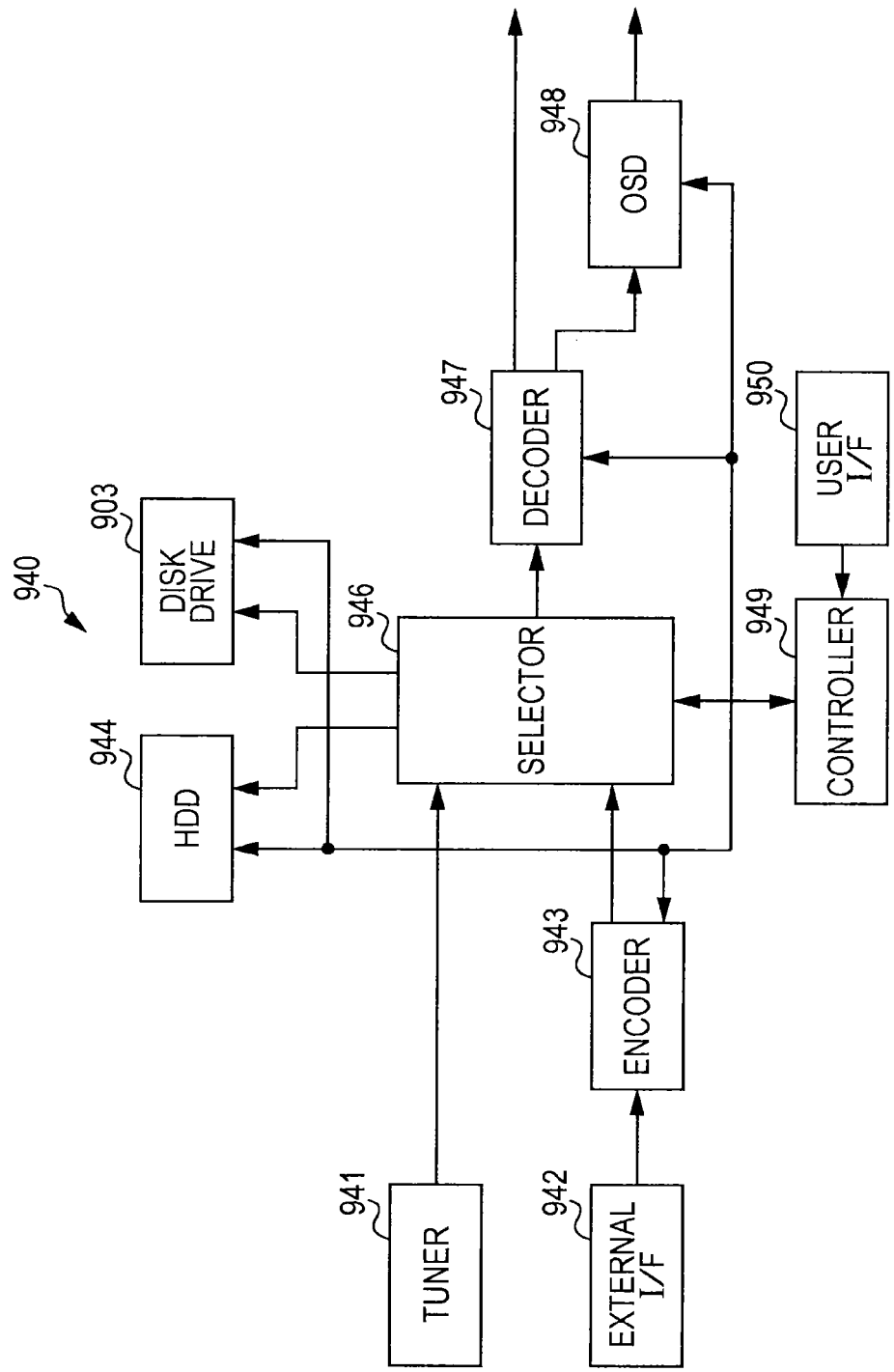
FIG. 23 is a block diagram showing one example of a schematic structure of a recording/reproducing device.

FIG. 23 shows an example of a schematic structure of a recording/reproducing device to which the embodiments described above are applied. The recording/reproducing device 940 encodes audio data and video data of a received broadcast program and records the encoded data into a recording medium, for example. The recording/reproducing device 940 may also encode audio data and video data acquired from another device and record the encoded data into a recording medium, for example. The recording/reproducing device 940 also reproduces data recorded in the recording medium on a monitor and through a speaker in response to an instruction from a user, for example. In this case, the recording/reproducing device 940 decodes audio data and video data.

The recording/reproducing device 940 includes a tuner 941, an external interface 942, an encoder 943, an HDD (hard disk drive) 944, a disk drive 945, a selector 946, a decoder 947, an OSD (on-screen display) 948, a controller 949, and a user interface 950.

The tuner 941 extracts a signal of a desired channel from broadcast signals received via an antenna (not shown), and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface for connecting the recording/reproducing device 940 with an external device or a network. The external interface 942 may be an IEEE 1394 interface, a network interface, a USB interface, or a flash memory interface, for example. For example, video data and audio data received via the external interface 942 are input to the encoder 943. That is, the external interface 942 has a role as transmission means in the recording/reproducing device 940.

The encoder 943 encodes the video data and the audio data if the video data and the audio data input from the external interface 942 are not encoded. The encoder 943 then outputs the encoded bit stream to the selector 946.

The HDD 944 records an encoded bit stream of compressed content data such as video and audio, various programs and other data in an internal hard disk. The HDD 944 also reads out the data from the hard disk for reproduction of video and audio.

The disk drive 945 records and reads out data into/from a recording medium mounted thereon. The recording medium mounted on the disk drive 945 may be a DVD disk (such as a DVD-Video, a DVD-RAM, a DVD-R, a DVD-RW, a DVD+R, or a DVD+RW) or a Blu-ray (registered trademark) disc, for example.

For recording video and audio, the selector 946 selects an encoded bit stream input from the tuner 941 or the encoder 943 and outputs the selected encoded bit stream to the HDD 944 or the disk drive 945. For reproducing video and audio, the selector 946 selects an encoded bit stream input from the HDD 944 or the disk drive 945 to the decoder 947.

The decoder 947 decodes the encoded bit stream to generate video data and audio data. The decoder 947 then outputs the generated video data to the OSD 948. The decoder 904 also outputs the generated audio data to an external speaker.

The OSD 948 reproduces the video data input from the decoder 947 and displays the video. The OSD 948 may also superimpose a GUI image such as a menu, a button, or a cursor on the video to be displayed.

The controller 949 includes a processor such as a CPU, and a memory such as a RAM and a ROM. The memory stores programs to be executed by the CPU, program data, and the like. Programs stored in the memory are read and executed by the CPU when the recording/reproducing device 940 is activated, for example. The CPU controls the operation of the recording/reproducing device 940 according to control signals input from the user interface 950, for example, by executing the programs.

The user interface 950 is connected to the controller 949. The user interface 950 includes buttons and switches for users to operate the recording/reproducing device 940 and a receiving unit for receiving remote control signals, for example. The user interface 950 detects operation by a user via these components, generates a control signal, and outputs the generated control signal to the controller 949.

In the recording/reproducing device 940 having such a structure, the encoder 943 has the functions of the image encoding devices according to the embodiments described above. Furthermore, the decoder 947 has the functions of the image decoding devices according to the embodiments described above. Accordingly, in encoding and decoding an image in the recording/reproducing device 940, the encoding efficiency in multi-viewpoint encoding can be improved.

[Fourth Application: Imaging Device]

Figure 24:
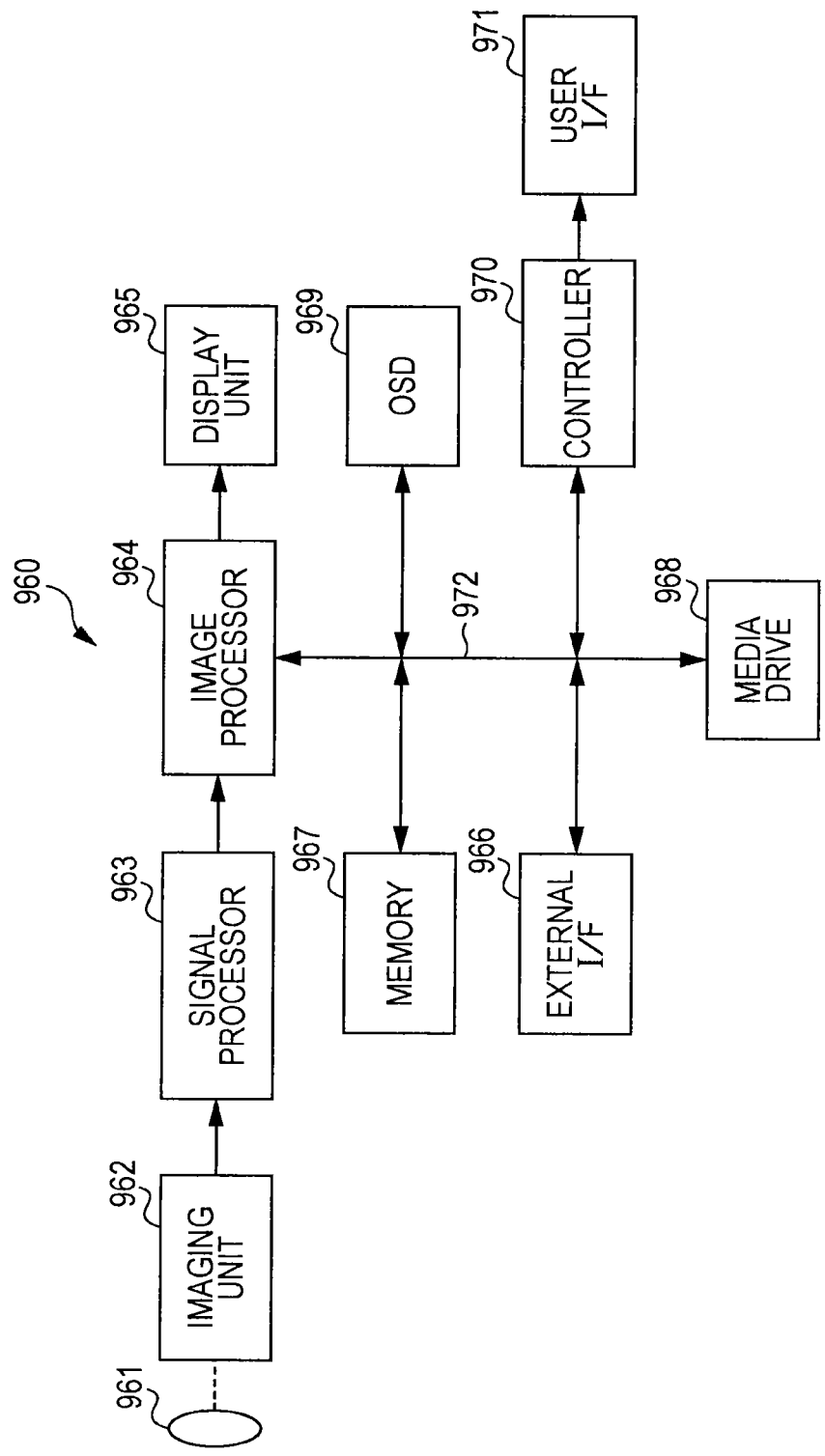
FIG. 24 is a block diagram showing one example of a schematic structure of an imaging device.

FIG. 24 shows one example of a schematic structure of an imaging device to which the embodiments described above are applied. The imaging device 960 images a subject to generate an image, encodes the image data, and records the encoded image data in a recording medium.

The imaging device 960 includes an optical block 961, an imaging unit 962, a signal processor 963, an image processor 964, a display unit 965, an external interface 966, a memory 967, a media drive 968, an OSD 969, a controller 970, a user interface 971, and a bus 972.

The optical block 961 is connected to the imaging unit 962. The imaging unit 962 is connected to the signal processor 963. The display unit 965 is connected to the image processor 964. The user interface 971 is connected to the controller 970. The bus 972 connects the image processor 964, the external interface 966, the memory 967, the media drive 968, the OSD 969, and the controller 970 to one another.

The optical block 961 includes a focus lens, a diaphragm, and the like. The optical block 961 forms an optical image of a subject on the imaging surface of the imaging unit 962. The imaging unit 962 includes an image sensor such as a CCD (charge coupled device) or a CMOS (complementary metal oxide semiconductor), and converts the optical image formed on the imaging surface into an image signal that is an electric signal through photoelectric conversion. The imaging unit 962 then outputs the image signal to the signal processor 963.

The signal processor 963 performs various kinds of camera signal processing such as knee correction, gamma correction, and color correction on the image signal input from the imaging unit 962. The signal processor 963 outputs image data subjected to the camera signal processing to the image processor 964.

The image processor 964 encodes the image data input from the signal processor 963 to generate encoded data. The image processor 964 then outputs the generated encoded data to the external interface 966 or the media drive 968. The image processor 964 also decodes encoded data input from the external interface 966 or the media drive 968 to generate image data. The image processor 964 then outputs the generated image data to the display unit 965. The image processor 964 may output image data input from the signal processor 963 to the display unit 965 to display images. The image processor 964 may also superimpose data for display acquired from the OSD 969 on the images to be output to the display unit 965.

The OSD 969 may generate a GUI image such as a menu, a button, or a cursor and output the generated image to the image processor 964, for example.

The external interface 966 is a USB input/output terminal, for example. The external interface 966 connects the imaging device 960 and a printer for printing of an image, for example. In addition, a drive is connected to the external interface 966 as necessary. A removable medium such as a magnetic disk or an optical disk is mounted to the drive, for example, and a program read out from the removable medium can be installed in the imaging device 960. Furthermore, the external interface 966 may be a network interface connected to a network such as a LAN or the Internet. That is, the external interface 966 has a role as transmission means in the imaging device 960.

The recording medium to be mounted on the media drive 968 may be a readable/writable removable medium such as a magnetic disk, a magnetooptical disk, an optical disk, or a semiconductor memory. Alternatively, a recording medium may be mounted on the media drive 968 in a fixed manner to form an immobile storage unit such as an internal hard disk drive or an SSD (solid state drive), for example.

The controller 970 includes a processor such as a CPU, and a memory such as a RAM and a ROM. The memory stores programs to be executed by the CPU, program data, and the like. Programs stored in the memory are read and executed by the CPU when the imaging device 960 is activated, for example. The CPU controls the operation of the imaging device 960 according to control signals input from the user interface 971, for example, by executing the programs.

The user interface 971 is connected with the controller 970. The user interface 971 includes buttons and switches for users to operate the imaging device 960, for example. The user interface 971 detects operation by a user via these components, generates a control signal, and outputs the generated control signal to the controller 970.

In the imaging device 960 having such a structure, the image processor 964 has the functions of the image encoding devices and the image decoding devices according to the embodiments described above. Accordingly, in encoding and decoding an image in the imaging device 960, the encoding efficiently in multi-viewpoint encoding can be improved.

Note that, in the present specification, an example has been described, in which the pattern identification information such as a pattern flag or a pattern ID are multiplexed to an encoded stream, and are transmitted to the decoding side from the encoding side. The method in which the information pieces are transmitted, however, is not limited to these examples. For example, the information pieces may be transmitted or recorded as separate data associated with the encoded bit stream without being multiplexed with the encoded bit stream. Note that the term "associate" means to allow images (which may be part of images such as slices or blocks) contained in a bit stream to be linked with information on the images in decoding. That is, the information may be transmitted via a transmission path different from that for the images (or bit stream). Alternatively, the information may be recorded in a recording medium other than that for the images (or bit stream) (or on a different area of the same recording medium). Furthermore, the information and the images (or bit stream) may be associated with each other in any units such as in units of some frames, one frame or part of a frame.

While preferred embodiments of the present disclosure have been described above with reference to the accompanying drawings, the present disclosure is not limited to these examples. It is apparent that a person ordinary skilled in the art to which the present disclosure belongs can conceive various variations and modifications within the technical idea described in the claims, and it is naturally appreciated that these variations and modification belongs within the technical scope of the present disclosure.

The present technique can also have the following structures.

(1) An image processing device including:
   a decoder configured to decode a bit stream to generate an image;
   an index allocation unit configured to alternately allocate reference image indexes to be referred in predicting the image generate by the decoder to a referable image in a view direction and to a referable image in a time direction; and
   a predictor configured to refer a reference image of the index allocated by the index allocation unit to predict the image generated by the decoder.
(2) The image processing device according to (1), wherein the index allocation unit repeats a process of allocating the reference image indexes to a referable image in the time direction and to a referable image in the view direction in that order.
(3) The image processing device according to (2), wherein after allocating the reference image indexes to all of the referable images in the view direction, the index allocation unit allocates the reference image index to a referable image in the time direction.
(4) The image processing device according to (1), wherein the index allocation unit repeats a process of allocating the reference image indexes to a referable image in the view direction and to a referable image in the time direction in that order.
(5) The image processing device according to (4), wherein after allocating the reference image indexes to all of the referable images in the view direction, the index allocation unit allocates the reference image index to a referable image in the time direction.
(6) The image processing device according to (1), wherein the index allocation unit selects either one from a time direction prioritized pattern in which after the reference image index is allocated to a referable image in the time direction, the reference image index is allocated to a referable image in the view direction, and a view direction prioritized pattern in which after the reference image index is allocated to a referable image in the view direction, the reference image index is allocated to a referable image in the time direction, and allocates the reference image index.
(7) The image processing device according to (6), wherein the index allocation unit selects a pattern to allocate the reference image index from a time direction prioritized pattern in which a process of allocating the reference image indexes to a referable image in the time direction and to a referable image in the view direction in that order is repeated, and a view direction prioritized pattern in which a process of allocating the reference image indexes to a referable image in the view direction and to a referable image in the time direction in that order is repeated, and allocates the reference image index.
(8) The image processing device according to (6), wherein the index allocation unit allocates the reference image index according to pattern identification information identifying whether the time direction prioritized pattern is used or the view direction prioritized pattern is used.

(9) The image processing device according to any one of (1) to (8), wherein the index allocation unit allocates the reference image index to a referable image in the view direction based on view reference information of a sequence parameter set.

(10) The image processing device according to any one of (1) to (9), wherein the index allocation unit allocates the reference image index to a referable image in the time direction based on decoding order in a case of a P-picture, and based on a picture order count (POC) in a case of a B-picture.

(11) The image processing device according to (1), wherein the index allocation unit selects a pattern to allocate the reference image index from a time direction prioritized alternate pattern in which a process of starting allocation of the reference image indexes from a referable image in the time direction, and allocating the reference image indexes to a referable image in the time direction and to a referable image in the view direction in that order is repeated, and a view direction prioritized alternate pattern in which a process of starting allocation of the reference image indexes from a referable image in the view direction, and allocating the reference image indexes to a referable image in the view direction and to a referable image in the time direction in that order is repeated, and allocates the reference image index.

(12) The image processing device according to (11), wherein the index allocation unit allocates the reference image indexes according to pattern identification information identifying whether the time direction prioritized alternate pattern is used or the view direction prioritized alternate pattern is used.

(13) An image processing method in which an image processing device:
decodes an image;
decodes a bit stream to generate an image;
alternately allocates reference image indexes to be referred in predicting the generated image to a referable image in a view direction and to a referable image in a time direction; and
refers to a reference image of the allocated index and predicts the generated image.

(14) An image processing device including:
an index allocation unit configured to alternately allocate reference image indexes to be referred in predicting an image to a referable image in a view direction and to a referable image in a time direction;
a predictor configured to refer to a reference image of the index allocated by the index allocation unit to predict the image; and
an encoder configured to encode the image predicted by the predictor to generate a bit stream.

(15) The image processing device according to (14), wherein the index allocation unit repeats a process of allocating the reference image indexes to a referable image in the time direction and to a referable image in the view direction in that order.

(16) The image processing device according to (15), wherein after allocating the reference image indexes to all of the referable images in the view direction, the index allocation unit allocates the reference image index to a referable image in the time direction.

(17) The image processing device according to (14), wherein the index allocation unit repeats a process of allocating the reference image indexes to a referable image in the view direction and to a referable image in the time direction in that order.

(18) The image processing device according to (17), wherein after allocating the reference image indexes to all of the referable images in the view direction, the index allocation unit allocates the reference image index to a referable image in the time direction.

(19) The image processing device according to (14), wherein the index allocation unit selects either one from a time direction prioritized pattern in which after the reference image index is allocated to a referable image in the time direction, the reference image index is allocated to a referable image in the view direction, and a view direction prioritized pattern in which after the reference image index is allocated to a referable image in the view direction, the reference image index is allocated to a referable image in the time direction, and allocates the reference image index.

(20) The image processing device according to (19), wherein the index allocation unit selects a pattern to allocate the reference image index from a time direction prioritized pattern in which a process of allocating the reference image indexes to a referable image in the time direction and to a referable image in the view direction in that order is repeated, and a view direction prioritized pattern in which a process of allocating the reference image indexes to a referable image in the view direction and to a referable image in the view direction in that order is repeated, and allocates the reference image index.

(21) The image processing device according to (19), wherein the bit stream further includes a transmission unit configured to transmit pattern identification information identifying whether the time direction prioritized pattern is used or the view direction prioritized pattern is used, and the bit stream generated by the encoder.

(22) The image processing device according to any one of (14) to (21), wherein the index allocation unit allocates the reference image index to a referable image in the view direction based on view reference information of a sequence parameter set.

(23) The image processing device according to any one of (14) to (22), wherein the index allocation unit allocates the reference image index to a referable image in the time direction based on decoding order in a case of a P-picture, and based on a picture order count (POC) in a case of a B-picture.

(24) The image processing device according to (14), wherein the index allocation unit selects a pattern to allocate the reference image index from a time direction prioritized alternate pattern in which a process of starting allocation of the reference image indexes from a referable image in the time direction, and allocating the reference image indexes to a referable image in the time direction and to a referable image in the view direction in that order is repeated, and a view direction prioritized alternate pattern in which a process of starting allocation of the reference image indexes from a referable image in the view direction, and allocating the reference image indexes to a referable image in the view direction and to a referable image in the time direction in that order is repeated, and allocates the reference image index.

(25) The image processing device according to (24), further including a transmission unit configured to transmit pattern identification information identifying whether the time direction prioritized alternate pattern is used or the view direction prioritized alternate pattern is used, and the bit stream generated by the encoder.

(26) An image processing method in which an image processing device:
alternately allocates reference image indexes to be referred in predicting an image to a referable image in a view direction and to a referable image in a time direction;
refers to a reference image of the allocated index to predict the image; and
encodes the image predicted by the predictor to generate a bit stream.

REFERENCE SIGNS LIST

100 Image encoding device
106 Lossless encoder
115 Motion estimator/compensator
121 Syntax processing unit
122 Reference image index allocation unit
200 Image decoding device
202 Lossless decoder
212 Motion estimator/compensator
221 Syntax processing unit
222 Reference image index allocation unit
311 Image encoding device
351 Image decoding device

The invention claimed is:

1. An image processing device comprising:
circuitry configured to
decode a bit stream to generate an image;
alternately allocate reference image indexes of reference lists to be referred in predicting the image generated by the circuitry to a referable image in a view direction and to a referable image in a time direction one by one by either repeating only a first processing, or repeating only a second processing, the first processing being a processing of allocating the reference image indexes to be referred in predicting the image generated by the circuitry to the referable image in the time direction and then to the referable image in the view direction in this order, the second processing being a processing of allocating the reference image indexes to be referred in predicting the image generated by the circuitry to the referable image in the view direction and then to the referable image in the time direction in this order, such that two reference image indexes are not allocated to the referable image in the view direction in succession and that two reference image indexes are not allocated to the referable image in the time direction in succession; and
refer a reference image of the index allocated by the circuitry to predict the image generated by the circuitry, wherein
the referable image in the view direction is an image of a same time and a different view with respect to the image generated by the circuitry, and
the referable image in the time direction is an image of a different time and a same view with respect to the image generated by the circuitry.

2. The image processing device according to claim 1, wherein the circuitry repeats a process of allocating the reference image indexes to a referable image in the time direction and to a referable image in the view direction in that order.

3. The image processing device according to claim 1, wherein the circuitry repeats a process of allocating the reference image indexes to a referable image in the view direction and to a referable image in the time direction in that order.

4. The image processing device according to claim 1, wherein the circuitry selects either one from a time direction prioritized pattern in which after the reference image index is allocated to a referable image in the time direction, the reference image index is allocated to a referable image in the view direction, and a view direction prioritized pattern in which after the reference image index is allocated to a referable image in the view direction, the reference image index is allocated to a referable image in the time direction, and allocates the reference image index.

5. The image processing device according to claim 4, wherein the circuitry selects a pattern to allocate the reference image index from a time direction prioritized pattern in which a process of allocating the reference image indexes to a referable image in the time direction and to a referable image in the view direction in that order is repeated, and a view direction prioritized pattern in which a process of allocating the reference image indexes to a referable image in the view direction and to a referable image in the time direction in that order is repeated, and allocates the reference image index.

6. The image processing device according to claim 4, wherein the circuitry allocates the reference image index according to pattern identification information identifying whether the time direction prioritized pattern is used or the view direction prioritized pattern is used.

7. The image processing device according to claim 1, wherein the circuitry allocates the reference image index to a referable image in the view direction based on view reference information of a sequence parameter set.

8. The image processing device according to claim 1, wherein the circuitry allocates the reference image index to a referable image in the time direction based on decoding order in a case of a P-picture, and based on a picture order count (POC) in a case of a B-picture.

9. The image processing device according to claim 1, wherein the circuitry selects a pattern to allocate the reference image index from a time direction prioritized alternate pattern in which a process of starting allocation of the reference image indexes from a referable image in the time direction, and allocating the reference image indexes to a referable image in the time direction and to a referable image in the view direction in that order is repeated, and a view direction prioritized alternate pattern in which a process of starting allocation of the reference image indexes from a referable image in the view direction, and allocating the reference image indexes to a referable image in the view direction and to a referable image in the time direction in that order is repeated, and allocates the reference image index.

10. The image processing device according to claim 9, wherein the circuitry allocates the reference image indexes according to pattern identification information identifying whether the time direction prioritized alternate pattern is used or the view direction prioritized alternate pattern is used.

11. An image processing method comprising:
decoding a bit stream to generate an image;
alternately allocating, using circuitry, reference image indexes of reference lists to be referred in predicting the generated image to a referable image in a view direction and to a referable image in a time direction one by one by either repeating only a first processing, or repeating only a second processing, the first processing being a processing of allocating the reference image indexes to be referred in predicting the image generated by the circuitry to the referable image in the time direction and then to the referable image in the view direction in this order, the second processing being a processing of allocating the reference image indexes to be referred in predicting the image generated by the circuitry to the referable image in the view direction and then to the referable image in the time direction in this order, such that two reference image indexes are not allocated to the referable image in the view direction in succession and that two reference image indexes are not allocated to the referable image in the time direction in succession; and referring to a reference image of the allocated index to predict the generated image, wherein the referable image in the view direction is an image of a same time and a different view with respect to the generated image, and the referable image in the time direction is an image of a different time and a same view with respect to the generated image.

12. An image processing device comprising:
circuitry configured to
alternately allocate reference image indexes of reference lists to be referred in predicting an image to a referable image in a view direction and to a referable image in a time direction one by one by either repeating only a first processing, or repeating only a second processing, the first processing being a processing of allocating the reference image indexes to be referred in predicting the image generated by the circuitry to the referable image in the time direction and then to the referable image in the view direction in this order, the second processing being a processing of allocating the reference image indexes to be referred in predicting the image generated by the circuitry to the referable image in the view direction and then to the referable image in the time direction in this order, such that two reference image indexes are not allocated to the referable image in the view direction in succession and that two reference image indexes are not allocated to the referable image in the time direction in succession;

refer to a reference image of the index allocated by the circuitry to predict the image; and encode the image predicted by the circuitry to generate a bit stream, wherein the referable image in the view direction is an image of a same time and a different view with respect to the image predicted by the circuitry, and the referable image in the time direction is an image of a different time and a same view with respect to the image predicted by the circuitry.

13. The image processing device according to claim 12, wherein the circuitry repeats a process of allocating the reference image indexes to a referable image in the time direction and to a referable image in the view direction in that order.

14. The image processing device according to claim 12, wherein the circuitry repeats a process of allocating the reference image indexes to a referable image in the view direction and to a referable image in the time direction in that order.

15. The image processing device according to claim 12, wherein the circuitry selects either one from a time direction prioritized pattern in which after the reference image index is allocated to a referable image in the time direction, the reference image index is allocated to a referable image in the view direction, and a view direction prioritized pattern in which after the reference image index is allocated to a referable image in the view direction, the reference image index is allocated to a referable image in the time direction, and allocates the reference image index.

16. The image processing device according to claim 15, wherein the circuitry selects a pattern to allocate the reference image index from a time direction prioritized pattern in which a process of allocating the reference image indexes to a referable image in the time direction and to a referable image in the view direction in that order is repeated, and a view direction prioritized pattern in which a process of allocating the reference image indexes to a referable image in the view direction and to a referable image in the time direction in that order is repeated, and allocates the reference image index.

17. The image processing device according to claim 15, further comprising a transmitter configured to transmit pattern identification information identifying whether the time direction prioritized pattern is used or the view direction prioritized pattern is used, and the bit stream generated by the circuitry.

18. The image processing device according to claim 12, wherein the circuitry allocates the reference image index to a referable image in the view direction based on view reference information of a sequence parameter set.

19. The image processing device according to claim 12, wherein the circuitry allocates the reference image index to a referable image in the time direction based on decoding order in a case of a P-picture, and based on a picture order count (POC) in a case of a B-picture.

20. The image processing device according to claim 12, wherein the circuitry selects a pattern to allocate the reference image index from a time direction prioritized alternate pattern in which a process of starting allocation of the reference image indexes from a referable image in the time direction, and allocating the reference image indexes to a referable image in the time direction and to a referable image in the view direction in that order is repeated, and a view direction prioritized alternate pattern in which a process of starting allocation of the reference image indexes from a referable image in the view direction, and allocating the reference image indexes to a referable image in the view direction and to a referable image in the time direction in that order is repeated, and allocates the reference image index.

21. The image processing device according to claim 20, further comprising a transmitter configured to transmit pattern identification information identifying whether the time direction prioritized alternate pattern is used or the view direction prioritized alternate pattern is used, and the bit stream generated by the circuitry.

22. An image processing method comprising:
alternately allocating, using circuitry, reference image indexes of reference lists to be referred in predicting an image to a referable image in a view direction and to a referable image in a time direction one by one by either repeating only a first processing, or repeating only a second processing, the first processing being a processing of allocating the reference image indexes to be referred in predicting the image generated by the circuitry to the referable image in the time direction and then to the referable image in the view direction in this order, the second processing being a processing of allocating the reference image indexes to be referred in predicting the image generated by the circuitry to the referable image in the view direction and then to the referable image in the time direction in this order, such that two reference image indexes are not allocated to the referable image in the view direction in succession and that two reference image indexes are not allocated to the referable image in the time direction in succession;

referring to a reference image of the allocated index to predict the image; and encoding the image predicted by the circuitry to generate a bit stream, wherein the referable image in the view direction is an image of a same time and a different view with respect to the image predicted by the circuitry, and the referable image in the time direction is an image of a different time and a same view with respect to the image predicted by the circuitry.

23. The image processing device according to claim 1, wherein the referable image in the time direction is an image having a closest temporal distance in past times and the same view with respect to the image generated by the circuitry.

24. The image processing device according to claim 12, wherein the referable image in the time direction is an image having a closest temporal distance in past times and the same view with respect to the image predicted by the circuitry.

25. The image processing device according to claim 1, wherein the reference lists include a reference list L0 and a reference list L1.

* * * * *